US012472718B2

(12) United States Patent
Goto et al.

(10) Patent No.: US 12,472,718 B2
(45) Date of Patent: Nov. 18, 2025

(54) ZIPPER TAPE-EQUIPPED BAG BODY, ARTICLE HOUSING METHOD FOR ZIPPER TAPE-EQUIPPED BAG BODY, MANUFACTURING METHOD FOR ZIPPER TAPE-EQUIPPED BAG BODY, AND MANUFACTURING DEVICE FOR ZIPPER TAPE-EQUIPPED BAG BODY

(71) Applicant: IDEMITSU UNITECH CO., LTD., Tokyo (JP)

(72) Inventors: Shuichi Goto, Chiba (JP); Takumi Todaka, Chiba (JP)

(73) Assignee: IDEMITSU UNITECH CO., LTD., Tokyo (JP)

( * ) Notice: Subject to any disclaimer, the term of this patent is extended or adjusted under 35 U.S.C. 154(b) by 0 days.

(21) Appl. No.: 17/682,219

(22) Filed: Feb. 28, 2022

(65) Prior Publication Data

US 2022/0184913 A1 Jun. 16, 2022

Related U.S. Application Data

(62) Division of application No. 15/312,887, filed as application No. PCT/JP2015/064094 on May 15, 2015, now Pat. No. 11,285,686.

(30) Foreign Application Priority Data

May 21, 2014 (JP) ................................ 2014-105095
May 21, 2014 (JP) ................................ 2014-105096

(51) Int. Cl.
*B65D 33/25* (2006.01)
*B31B 70/81* (2017.01)
(Continued)

(52) U.S. Cl.
CPC .......... *B31B 70/8132* (2017.08); *B65D 33/25* (2013.01); *B65D 33/2516* (2013.01);
(Continued)

(58) Field of Classification Search
CPC ................ B65D 33/25; B65D 33/2508; B65D 33/2516; B65D 33/2525; B65D 33/2533;
(Continued)

(56) References Cited

U.S. PATENT DOCUMENTS 4,532,652 A * 7/1985 Herrington ........ B65D 33/2541 383/103
4,744,674 A * 5/1988 Nocek ................ B65D 33/2525 53/410
(Continued)

FOREIGN PATENT DOCUMENTS

EP 2702890 A1 * 3/2014 ............. A61G 17/06
JP H01-257038 A 10/1989
(Continued)

OTHER PUBLICATIONS

Office Action Corresponding to Japanese Patent Application No. 2014-105096—Drafting Date: Jan. 15, 2018—Dispatch Date: Jan. 23, 2018 {with English Translation).
(Continued)

*Primary Examiner* — Nathan J Newhouse
*Assistant Examiner* — Nina K Attel
(74) *Attorney, Agent, or Firm* — Millen, White, Zelano & Branigan; Ryan R. Pool

(57) ABSTRACT

A female belt-shaped base is attached to a bag body at a region from a female hook to a first end near an open end of the bag body and to a second end near a housing space. A male belt-shaped base is attached to the bag body only in a bonding region without being attached at a region from a
(Continued)

position where an engagement portion is continuously attached to a first end near the open end of the bag body.

9 Claims, 45 Drawing Sheets

(51) Int. Cl.

| | |
|---|---|
| ***B65D 33/34*** | (2006.01) |
| *B31B 70/00* | (2017.01) |
| *B31B 70/10* | (2017.01) |
| *B31B 70/16* | (2017.01) |
| *B31B 70/18* | (2017.01) |
| *B31B 70/26* | (2017.01) |
| *B31B 70/36* | (2017.01) |
| *B31B 70/64* | (2017.01) |
| *B31B 155/00* | (2017.01) |
| *B31B 160/10* | (2017.01) |
| *B31B 160/20* | (2017.01) |

(52) U.S. Cl.
CPC ..... *B65D 33/2541* (2013.01); *B65D 33/2566* (2013.01); *B65D 33/34* (2013.01); *B31B 70/005* (2017.08); *B31B 70/10* (2017.08); *B31B 70/16* (2017.08); *B31B 70/18* (2017.08); *B31B 70/262* (2017.08); *B31B 70/266* (2017.08); *B31B 70/28* (2017.08); *B31B 70/36* (2017.08); *B31B 70/642* (2017.08); *B31B 70/644* (2017.08); *B31B 70/645* (2017.08); *B31B 2155/0014* (2017.08); *B31B 2155/002* (2017.08); *B31B 2160/10* (2017.08); *B31B 2160/20* (2017.08)

(58) Field of Classification Search
CPC .............. B65D 33/2541; B65D 33/255; B65D 33/2558; B65D 33/2566; B65D 33/2575; B65D 33/2583; B65D 33/2584; B65D 33/2585; B65D 33/2586; B65D 33/25865; B65D 33/2587; B65D 33/2588; B65D 33/2589; B65D 33/259; B65D 33/2591
USPC ...................................... 383/61.1, 63, 64, 65
See application file for complete search history.

(56) References Cited

U.S. PATENT DOCUMENTS

| | | | | |
|---|---|---|---|---|
| 5,372,428 | A | 12/1994 | Bruno et al. | |
| 5,513,915 | A | 5/1996 | May | |
| 5,729,876 | A | 3/1998 | Johnson | |
| 5,956,815 | A * | 9/1999 | O'Connor .......... | B65D 33/2541 24/30.5 R |
| 6,138,329 | A * | 10/2000 | Johnson ................ | B65B 61/188 24/584.1 |
| 6,257,763 | B1 * | 7/2001 | Stolmeier .......... | B65D 33/2516 383/5 |
| 6,499,878 | B1 | 12/2002 | Dobreski et al. | |
| 7,410,298 | B2 * | 8/2008 | Pawloski ........... | B65D 33/2566 24/585.12 |
| 8,732,913 | B2 * | 5/2014 | Nakajima .......... | B65D 33/2541 24/585.12 |
| 2006/0165316 | A1 * | 7/2006 | Cheung .............. | B65D 33/2508 24/585.12 |
| 2009/0300891 | A1 | 12/2009 | Nanba et al. | |
| 2012/0045151 | A1 * | 2/2012 | Eouzan .............. | B65D 33/2541 383/42 |
| 2014/0161374 | A1 * | 6/2014 | Septien Rojas .... | B65D 33/2541 383/63 |
| 2014/0270585 | A1 | 9/2014 | Heckman | |
| 2017/0152085 | A1 | 6/2017 | Septien Rojas et al. | |

FOREIGN PATENT DOCUMENTS

| | | | |
|---|---|---|---|
| JP | 2003517975 | A | 6/2003 |
| JP | 2011-36642 | A | 2/2011 |
| JP | 2011-200507 | A | 10/2011 |
| JP | 2012-41089 | A | 3/2012 |
| WO | 2014066025 | A1 | 5/2014 |

OTHER PUBLICATIONS

English Abstract—Bibliographic data: JP2003517975(A)—Publication Date: Jun. 3, 2003.
International Preliminary Report on Patentability (IPRP) dated Nov. 22, 2016 issued in corresponding DCT/JP2015/064094 application (10 pages).
International Search Report dated Jun. 30, 2015, issued in corresponding PCT/JP2015/064094, 4 pages.
English translation Abstract of JPH01257038A published Oct. 13, 1989 (2 pages).
English translation Abstract of JP2011200507A published Oct. 13, 2011 (1 page).
English translation Abstract of JP2011036642A published Feb. 24, 2011 (1 page).
English translation Abstract of JP2012041089A published Mar. 1, 2012 (2 pages).

* cited by examiner

ZIPPER TAPE-EQUIPPED BAG BODY, ARTICLE HOUSING METHOD FOR ZIPPER TAPE-EQUIPPED BAG BODY, MANUFACTURING METHOD FOR ZIPPER TAPE-EQUIPPED BAG BODY, AND MANUFACTURING DEVICE FOR ZIPPER TAPE-EQUIPPED BAG BODY

TECHNICAL FIELD

The present invention relates to a zipper tape-equipped bag, an article housing method for the zipper tape-equipped bag, a manufacturing method for the zipper tape-equipped bag, and a manufacturing device for the zipper tape-equipped bag.

BACKGROUND ART

Conventionally, at the time of display, transportation and the like of an article packed in a bag, the bag body housing the article is sometimes intentionally opened to tamper the article.

For instance, at a retail shop (e.g., a supermarket), by a filler and the like, the article is packed in the bag and, after the bag body is sealed, the article is sometimes displayed and sold at a shopping site or delivered to the retail shop.

Herein, in order to pack the article into the bag body and subsequently seal the bag body, a zipper tape bonded to opposing surfaces of the bag body is sometimes used as a means for opening and closing the bag body in terms of a simple filling of the article without requiring a heat sealer.

The zipper tape has an advantage that a sealing operation and an opening operation can be easily conducted on the bag since a male member and a female member of the zipper tape are detachable, while the zipper tape also has a disadvantage that the article can be easily taken out from the once sealed bag body by opening the bag body. For this reason, zipper-tape-equipped bag is difficult to use in terms of a tamper resistance of the article.

It has been known that such a zipper tape-equipped bag includes a function for a tamper resistance (see, for instance, Patent Literatures 1 and 2).

Patent Literature 1 discloses a belt-shaped engagement member including an elongated belt-shaped fitting base, an engaging portion having a concave fitting groove shaped in a volute, in which another member is fitted along a longitudinal direction of the fitting base, and a support bonded to the engaging portion and connected to the fitting base.

In Patent Literature 1, a pair of belt-shaped engaging members are fitted to each other, thereby functioning as a zipper tape. The engaging members each have an engaging claw protruding inward in a vicinity of a first opening edge of the concave fitting groove and configured to engage with the another member. The support is provided such that a bonding position to the engaging portion is shifted toward a second opening edge of the concave fitting groove with respect to a perpendicular line from an engaging position in which the engaging claw engages with the another member toward the fitting base. The support is formed to have a smaller strength than a strength of the engaging portion to be released from fitting in the another member by receiving a stretching force for separating the engaging portion from the another member.

In Patent Literature 2, a first belt-shaped support and a second belt-shaped support respectively have thick portions at the respective ends. The ends of the first and second belt-shaped supports are attached to a bag such that the first belt-shaped support faces an inside of the bag to be bentable and pivotable while the second belt-shaped support faces an aperture of the bag to be bentable and pivotable. When the bag is attempted to be opened, the belt-shaped supports in a pair are bent and pivoted to bring the respective hooks into engagement to exhibit a tamper resistance. Since it is necessary to heat-seal only the local thick portions, manufacturing equipment is limitative and not versatile.

CITATION LIST

Patent Literatures

Patent Literature 1 JP-A-2011-36642
Patent Literature 2 JP-A-2011-41089

SUMMARY OF THE INVENTION

Problems to be Solved by the Invention

In the tamper-proof arrangement described in Patent Literature 1, when the bag is attempted to be opened after a pair of belt-shaped engaging members are once fitted with each other, a shear stress acts on the fitted engaging members to bring the engaging members into further meshing each other, which makes it difficult to open the bag.

However, in the tamper-proof arrangement described in Patent Literature 1, since a zipper tape has a complicated shape, the zipper tape is difficult to manufacture and requires care in order to avoid breakage during delivery.

In Patent Literature 2, free ends of the respective belt-shaped supports in a pair are spaced away at an interval from the bag in a static condition without receiving a force, when the respective hooks are brought into engagement for sealing the bag, a force may act on the belt-shaped supports to hamper an adequate engagement of the hooks. Accordingly, in case of an insufficient engagement of the hooks such as a partial engagement, the bag may be easily opened and cannot fully exhibit a tamper resistance.

An object of the invention is to provide a zipper tape-equipped bag capable of easily housing an article and preventing the housed article from being tampered, an article housing method for the zipper tape-equipped bag, a manufacturing method of the zipper tape-equipped bag, and a manufacturing device of the zipper tape-equipped bag.

Means for Solving the Problems

According to an aspect of the invention, a zipper tape-equipped bag includes: a bag body including an aperture and a housing space in which an article is housed; a zipper tape bonded to an inner surface of the bag body and including: an engagement portion including a pair of a male hook and a female hook engageable with each other; and a pair of first and second belt-shaped bases continuously provided to the engagement portion, in which the first belt-shaped base is bonded to the bag body at least at a first end near the aperture of the bag body and a second end near the housing space of the bag body, and the second belt-shaped base is bonded to the bag body at a second end near the housing space of the bag body without being bonded to the bag body at a first end near the aperture of the bag body.

In the above aspect of the invention, since a region of the first belt-shaped base near the first and second ends with respect to the engagement portion is bonded to the bag body to be fixed to the bag body, when the male and female hooks are brought into engagement after the article is housed, an insufficient engagement because of deviation in position is preventable and an engageability is improvable, so that a tamper-proof function is attainable. Further, since the first end of the second belt-shaped base near the aperture of the bag body is not bonded to the bag body, when the bag body is attempted to be opened, the pair of belt-shaped bases are moved in opposite directions for shearing the engagement portion. With this movement, an opening force acts in such directions as to engage the male hook with the female hook, so that it is preventable that the engagement is released to open the bag body and the tamper resistance is improvable.

Herein, the male hook and the female hook are not limited to the male member having an arrowhead-shaped cross section and the female member shaped in a concave groove to be engaged with the male member, but may be any member having any shape (e.g., a member having a hook-shaped cross section in which only a single claw protrudes from one side) allowing the male member and the female members to engage with each other.

According to another aspect of the invention, a zipper tape-equipped bag includes: a bag body including an aperture and a housing space in which an article is housed; a zipper tape bonded to an inner surface of the bag body and including: an engagement portion including a pair of a male hook and a female hook engageable with each other; and a pair of first and second belt-shaped bases continuously provided to the engagement portion, in which the first belt-shaped base is bonded to the bag body at least from a position where the first belt-shaped base is continuously provided to the engagement portion toward a first end near the aperture of the bag body and a second end near the housing space, and the second belt-shaped base is bonded to the bag body at a second end near the housing space of the bag body without being bonded to the bag body at a first end near the aperture of the bag body.

In the above aspect of the invention, since a region of the first belt-shaped base near the first and second ends with respect to the engagement portion is bonded to the bag body to be fixed to the bag body, when the male and female hooks are brought into engagement after the article is housed, an insufficient engagement because of deviation in position is preventable and an engageability is improvable, so that a tamper-proof function is attainable. Further, since the first end of the second belt-shaped base near the aperture of the bag body is not bonded to the bag body, when the bag body is attempted to be opened, the pair of belt-shaped bases are moved in opposite directions for shearing the engagement portion. With this movement, an opening force acts in such directions as to engage the male hook with the female hook, so that it is preventable that the engagement is released to open the bag body and the tamper resistance is improvable.

In the above arrangement, it is preferable that the male hook or the female hook of the second belt-shaped base includes claws respectively protruding toward the aperture and the housing space, and the first belt-shaped base includes an engageable claw protruding toward the housing space and configured to engage at least with one of the claws protruding toward the aperture.

With this arrangement, since the claws respectively protruding toward the opening and the housing space and configured to engage with or disengage from the engageable claw provided in the first belt-shaped base are provided in the male hook or the female hook of the second belt-shaped base, the engagement can be more reinforced, so that the tamper resistance is more improvable.

In the above arrangement, it is preferable that the second belt-shaped base is not bonded to the bag body at least from the position where the second belt-shaped base is continuously provided to the engagement portion to the first end near the aperture of the bag body.

With this arrangement, since the second belt-shaped base is not bonded to the bag body at least from the position where the second belt-shaped base is continuously provided to the engagement portion to the first end near the aperture of the bag body, when the bag body is attempted to be opened, the pair of belt-shaped bases are moved in opposite directions for shearing the engagement portion, so that the tamper resistance is more improvable.

In the above arrangement, it is preferable that a length of the second belt-shaped base from the position where the second belt-shaped base is continuously provided to the engagement portion to the first end near the aperture of the bag body is shorter than a length of the first belt-shaped base from the position where the first belt-shaped base is continuously provided to the engagement portion to the first end near the aperture of the bag body.

With this arrangement, since the length of the second belt-shaped base, which is not bonded to the bag body, from the position where the second belt-shaped base is continuously provided to the engagement portion to the first end thereof near the aperture of the bag body is shorter than the length of the first belt-shaped base from the position where the first belt-shaped base is continuously provided to the engagement portion to the first end thereof near the aperture of the bag body, the first end of the second belt-shaped base not bonded to the bag body can be prevented from being present as a free end in a vicinity of the aperture of the bag body. With this arrangement, since the free end can be prevented from being an obstacle at the housing operation and the housing operation of the article can be facilitated. Further, since the free end is difficult to hold, it can be prevented that the bag is opened by holding the free end, so that the tamper resistance is more improvable.

Herein, the second belt-shaped base is shorter than the first belt-shaped base. For instance, the second belt-shaped base includes: the cuttable portion continuously provided at a longitudinal edge of the second belt-shaped base and positioned at a base end of the engagement portion; and the holdable piece continuously provided to the cuttable portion, and only the second belt-shaped base is not bonded to the bag body from the position where the second belt-shaped base is continuously provided to the engagement portion to the first end of the second belt-shaped base near the aperture of the bag body. The holdable piece can be removed from the second belt-shaped base using the cuttable portion of the zipper tape.

In the above arrangement, it is preferable that the length of the second belt-shaped base from the position where the second belt-shaped base is continuously provided to the engagement portion to the first end near the aperture of the bag body is defined as a length for the second belt-shaped base to be unholdable.

With this arrangement, since the first end not bonded to the bag body is short enough to be unholdable, when the bag body is attempted to be opened, the pair of belt-shaped bases are moved in opposite directions for shearing the engagement portion, so that the tamper resistance is more improvable.

In the above arrangement, it is preferable that an opening cut portion provided closer to the housing space with respect to the engagement portion.

With this arrangement, since the engagement portion in engagement is cut by the opening cut portion, the housed article can be taken out. Thus, a user can easily open the bag.

According to still another aspect of the invention, a zipper tape-equipped bag includes: a bag body including an aperture and a housing space in which an article is housed; a zipper tape bonded to an inner surface of the bag body and including: an engagement portion including a pair of a male hook and a female hook engageable with each other; and a pair of first and second belt-shaped bases continuously provided to the engagement portion, in which at least the first belt-shaped base provided with the male hook or the female hook includes: a cuttable portion continuously provided at a longitudinal edge of the at least one of the belt-shaped bases and positioned at a base end of the engagement portion; and a holdable piece continuously provided to the cuttable portion, in which the zipper tape is bonded such that an end of the zipper tape to which the cuttable portion and the holdable piece are provided is positioned near the aperture of the bag body with respect to the engagement portion, and only in the first belt-shaped base provided with the cuttable portion, a region from a position where the first belt-shaped base is continuously provided to the engagement portion to an end near the aperture of the bag body is not bonded to the bag body.

In the above aspect of the invention, the holdable piece can be removed from the at least one of the belt-shaped bases using the cuttable portion of the zipper tape. Since the holdable piece is removed using the cuttable portion in a condition that the zipper tape is bonded to the bag body, it is preventable that the engagement portion is released from the engagement to open the bag body and the tamper resistance is improvable.

Herein, the base end of the engagement portion where the cuttable portion is provided is defined as a position at which a length of the belt-shaped base that the end of the belt-shaped base is too short to substantially hold after the holdable piece is removed using the cuttable portion.

The cuttable portion is exemplified by a thin portion and a perforated portion. The thin portion, the perforated portion and the like are formable by extrusion molding of the zipper tape, a processing of the zipper tape using a cutter, and a laser processing. The thin portion is exemplified by a stepped portion that is dented from a surface of at least one of the belt-shaped bases, a thin portion having a V-shaped cross section, and a concave thin portion.

Moreover, since the holdable piece is removed from the at least one of the belt-shaped bases, the at least one of the belt-shaped bases not bonded to the bag body is shorter than the rest of the belt-shaped bases. Accordingly, the first end of the at least one of the belt-shaped bases not bonded to the bag body can be prevented from being present as a free end in a vicinity of the aperture of the bag body. With this arrangement, since the free end can be prevented from being an obstacle at the housing operation to facilitate the housing operation of the article and the free end is difficult to hold, it can be prevented that the bag is opened by holding the free end, so that the tamper resistance is more improvable.

Specifically, the zipper tape includes: the engagement portion including a pair of the male hook and the female hook engageable with each other; and a pair of belt-shaped bases continuously provided to the engagement portion. The zipper tape is bonded to an inner surface of the bag body. At least one of the belt-shaped bases respectively having the male hook and the female hook includes: the cuttable portion continuously provided at a longitudinal edge of the at least one of the belt-shaped bases and positioned at the base end of the engagement portion; and a holdable piece continuously provided to the cuttable portion.

According to a further aspect of the invention, a zipper tape-equipped bag includes: a bag body including an aperture and a housing space in which an article is housed; a zipper tape bonded to an inner surface of the bag body and including: an engagement portion including a pair of a male hook and a female hook engageable with each other; and a pair of first and second belt-shaped bases continuously provided to the engagement portion, in which each of the belt-shaped bases respectively provided with the male hook and the female hook includes: a cuttable portion continuously provided at a longitudinal edge of each of the belt-shaped bases and positioned at a base end of the engagement portion; and a holdable piece continuously provided to the cuttable portion, in which the zipper tape is bonded such that an end of the zipper tape to which the cuttable portion and the holdable piece are provided is positioned near the aperture of the bag body with respect to the engagement portion.

In the above aspect of the invention, the holdable piece can be removed from each of the belt-shaped bases using the cuttable portion of the zipper tape. While the cuttable portion is not cut and the holdable piece remains unremoved, when the engagement is attempted to be released by holding the cuttable portion and the holdable piece, the male hook and the female hook in engagement are moved in directions separating from each other to release the engagement. Accordingly, a worker who houses the article can easily open the bag body and house the article.

Further, since the housing worker cuts the cuttable portion to remove the holdable piece after housing the article, when the bag body is attempted to be opened by holding a side of the aperture of the bag body, the pair of belt-shaped bases are moved in opposite directions for shearing the engagement portion. With this movement, the male hook and the female hook of the engagement portion are brought into engagement with each other, so that the engagement cannot be released. Moreover, even if the engagement is attempted to be released by holding the first end of the zipper tape which is not bonded to the bag body, the holdable piece is cut away from the base end of the engagement portion to be unholdable. Accordingly, after the article is housed in the bag body, the engagement portion is brought into engagement and the holdable piece is removed by cutting the cuttable portion, an opening operation per se is impossible, so that the article is further prevented from being tampered.

Herein, in order to prevent the article from being tampered, it is conceivable to seal the open end of the bag body in which the article is housed by heat-sealing, ultrasonic sealing and the like. However, since a sealer is sometimes not prepared in a retail shop and the like, an easy use of the sealer is not possible. In contrast, in the zipper tape-equipped bag according to the above arrangement, since it is only necessary to bring the engagement portion into engagement when closing the open end of the bag body after housing the article, the sealing operation can be easily conducted without using the sealer.

Subsequently, since the holdable pieces are removed from both of the belt-shaped bases, both of the belt-shaped bases not bonded to the bag body are shortened. Accordingly, the first end of the at least one of the belt-shaped base not bonded to the bag body can be prevented from being present as a free end in a vicinity of the aperture of the bag body. With this arrangement, since the free end can be prevented from being an obstacle at the housing operation to facilitate the housing operation of the article and the free end is difficult to hold, it can be prevented that the bag is opened by holding the free end, so that the tamper resistance is more improvable.

Specifically, the zipper tape includes: the engagement portion including a pair of the male hook and the female hook engageable with each other; and a pair of belt-shaped bases continuously provided to the engagement portion. The zipper tape is bonded to an inner surface of the bag body. Both of the belt-shaped bases respectively having the male hook and the female hook includes: the cuttable portion continuously provided at a longitudinal edge of each of the belt-shaped bases and positioned at the base end of the engagement portion; and the holdable piece continuously provided to the cuttable portion.

In the above arrangement, it is preferable that the holdable piece extending from the cuttable portion toward near the aperture of the bag body is removed from the zipper tape, and the bag body is cut along the cuttable portion in the zipper tape.

With this arrangement, since the cuttable portion and the holdable piece are removed and the bag body is cut along the cuttable portion, the end of the engagement portion on the opposite side from the side where the article is housed is substantially flush with the open end of the bag body 10, so that the region of the zipper tape from the engagement portion to the open end of the bag body cannot be held. Accordingly, after the article is housed in the bag body and the engagement portion is brought into engagement, the engagement cannot be released and the opening operation per se is impossible, so that the article is further prevented from being tampered.

According to a still further aspect of the invention, a zipper tape-equipped bag includes: a bag body including an aperture and a housing space in which an article is housed; a zipper tape bonded to an inner surface of the bag body and including: an engagement portion including a pair of a male hook and a female hook engageable with each other; and a pair of first and second belt-shaped bases continuously provided to the engagement portion, in which the first belt-shaped base provided with the male hook or the female hook includes: a cuttable portion continuously provided at a longitudinal edge of the first belt-shaped base and positioned at a base end of the engagement portion; and a holdable piece continuously provided to the cuttable portion, in which the zipper tape is bonded such that an end of the zipper tape to which the cuttable portion and the holdable piece are provided is positioned near the aperture of the bag body with respect to the engagement portion, and only in the first belt-shaped base including the cuttable portion, a region from a position where the first belt-shaped base is continuously provided to the engagement portion to an end near the aperture of the bag body is not bonded to the bag body.

In the above aspect of the invention, the holdable piece can be removed from one of the belt-shaped bases using the cuttable portion of the zipper tape. While the cuttable portion is not cut and the holdable piece remains unremoved, when the engagement is attempted to be released by holding the cuttable portion and the holdable piece, the male hook and the female hook in engagement are moved in directions separating from each other to release the engagement. Accordingly, the worker housing the article can easily open the bag body and house the article.

Further, since the housing worker cuts the cuttable portion to remove the holdable piece after housing the article, when the bag body is attempted to be opened by holding a side of the aperture of the bag body, the pair of belt-shaped bases are moved in opposite directions for shearing the engagement portion. With this movement, the male hook and the female hook of the engagement portion are brought into engagement with each other, so that the engagement cannot be released. Moreover, even if the engagement is attempted to be released by holding the first end of the zipper tape which is not bonded to the bag body, the holdable piece is cut away from the base end of the engagement portion to be unholdable. Accordingly, after the article is housed in the bag body, the engagement portion is brought into engagement, and the holdable piece is removed by cutting the cuttable portion, an opening operation per se is impossible, so that the article is further prevented from being tampered.

Moreover, since the holdable piece is removed from the one of the belt-shaped base, the one of the belt-shaped bases not bonded to the bag body is shorter than the rest of the belt-shaped bases. Accordingly, the first end of the one of the belt-shaped base not bonded to the bag body can be prevented from being present as a free end in a vicinity of the aperture of the bag body. With this arrangement, since the free end can be prevented from being an obstacle at the housing operation to facilitate the housing operation of the article and the free end is difficult to hold, it can be prevented that the bag is opened by holding the free end, so that the tamper resistance is more improvable.

Specifically, the zipper tape includes: the engagement portion including a pair of the male hook and the female hook engageable with each other; and a pair of belt-shaped bases continuously provided to the engagement portion. The zipper tape is bonded to an inner surface of the bag body. One of the belt-shaped bases respectively having the male hook and the female hook includes: the cuttable portion continuously provided at a longitudinal edge of the one of the belt-shaped bases and positioned at the base end of the engagement portion; and the holdable piece continuously provided to the cuttable portion.

In the above arrangement, it is preferable that the cuttable portion of the zipper tape is provided at such a position that at least one of the belt-shaped bases from a position where one or both of the belt-shaped bases is continuously provided to the engagement portion to the cuttable portion is unholdable when the cuttable portion is cut to remove the holdable piece.

With this arrangement, while the cuttable portion is not cut and the holdable piece remains unremoved, the holdable piece is provided at such a position that the belt-shaped base from the position where the belt-shaped base is continuously provided to the engagement portion to the cuttable portion cannot be held. Accordingly, the engagement portion in engagement is difficult to release and the tamper resistance is improvable.

In the above arrangement, the male hook or the female hook continuously provided to one or both of the belt-shaped bases including the cuttable portion protrudes toward the engaging female or male hook, the male hook or the female hook including a first male claw or a first female claw having an inclined surface facing one or both of the belt-shaped bases, and the first male claw or the first female claw is formed such that an angle a formed between a tangent line of the inclined surface and a perpendicular line of one or both of the belt-shaped bases is 90 degrees or more.

In the above aspect of the invention, since the first male claw or the first female claw protruding at a predetermined angle a, in other words, in a shape of a mountain is provided to the male hook or the female hook of the engagement portion, when the engagement of the engagement portion is released by holding the unremoved holdable piece of the belt-shaped base, the engaging male claw and the engaged female claw are moved in directions separating from each other to release the mesh, so that the engagement can be easily released. Accordingly, the housing operation of the article can be easily conducted in the arrangement of the bag in which the zipper tape is attached to the bag body.

In the above arrangement, it is preferable that the male hook having the first male claw or the female hook having the first female claw protrude toward the female hook or the male hook and includes a second male claw or a second female claw having an inclined surface facing the belt-shaped base, and the second male claw or the second female claw is formed such that an angle β formed between a tangent line of the inclined surface and a perpendicular line of the belt-shaped base is 90 degrees or less.

With this arrangement, since the second female claw or the second male claw protruding at a predetermined angle β, in other words, in a shape of a hook in a manner to be folded toward the belt-shaped base is provided to the other female hook or male hook of the engagement portion, the engaging force by the engagement of the second female claw or the second male claw can be reinforced in addition to the engagement of the first male claw or the first female claw, so that the tamper resistance can be improved.

In the above arrangement, it is preferable that the cuttable portion is formed thin in a step dented from a surface of the belt-shaped base opposite from a surface on which the engagement portion is continuously formed.

With this arrangement, since the cuttable portion is formed thin in a step dented from the surface of the belt-shaped base opposite from the surface on which the engagement portion is continuously formed, when the belt-shaped base is bonded to another material such as the base film, the cuttable portion is prevented from being bonded to the material and the holdable piece can be easily removed by cutting the cuttable portion.

In the above arrangement, it is preferable that the belt-shaped base provided with the cuttable portion includes a cut portion that is positioned inner than bonding portions provided at both longitudinal ends of the belt-shaped base, the cut portion being a cutout or a thin portion extending from the cuttable portion to the first end of the holdable piece near the aperture of the bag body.

With this arrangement, since the cut portions in a form of a cutout or a thin portion are respectively positioned inner than the bonding portions provided at the both longitudinal edges of the belt-shaped base so that the cut portions extend from the cuttable portion to the holdable piece, both longitudinal edges of a cut piece, which is obtained by cutting the cuttable portion to remove the holdable piece in order to prevent the article from being tampered, can be easily cut at the cut portion, so that the holdable piece can be easily cut away using the cuttable portion.

Herein, the bonding portion refers to a portion where the longitudinal ends of the zipper tape are bonded to the bag body, such as a side seal portion, an end of a melt-cut seal portion, and a sealed portion by thermocompression in a gap between the longitudinal ends of the zipper tape and the bag body.

In the above arrangement, it is preferable that the holdable piece is removal by cutting the cuttable portion.

With this arrangement, since the cuttable portion and the holdable piece are removed, when the bag body is attempted to be opened by holding the side of the aperture of the bag body after the article is housed and the engagement is brought into engagement, the pair of belt-shaped bases are moved in opposite directions for shearing the engagement portion. With this movement, the male hook and the female hook of the engagement portion are brought into engagement with each other, so that the engagement cannot be released. Accordingly, after the article is housed in the bag body and the engagement portion is brought into engagement, the opening operation per se is impossible, so that the article is further prevented from being tampered.

In the above arrangement, it is preferable that the engagement portion includes a plurality of engagement portions, at least one of the engagement portions other than the engagement portion near the cuttable portion includes an engaging male claw or an engaged female claw that projects toward the female hook or the male hook to be engaged and has an inclined surface opposing the belt-shaped base, and the engaging male claw or the engaged female claw is formed such that an angle formed between a tangent line of the inclined surface and a perpendicular line of the belt-shaped base is 90 degrees or less.

With this arrangement, the engaging male claw or the engaged female claw protruding at a predetermined angle θ, in other words, in a shape of a hook in a manner to be folded toward the belt-shaped base, is provided as the engagement portion other than the engagement portion near the cuttable portion. Accordingly, when the engagement of the engagement portion is released after the cuttable portion is cut to remove the holdable piece, the engaging male claw and the engaged female claw are firmly engaged with each other, so that the engagement can be prevented from being released to further prevent the article from begin tampered.

In the above arrangement, it is preferable that the engagement portion includes a plurality of engagement portions.

With this arrangement, since the plurality of the engagement portions are provided, an engaging force is increased to prevent the article from being tampered.

In the above arrangement, it is preferable that at least one of the belt-shaped bases of the zipper tape includes a deformable portion that is positioned between the plurality of engagement portions and is bendable in a thickness direction of the belt-shaped base by a stress smaller than a bending stress to be applied in the thickness direction.

With this arrangement, when the engagement of the engagement portion is released by holding the holdable piece, which is not yet cut, of the belt-shaped base, the belt-shaped base is bent at the deformable portion in a direction releasing the engagement to move the engaging male claw and female claw in directions separating from each other, so that the engagement can be easily released. Accordingly, the housing operation of the article can be easily conducted in the arrangement of the bag in which the zipper tape is attached to the bag body.

In the above arrangement, it is preferable that the belt-shaped base includes a rib protruding from a surface of the belt-shaped base opposite from the surface on which the engagement portion is continuously formed.

With this arrangement, since the rib protrudes from the surface of the belt-shaped base opposite from the surface on which the engagement portion is continuously formed, when the belt-shaped base is fused to another material such as a base film, the rib is ahead brought into contact with the another material, thereby providing stable fusion characteristics.

In a still further aspect of the invention, an article housing method of housing an article into the zipper tape-equipped bag according to the above aspect of the invention includes: housing the article into the housing space from the aperture of the bag body; and bringing the engagement portion of the zipper tape into engagement after housing the article.

With this arrangement, since the engagement portion is brought into engagement after the article is housed in the bag body, when the bag body is attempted to be opened by holding the side of the aperture of the bag body, the pair of belt-shaped bases are moved in opposite directions for shearing the engagement portion. With this movement, the male hook and the female hook of the engagement portion are brought into engagement with each other, so that the engagement cannot be released. Accordingly, after the article is housed in the bag body and the engagement portion is brought into engagement, the opening operation per se is impossible, so that the article is further prevented from being tampered.

In a still further aspect of the invention, an article housing method of housing an article into the zipper tape-equipped bag according to the above aspect of the invention includes: opening the aperture of the bag body; housing the article into the bag body, the aperture of which has been opened; bringing the engagement portion of the zipper tape into engagement after housing the article; and cutting the cuttable portion to remove the holdable piece extending from the cuttable portion to the end of the belt-shaped base of the zipper tape near the aperture of the bag body, after housing the article.

In the above aspect of the invention, after the aperture of the bag body is opened and the article is housed, the engagement portion is brought into engagement and the cuttable portion is cut to remove the cuttable portion, the holdable piece and the corresponding parts of the bag body near the aperture. With this operation, the end of the engagement portion opposite from the housed article becomes substantially flush with the open end of the bag body. Accordingly, even when the engagement of the engagement portion after the article is housed is attempted to be released, the opening operation per se is impossible since the engagement portion of the zipper tape and the open end of the bag body cannot be held. Accordingly, the article is prevented from being tampered.

Herein, opening the aperture in the opening step includes opening the aperture of the bag body with the engagement portion being in non-engagement, and opening the aperture of the bag body while releasing an engaging part of the engagement portion that is at least partially in non-engagement. Moreover, the engaging step may be performed prior to the cutting step, or alternatively, the cutting step may be performed prior to the engaging step.

In a still further aspect of the invention, an article housing method of housing an article into the zipper tape-equipped bag according to the above aspect of the invention includes: opening the aperture of the bag body by holding the holdable piece that is continuously provided to one of the belt-shaped bases and is not bonded to the bag body while holding a side near the aperture of the bag body attached with the other of the belt-shaped bases; housing the article into the bag body after opening the aperture of the bag body; bringing the engagement portion of the zipper tape into engagement after housing the article; and cutting the cuttable portion to remove the holdable piece of the one of the belt-shaped bases that is not bonded to the bag body after housing the article.

In the above aspect of the invention, after the aperture of the bag body is opened and the article is housed, the engagement portion is brought into engagement and the cuttable portion is cut to remove the cuttable portion. With this arrangement, when the bag body is attempted to be opened by holding the side of the aperture of the bag body after the article is housed and the engagement is brought into engagement, the pair of belt-shaped bases are moved in opposite directions for shearing the engagement portion. With this movement, the male hook and the female hook of the engagement portion are brought into engagement with each other, so that the engagement cannot be released. Moreover, even if the engagement is attempted to be released by holding the first end of the zipper tape which is not bonded to the bag body, the holdable piece is cut away from the base end of the engagement portion to be unholdable. Accordingly, after the article is housed in the bag body, the engagement portion is brought into engagement, and the holdable piece is removed by cutting the cuttable portion, an opening operation per se is impossible, so that the article is further prevented from being tampered.

Herein, opening the aperture in the opening step includes opening the aperture of the bag body with the engagement portion being in non-engagement, and opening the aperture of the bag body while releasing an engaging part of the engagement portion. Moreover, the engaging step may be performed prior to the cutting step, or alternatively, the cutting step may be performed prior to the engaging step.

According to a still further aspect of the invention, a manufacturing method of a zipper tape-equipped bag includes: a bag body formed by overlaying a base film; and a zipper tape bonded to the bag body and including: an engagement portion including a pair of a male hook and a female hook engageable with each other; and a pair of first and second belt-shaped bases continuously provided to the engagement portion, the manufacturing method including: bonding the first belt-shaped base to the bag body at least at a first end near the aperture of the bag body and a second end near the housing space of the bag body, and bonding the second belt-shaped base to the bag body at a second end near the housing space of the bag body without bonding the second belt-shaped base to the bag body at a first end near the aperture of the bag body.

In the above aspect of the invention, since a region of the first belt-shaped base near the first and second ends with respect to the engagement portion is bonded to the bag body to be fixed to the bag body, when the male and female hooks are brought into engagement after the article is housed, an insufficient engagement because of deviation in position is preventable and an engageability is improvable, so that a tamper-proof function is attainable. Further, since the first end of the second belt-shaped base near the aperture of the bag body is not bonded to the bag body, when the bag body of the manufactured zipper tape-equipped bag is attempted to be opened, the pair of belt-shaped bases are moved in opposite directions for shearing the engagement portion. With this movement, an opening force acts in such directions as to engage the male hook with the female hook, so that it is preventable that the engagement is released to open the bag body. Accordingly, after the article is housed in the bag body and the engagement portion is brought into engagement, the opening operation per se is impossible, so that the zipper tape-equipped bag capable of preventing the article from being tampered can be manufactured.

According to a still further aspect of the invention, A manufacturing method of a zipper tape-equipped bag includes: a bag body formed by overlaying a base film; and a zipper tape bonded to the bag body and including: an engagement portion including a pair of a male hook and a female hook engageable with each other; and a pair of first and second belt-shaped bases continuously provided to the engagement portion, the manufacturing method including: bonding the first belt-shaped base to the bag body at least from a position where the first belt-shaped base is continuously provided to the engagement portion toward a first end near the aperture of the bag body and a second end near the housing space, and bonding the second belt-shaped base to the bag body at a second end near the housing space of the bag body without bonding the second belt-shaped base to the bag body at a first end near the aperture of the bag body.

In the above aspect of the invention, since a region of the first belt-shaped base near the first and second ends with respect to the engagement portion is bonded to the bag body to be fixed to the bag body, when the male and female hooks are brought into engagement after the article is housed, an insufficient engagement because of deviation in position is preventable and an engageability is improvable, so that a tamper-proof function is attainable. Further, since the first end of the second belt-shaped base near the aperture of the bag body is not bonded to the bag body, when the bag body is attempted to be opened, the pair of belt-shaped bases are moved in opposite directions for shearing the engagement portion. With this movement, an opening force acts in such directions as to engage the male hook with the female hook, so that it is preventable that the engagement is released to open the bag body and the tamper resistance is improvable.

In the above arrangement, it is preferable that the male hook or the female hook of the second belt-shaped base includes claws respectively protruding toward the aperture and the housing space, and the first belt-shaped base includes an engageable claw protruding toward the housing space and configured to engage at least with one of the claws protruding toward the aperture.

With this arrangement, by using the zipper tape including the claws that are provided in the male hook or the female hook of the second belt-shaped base, respectively protrude toward the aperture and the housing space, and are configured to engage with or disengage from the engageable claw provided in the first belt-shaped base, the engagement can be more reinforced, thereby further improving the tamper resistance.

In the above arrangement, it is preferable that the second belt-shaped base is not bonded to the bag body at least from the position where the second belt-shaped base is continuously provided to the engagement portion to the first end near the aperture of the bag body.

With this arrangement, since the second belt-shaped base is not bonded to the bag body at least from the position, where the second belt-shaped base is continuously provided to the engagement portion, to the first end near the aperture of the bag body, when the bag body of the manufactured zipper tape-equipped bag is attempted to be opened, the pair of belt-shaped bases are moved in opposite directions for shearing the engagement portion, so that the zipper tape-equipped bag capable of preventing the article from being tampered can be manufactured.

In the above arrangement, it is preferable that a length of the second belt-shaped base from the position where the second belt-shaped base is continuously provided to the engagement portion to the first end near the opening of the bag body is shorter than a length of the first belt-shaped base from the position where the first belt-shaped base is continuously provided to the engagement portion to the first end near the opening of the bag body.

With this arrangement, by using the zipper tape in which the length of the second belt-shaped base, which is not bonded to the bag body, from the position where the second belt-shaped base is continuously provided to the engagement portion to the first end thereof near the aperture of the bag body is shorter than the length of the first belt-shaped base from the position where the first belt-shaped base is continuously provided to the engagement portion to the first end thereof near the aperture of the bag body, the first end of the second belt-shaped base not bonded to the bag body can be prevented from being present as a free end in a vicinity of the aperture of the bag body. With this arrangement, since the free end can be prevented from being an obstacle at the housing operation to facilitate the housing operation of the article and the free end is difficult to hold, it can be prevented that the bag is opened by holding the free end, so that the tamper resistance is more improvable.

In the above arrangement, it is preferable to cut the second belt-shaped base such that the length of the second belt-shaped base from the position where the second belt-shaped base is continuously provided to the engagement portion to the first end near the aperture of the bag body is shorter than the length of the first belt-shaped base from the position where the first belt-shaped base is continuously provided to the engagement portion to the first end near the aperture of the bag body.

With this arrangement, by cutting the second belt-shaped base so that the length of the second belt-shaped base from the position where the second belt-shaped base is continuously provided to the engagement portion to the first end thereof near the aperture of the bag body is shorter than the length of the first belt-shaped base from the position where the first belt-shaped base is continuously provided to the engagement portion to the first end thereof near the aperture of the bag body, the first end of the second belt-shaped base not bonded to the bag body can be prevented from being present as a free end in a vicinity of the aperture of the bag body, thereby facilitating the housing operation of the article. Moreover, if the first end of the second belt-shaped base is not yet cut, even when the article is erroneously housed, the engagement of the engagement portion can be released by opening the bag by holding the portion present as the free end. Accordingly, by cutting the first end after again housing the article, the article is prevented from being tampered. Thus, the tamper-proof zipper tape-equipped bag into which the article can be easily housed can be manufactured.

In the above arrangement, it is preferable that the length of the second belt-shaped base from the position where the second belt-shaped base is continuously provided to the engagement portion to the first end near the aperture of the bag body is a length for the second belt-shaped base to be unholdable.

With this arrangement, since the first end not bonded to the bag body is short enough to be unholdable, when the bag body of the manufactured zipper tape is attempted to be opened, the pair of belt-shaped bases are moved in opposite directions for shearing the engagement portion, so that the zipper tape-equipped bag preventing the article from being tampered can be manufactured.

In the above arrangement, it is preferable to provide an opening cut portion closer to the housing space with respect to the engagement portion.

With this arrangement, since the engagement portion in engagement is cut by the opening cut portion, the housed article can be taken out. Thus, the tamper-proof zipper tape-equipped bag that is easily openable by a user can be manufactured.

According to a still further aspect of the invention, a manufacturing method of manufacturing a zipper tape-equipped bag by bonding a zipper tape on an inner surface of a bag body formed by overlaying a base film includes: using the zipper tape including: an engagement portion including a pair of a male hook and a female hook engageable with each other; and a pair of first and second belt-shaped bases continuously provided to the engagement portion, in which at least the first belt-shaped base having the male hook or the female hook includes: a cuttable portion continuously provided at a longitudinal edge of the first belt-shaped base and positioned at a base end of the engagement portion; and a holdable piece continuously provided to the cuttable portion, disposing the first belt-shaped base including the holdable piece connected through the cuttable portion on the base film such that the holdable piece is positioned closer to the aperture of the bag body than the engagement portion; bonding the first belt-shaped base including the holdable piece onto the base film only in a region from a position where the first belt-shaped base is continuously provided to the engagement portion to an inner side of the bag body; and bonding the second belt-shaped base onto the base film at least in a region from the engagement portion toward the aperture of the bag body and in a region from the engagement portion toward the inner side of the bag body.

In the above aspect of the invention, since the first belt-shaped base including the holdable piece connected via the cuttable portion in the zipper tape is bonded onto the base film only in a region from the position where the first belt-shaped base is continuously provided to the engagement portion to the inner side of the bag body, and the second belt-shaped base is bonded onto the base film at least in a region from the engagement portion toward the aperture of the bag body and in a region from the engagement portion toward the inner side of the bag body, only the first end of the first belt-shaped base is not bonded to the base film. With this arrangement, when the engagement is attempted to be released by holding the bag body at the aperture for opening, the male hook and the female hook of the engagement portion are brought into engagement with each other, so that the engagement cannot be released. Accordingly, after the article is housed in the bag body and the engagement portion is brought into engagement, the opening operation per se is impossible, so that the zipper tape-equipped bag capable of preventing the article from being tampered can be manufactured.

In the above arrangement, it is preferable to form a cut portion by cutting the cuttable portion and the holdable piece or collapsing the cuttable portion and the holdable piece to be thin from an exterior surface of the bag body at a position inner than bonding portions provided at both longitudinal ends of the zipper tape, after forming the bag body by overlaying the base film bonded with the zipper tape.

With this arrangement, since the cut portions in a form of a cutout or a thin portion are respectively positioned inner than the bonding portions provided at the both longitudinal ends of the zipper tape so that the cut portions extend from the cuttable portion to the holdable piece, when the holdable piece is removed using the cuttable portion in order to prevent the article from being tampered, the holdable piece can be easily cut away using the cuttable portion. With this arrangement, the holdable piece can be easily removed using the cuttable portion, thereby improving a productivity of the housing operation of the article into the tamper-proof zipper tape-equipped bag.

In the above arrangement, it is preferable to use the zipper tape including a plurality of engagement portions.

With this arrangement, by using the zipper tape including the plurality of engagement portions, an engaging force can be increased, so that the zipper tape-equipped bag capable of further preventing the article from being tampered can be manufactured.

According to a still further aspect of the invention, a manufacturing device of a zipper tape-equipped bag includes: a bag body formed by overlaying a base film; and a zipper tape bonded to the bag body and including: an engagement portion including a pair of a male hook and a female hook engageable with each other; and a pair of first and second belt-shaped bases continuously provided to the engagement portion, the manufacturing device including: an arranging portion configured to dispose the zipper tape onto the base film; and an attaching portion configured to bond the first belt-shaped base to the bag body at least at a first end near the aperture of the bag body and a second end near the housing space of the bag body, and configured to bond the second belt-shaped base to the bag body at a second end near the housing space of the bag body without bonding the second belt-shaped base to the bag body at a first end near the aperture of the bag body.

In the above aspect of the invention, since the attaching portion bonds a region of the first belt-shaped base near the first and second ends with respect to the engagement portion to the bag body to be fixed to the bag body, when the male and female hooks are brought into engagement after the article is housed, an insufficient engagement because of deviation in position is preventable and an engageability is improvable, so that a tamper-proof function is attainable. Further, since the attaching portion does not bond the first end of the second belt-shaped base near the aperture of the bag body to the bag body, when the bag body of the manufactured zipper tape-equipped bag is attempted to be opened, the pair of belt-shaped bases are moved in opposite directions for shearing the engagement portion. With this movement, an opening force acts in such directions as to engage the male hook with the female hook, so that it is preventable that the engagement is released to open the bag body. Accordingly, after the article is housed in the bag body and the engagement portion is brought into engagement, the opening operation per se is impossible, so that the zipper tape-equipped bag capable of preventing the article from being tampered can be manufactured.

According to a still further aspect of the invention, a manufacturing device of a zipper tape-equipped bag includes: a bag body formed by overlaying a base film; and a zipper tape bonded to the bag body and including: an engagement portion including a pair of a male hook and a female hook engageable with each other; and a pair of first and second belt-shaped bases continuously provided to the engagement portion, the manufacturing device including: an arranging portion configured to dispose the zipper tape onto the base film; and an attaching portion configured to bond the first belt-shaped base to the bag body at least from a position where the first belt-shaped base is continuously provided to the engagement portion toward a first end near the aperture of the bag body and a second end near the housing space, and configured to bond the second belt-shaped base to the bag body at a second end near the housing space of the bag body without bonding the second belt-shaped base to the bag body at a first end near the aperture of the bag body.

In the above aspect of the invention, since the attaching portion bonds a region of the first belt-shaped base near the first and second ends with respect to the engagement portion to the bag body to be fixed to the bag body, when the male and female hooks are brought into engagement after the article is housed, an insufficient engagement because of deviation in position is preventable and an engageability is improvable, so that a tamper-proof function is attainable. Further, since the attaching portion does not bond the first end of the second belt-shaped base near the aperture of the bag body to the bag body, when the bag body of the manufactured zipper tape-equipped bag is attempted to be opened, the pair of belt-shaped bases are moved in opposite directions for shearing the engagement portion. With this movement, an opening force acts in such directions as to engage the male hook with the female hook, so that it is preventable that the engagement is released to open the bag body. Accordingly, after the article is housed in the bag body and the engagement portion is brought into engagement, the opening operation per se is impossible, so that the zipper tape-equipped bag capable of preventing the article from being tampered can be manufactured.

According to a still further aspect of the invention, a manufacturing device of a zipper tape-equipped bag includes: a bag body formed by overlaying a base film; and a zipper tape bonded to the bag body, the zipper tape including: an engagement portion including a pair of a male hook and a female hook engageable with each other; and a pair of belt-shaped bases continuously provided to the engagement portion, in which at least one of the belt-shaped bases respectively having the male hook and the female hook includes: a cuttable portion continuously provided at a longitudinal edge of the at least one of the belt-shaped bases and positioned at a base end of the engagement portion; and a holdable piece continuously provided to the cuttable portion, the manufacturing device including: an arranging portion configured to dispose the at least one of the belt-shaped bases including the holdable piece connected through the cuttable portion on the base film such that the holdable piece is positioned closer to the aperture of the bag body than the engagement portion; a partial attaching portion configured to bond only the first belt-shaped base including the holdable piece onto the base film only in a region from a position where the first belt-shaped base is continuously provided to the engagement portion to an inner side of the bag body; and an entire attaching portion configured to bond the second belt-shaped base onto the base film at least in a region from the engagement portion toward the aperture of the bag body and in a region from the engagement portion toward the inner side of the bag body.

In the above aspect of the invention, since the first belt-shaped base including the thin portion in the zipper tape is bonded onto the base film only in a region from the position where the first belt-shaped base is continuously provided to the engagement portion to the inner side of the bag body, and the second belt-shaped base is bonded onto the base film at least in a region from the engagement portion toward the aperture of the bag body and in a region from the engagement portion toward the inner side of the bag body, the zipper tape-equipped bag in which only the first end of the first belt-shaped base is not bonded to the base film is manufactured. In the zipper tape-equipped bag, when the engagement is attempted to be released by holding the bag body at the aperture for opening, the male hook and the female hook of the engagement portion are brought into engagement with each other, so that the engagement cannot be released. Accordingly, after the article is housed in the bag body and the engagement portion is brought into engagement, the opening operation per se is impossible, so that the zipper tape-equipped bag capable of preventing the article from being tampered can be manufactured.

DESCRIPTION OF EMBODIMENT(S)

An exemplary embodiment of the invention will be described below with reference to the attached drawings. In the description of the embodiment(s), the explanation of the components with the same reference sign will be simplified or omitted.

First Exemplary Embodiment

Arrangement of Tamper-pf Bag

Figure 1:
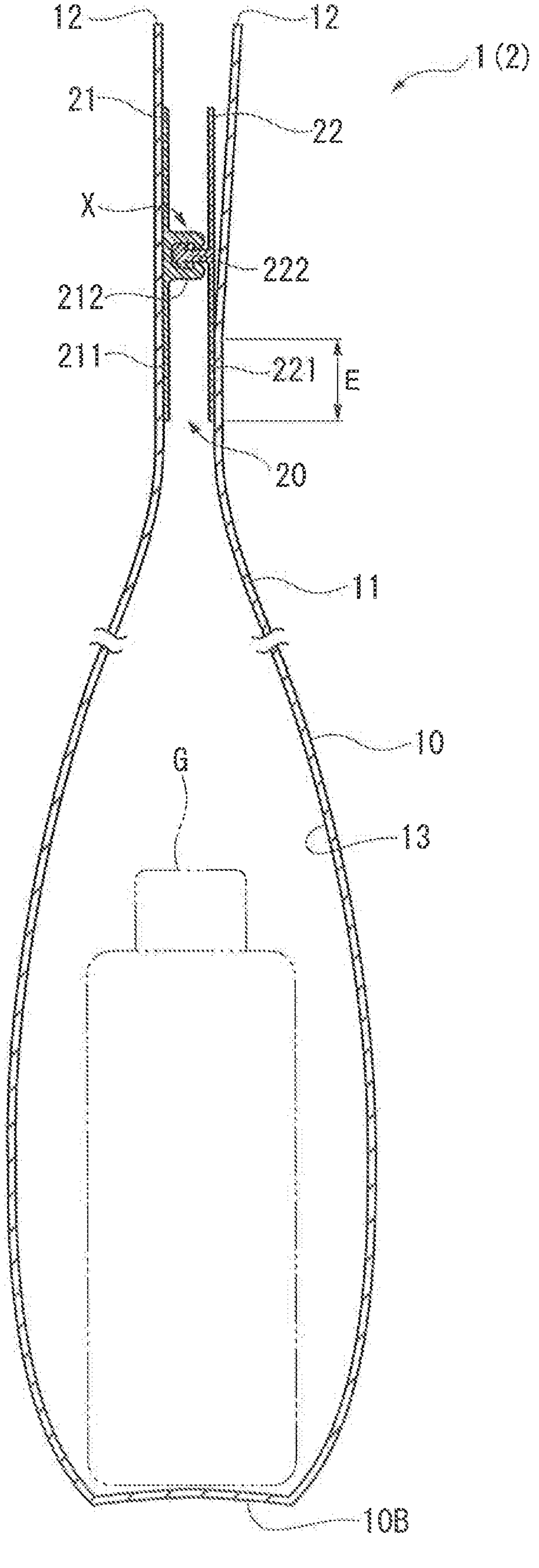
FIG. 1 shows a cross section of a tamper-proof bag according to a first exemplary embodiment of the invention.
Figure 2:
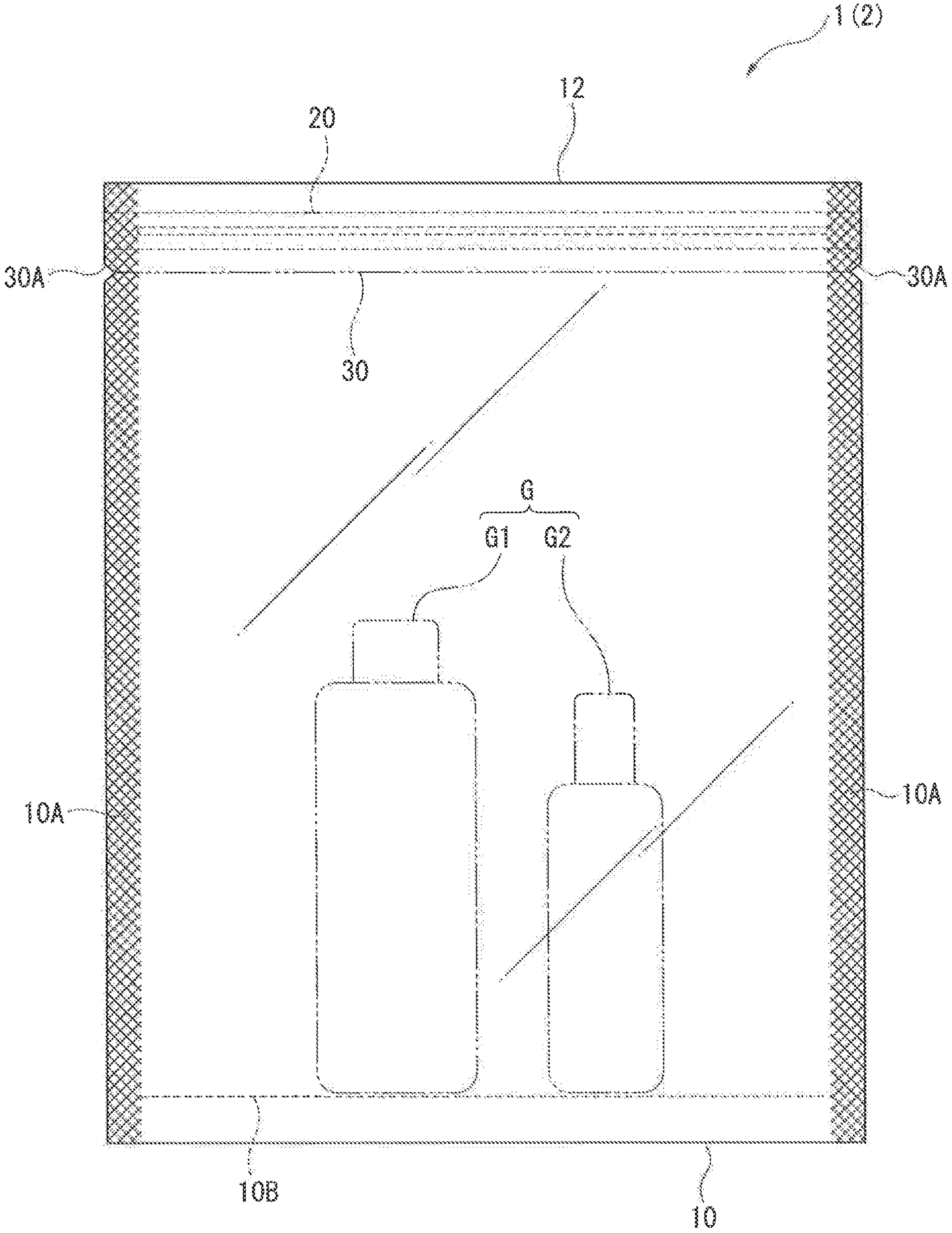
FIG. 2 is a front view of the tamper-proof bag.
Figure 3:
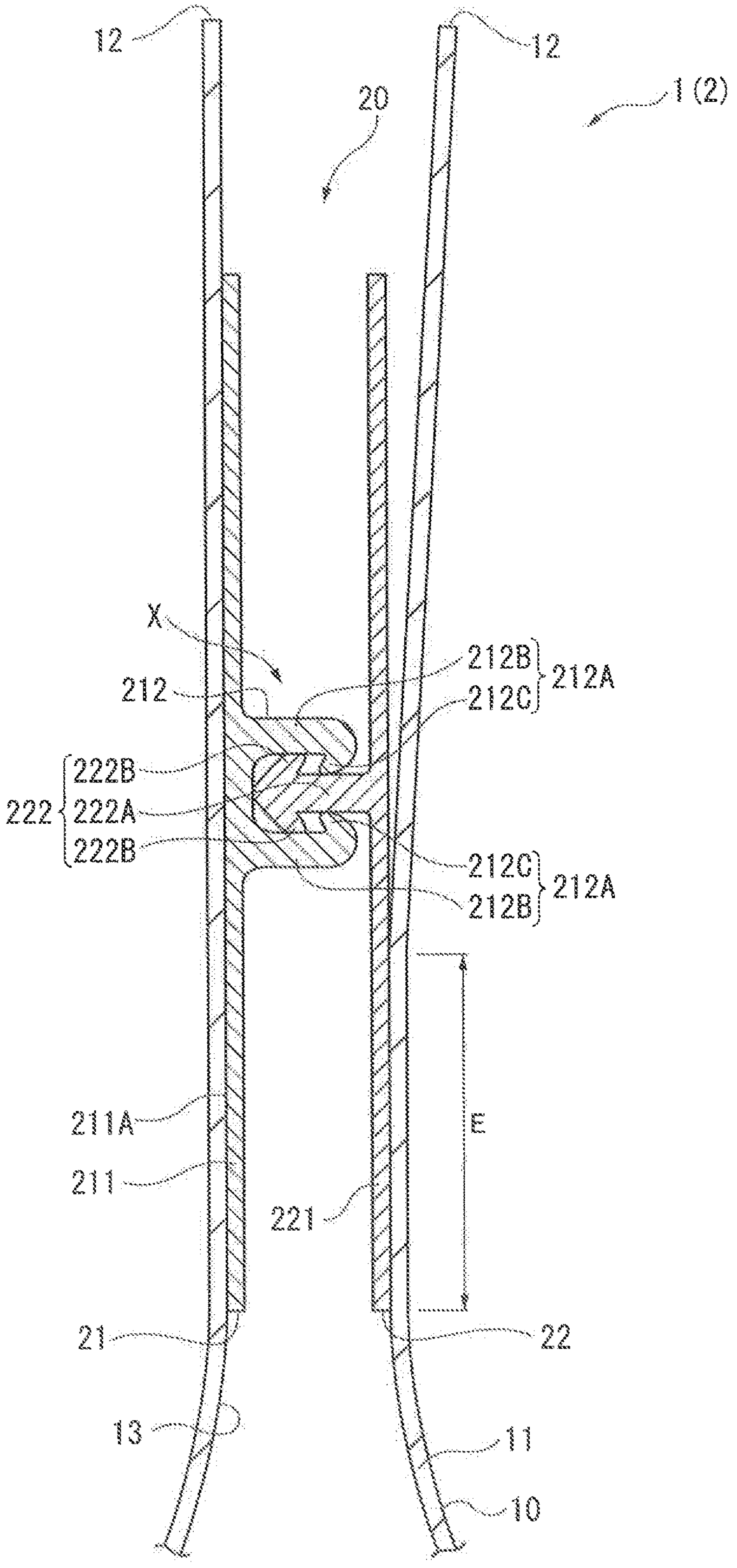
FIG. 3 shows a cross section of a vicinity of a zipper tape of the tamper-proof bag.

As shown in FIGS. 1 to 3, a tamper-proof bag 1 includes a tamper-proof zipper-tape-equipped bag 2 housing an article G.

The article G can be exemplified by various products. In the first exemplary embodiment, two large and small bottles G1, G2 are used.

Arrangement of Tamper-proof Zipper Tape-Equipped Bag

A tamper-proof zipper tape-equipped bag 2 is particularly used as the tamper-proof bag 1 housing the article G and includes: a bag body 10 configured to house the article G; and a tamper-proof zipper tape 20 that is bonded to opposing inner surfaces of the bag body 10. An opening cut portion 30 is provided at a side of the bag body 10 near the article housed therein with respect to the tamper-proof zipper tape 20.

Arrangement of Bag Body

The bag body 10 includes: a base film 11 folded to overlay each other; and a side seal portion 10A formed on each of both edges along a folding direction of the folded base film 11. The bag body 10 has an open end 12 to which the tamper-proof zipper tape 20 is attached, the open end 12 being defined by respective directional edges of overlaid ends in the folding direction of the bag body 10.

A housing space 13 configured to house the article G is defined in the bag body 10. The bag body 10 includes a gusset 10B on a bottom opposite from the open end 12.

It should be noted that, in the first exemplary embodiment, the gusset 10B is not necessarily provided as long as the bag body 10 is openable only from the open end 12. For instance, the bottom of the bag body 10 may be provided only by folding the base film 11, or alternatively, by inserting a bottom material to serve as a standing pouch or by forming a bottom seal portion. A manufacturing of the zipper tape-equipped bag is not limited to folding and overlaying of the base film 11, but may include overlaying two base films and forming the side seal portions 10A and the bottom seal portion, or a butt seam.

As the base film 11, a single-layered or multi-layered film formed of a thermoplastic resin such as linear low density polyethylene (LLDPE) and polypropylene (PP) is usable. As a top surface material of the multi-layered film, biaxially oriented polypropylene (OPP), biaxially oriented polyethylene terephthalate (OPET), biaxially oriented nylon (ONy), cast polypropylene (CPP) and the like are usable. The multi-layered film may include an inorganic layer formed by depositing aluminum, laminating an aluminum foil, and the like.

The base film 11 is not particularly limited as long as being a material for a packaging bag. Preferably, a thickness of the base film 11 is in a range from 10 μm to 200 μm. When the thickness of the base film 11 is less than 10 μm, sealing strength and bag strength may be weakened.

The opening cut portion 30 is used for taking the article G out of the tamper-proof bag 1 and is exemplified by a notch 30A provided at each of the side seal portions 10A of the bag body 10 and a linear cut portion stretching between the notches 30A.

Examples of the linear cut portion include: a linear cut portion integrally formed with each of a female tape member 21 and a male tape member 22 of the zipper tape 20; a linear cut film provided apart from the female tape member 21 and the male tape member 22; and a cutting line formed by a laser processing, a perforating processing and the like.

Arrangement of Zipper Tape

FIG. 3 shows a detailed arrangement of the zipper tape 20.

As shown in FIG. 3, the tamper-proof zipper tape 20 includes the female tape member 21 and the male tape member 22 in parallel to the open end 12.

A direction perpendicular to a longitudinal direction of each of the female tape member 21 and the male tape member 22 is defined as a width direction (top-bottom direction in FIG. 3). A first (upward) direction of the width direction is toward the open end 12 and a second (downward) direction of the width direction is toward the housing space 13. In the exemplary embodiment, the female tape member 21 is placed on a left side of FIG. 3 and the male tape member 22 is placed on a right side of FIG. 3.

The female tape member 21 includes: a female belt-shaped base 211; and a female hook 212 continuously formed substantially at the center in the width direction on a surface of the female belt-shaped base 211.

The female belt-shaped base 211 in a form of a flat plate has a bonding surface 211A bonded to an inner surface of the bag body 10, the bonding surface 211A being an opposite surface from the surface where the female hook 212 is formed.

The female hook 212 has a pair of opposing female components 212A. Each of the female components 212A includes: a protrusion 212B protruding from a flat surface of the female belt-shaped base 211; and female claws 212C (engageable claws) integrally formed with a tip end of the protruding protrusion 212B and respectively protruding only in directions approaching each other. The female claw 212C is formed such that a tip end thereof is folded toward the female belt-shaped base 211.

The male tape member 22 includes: a male belt-shaped base 221 placed facing the female belt-shaped base 211; and a male hook 222 continuously formed substantially at the center in the width direction on a surface of the male belt-shaped base 221 and configured to be engaged with and disengaged from the female hook 212. The female hook 212 and the male hook 222 configured to be engaged with each other define an engagement portion X.

The male belt-shaped base 221 is in a form of a flat plate. An end of the male belt-shaped base 221 near the open end 12 is not attached to the bag body 10 and is spaced from the open end 12 of the bag body 10. Specifically, in the male belt-shaped base 221, at least a region from a position of the continuously formed male hook 222 to an end near the edge of the open end 12 of the bag body 10 is not attached to the bag body 10, but the male belt-shaped base 221 is bonded to the bag body 10 only in a bonding region E excluding a region where the male hook 222 is formed and including an end (a lower edge in FIG. 3) of the male belt-shaped base 221 near the housing space 13.

The male hook 222 having an arrowhead-shaped cross section includes: a protrusion 222A protruding from a flat surface of the male belt-shaped base 221; and a male claw 222B (claw) protruding from a tip end of the protrusion 222A toward each of the housing space 13 and the open end 12. The male claw 222B is formed such that a tip end thereof is folded toward the male belt-shaped base 221.

The zipper tape 20 is formed, for instance, using a polyolefin resin. The zipper tape 20 may be formed with a form retention capability to retain a current bent state of the zipper tape 20 when the zipper tape 20 is bent relative to the longitudinal direction.

The polyolefin resin is preferably a polyethylene resin such as a low-density polyethylene or a linear low-density polyethylene, and a polypropylene resin. Particularly, the polypropylene resin is preferable in terms of a high rigidity and less deformation. Examples of the polypropylene resin include homo-polypropylene (H-PP), block polypropylene (B-PP), random polypropylene (RPP), and propylene-ethylene-butene-1-random ternary copolymer.

Manufacturing Method and Manufacturing Device of Zipper Tape-Equipped Bag

Various methods are applicable to manufacturing of the zipper tape-equipped bag 2.

For instance, the female tape member 21 and the male tape member 22 are formed by extrusion in advance. The respective bonding regions of the female tape member 21 and the male tape member 22 are heat-sealed on both the ends of the base film 11, so that the zipper tape 20 is bonded to the bag body 10, for instance, by welding. The bonding is not limited to the welding, but various methods such as a welding by ultrasonic waves and an attachment by an adhesive are applicable to the bonding.

Subsequently, the gusset 10B is formed by folding the base film 11 and the side seal portion 10A is formed by heat-sealing. Subsequently, the opening cut portion 30 is formed on the bag body 10.

Figure 4:
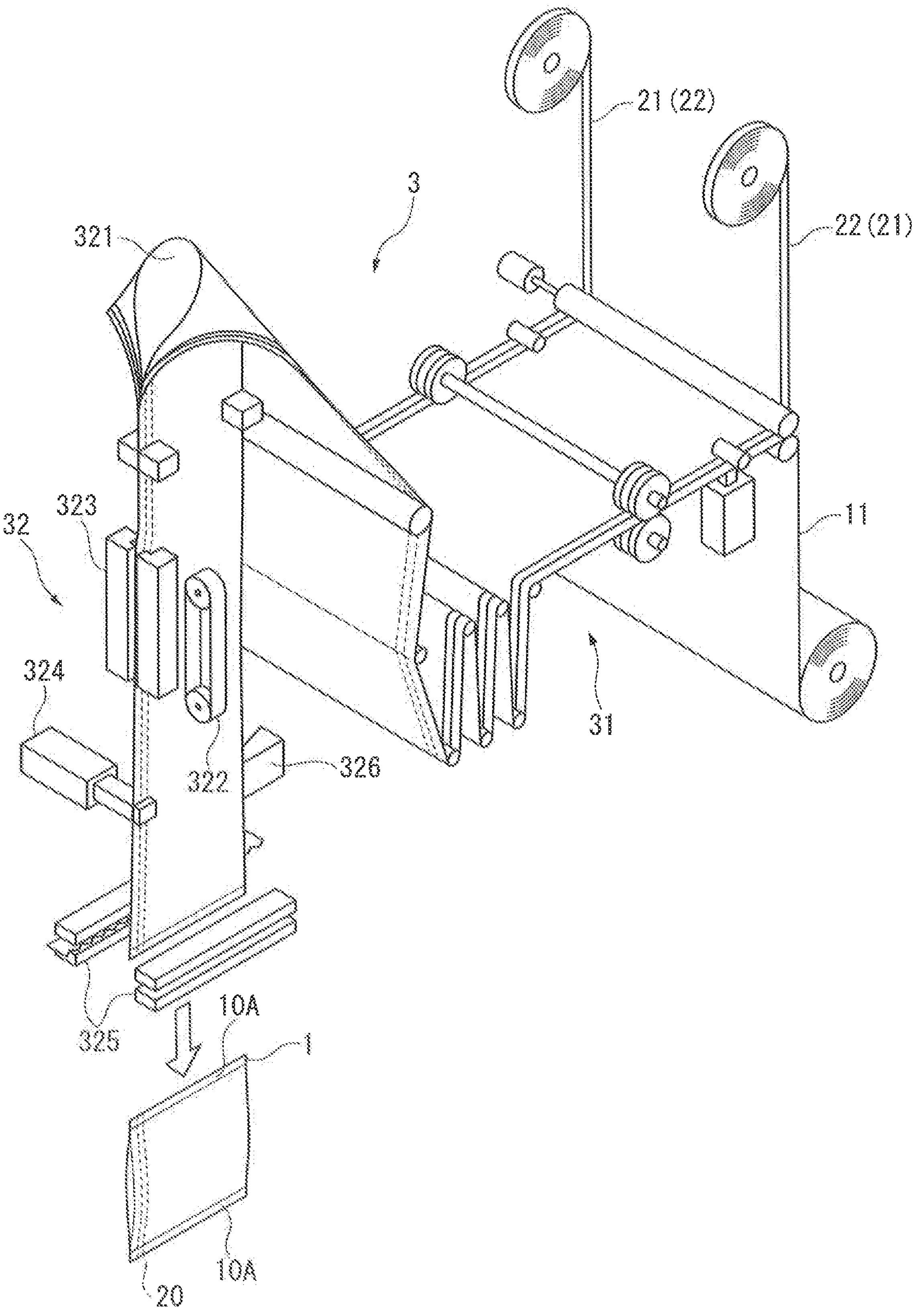
FIG. 4 is a schematic illustration showing a manufacturing device of a zipper tape-equipped bag.

A device shown in FIG. 4 is applicable to a device for thus manufacturing the zipper tape-equipped bag 2.

A manufacturing device 3, which is a so-called vertical-pillow-bag manufacturing device, includes: an arranging portion 31 configured to feed the female tape member 21 and the male tape member 22 and dispose the female tape member 21 and the male tape member 22 on the fed base film 11; and an attaching portion 32 configured to attach the female tape member 21 and the male tape member 22 to the base film 11 by welding.

The attaching portion 32 includes: a cylindrical former 321 around which the base film 11 is wrapped; a feed belt 322; a seal bar 323 configured to heat-seal the male belt-shaped base 221 in the bonding region E and the female belt-shaped base 211 near the open end 12 and near the housing space 13 with respect to engagement portions X, Y; a punching portion 324 configured to form the notch 30A; a side seal bar 325 configured to form the side seal portion 10A; and a jig 326 configured to form the gusset 10B.

Housing Method of Article

Next, an article housing method of housing the article G into the zipper tape-equipped bag 2 will be described below with reference to the attached drawings.

Figure 5A:
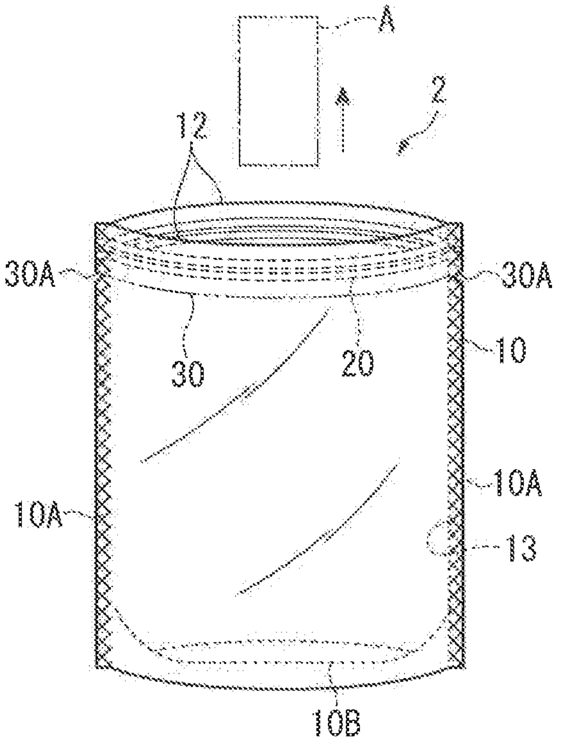
FIG. 5A shows a concept for explaining an article-housing method of housing an article into the zipper tape-equipped bag and especially shows an opening step.
Figure 5B:
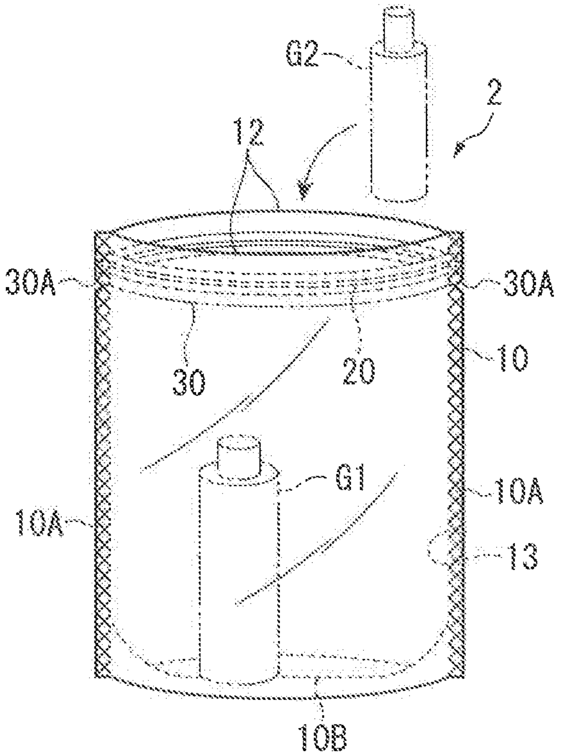
FIG. 5B shows the concept for explaining the article-housing method of housing an article into the zipper tape-equipped bag and especially shows a housing step.
Figure 5C:
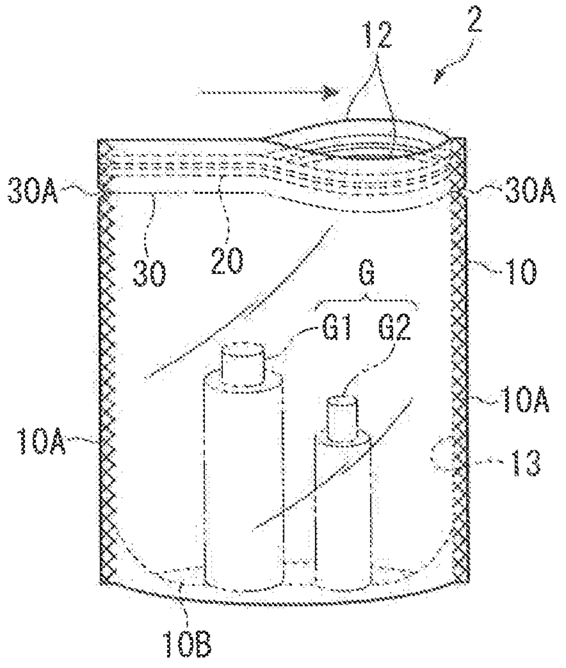
FIG. 5C shows the concept for explaining the article-housing method of housing an article into the zipper tape-equipped bag and especially shows an engaging step.
Figure 5D:
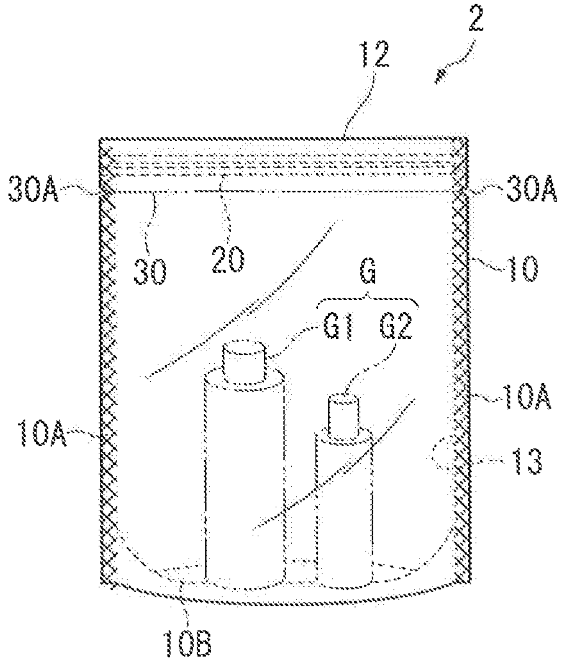
FIG. 5D shows the concept for explaining the article-housing method of housing an article into the zipper tape-equipped bag and especially shows a tamper-proof bag after housing the article.
Figure 6:
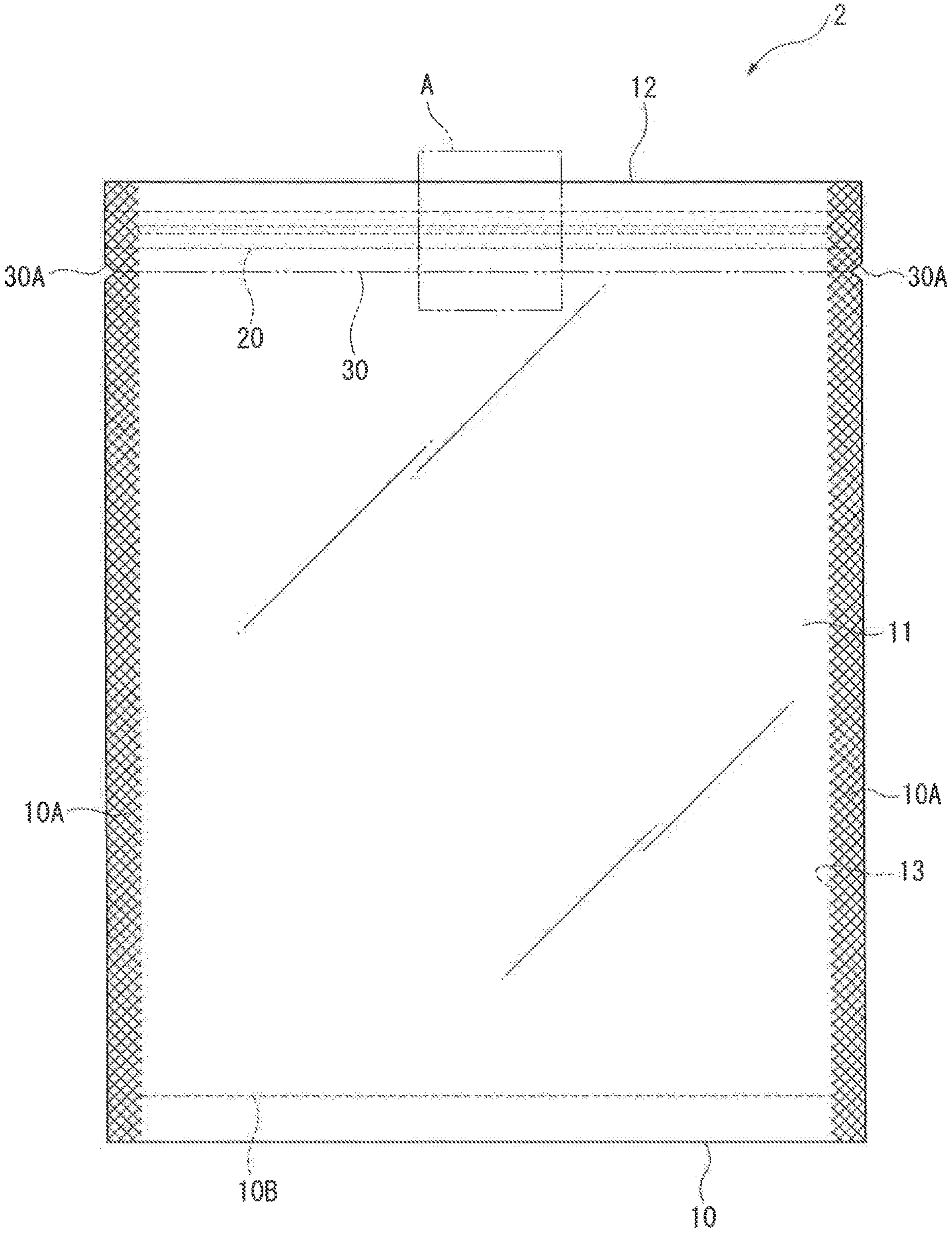
FIG. 6 is a front view of the zipper tape-equipped bag.
Figure 7:
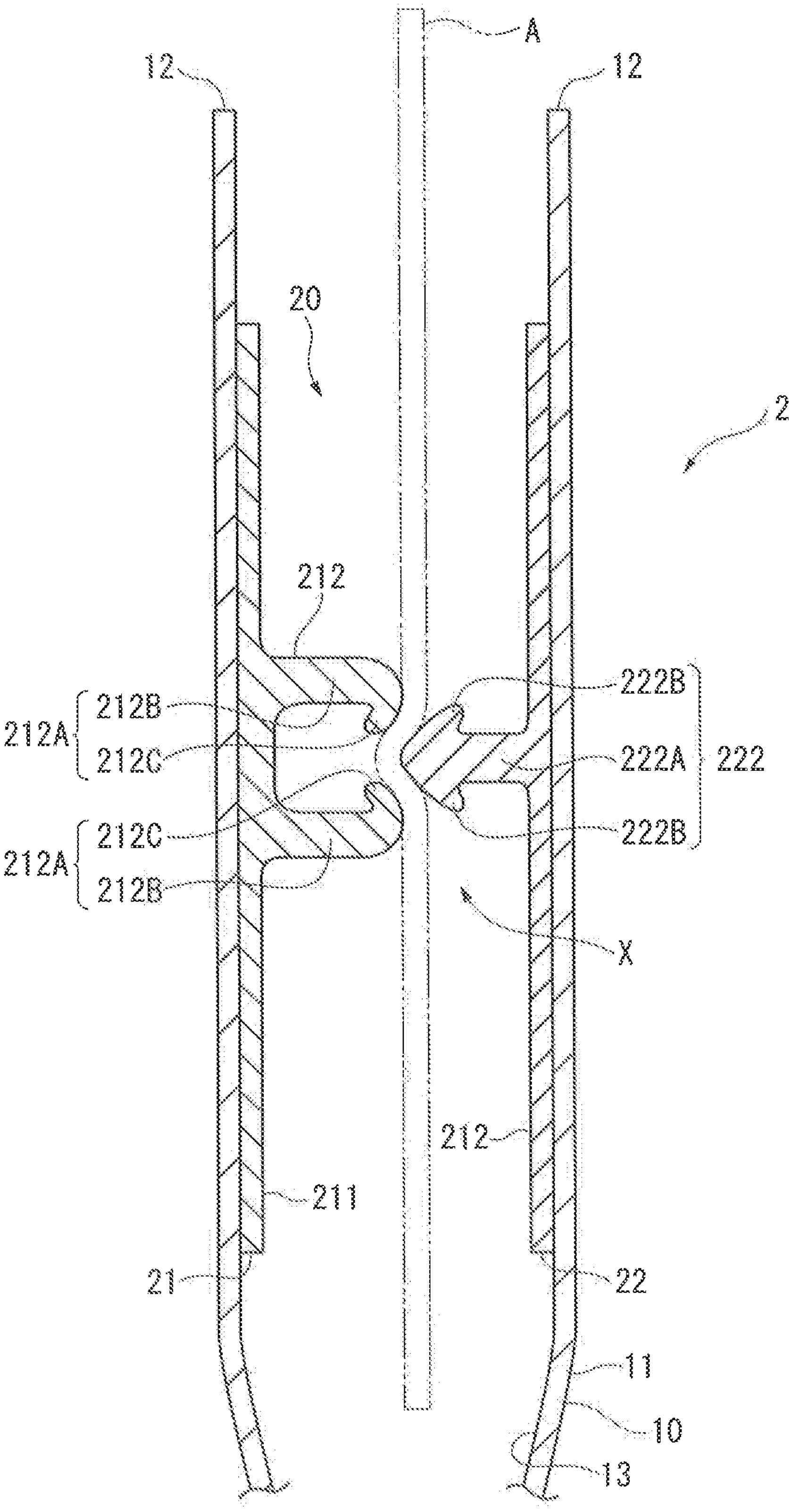
FIG. 7 shows a cross section of a vicinity of a zipper tape of the zipper tape-equipped bag.
Figure 8:
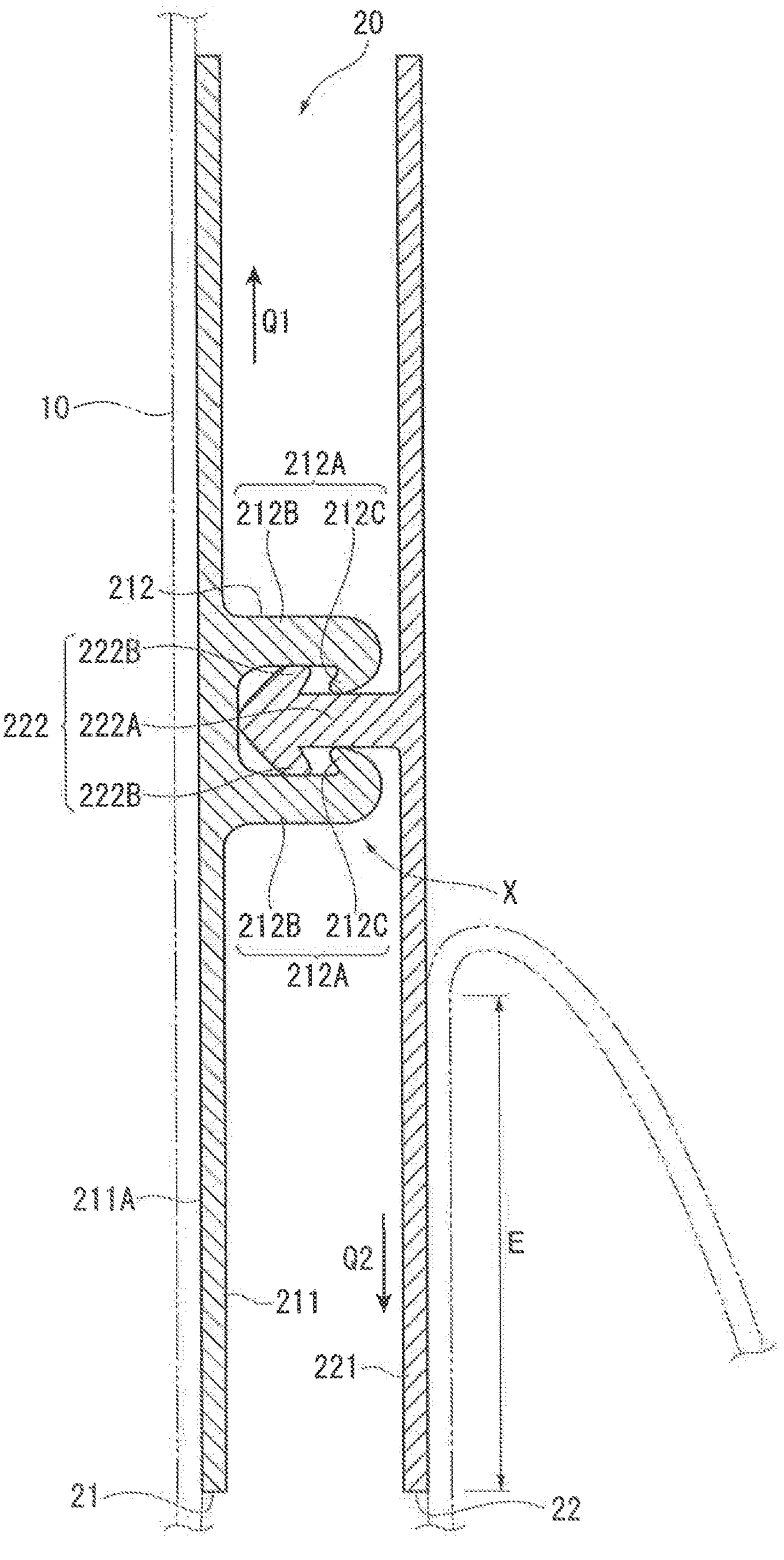
FIG. 8 shows a cross section of the tamper-proof bag being prevented from being opened.

Each of FIGS. 5A to 5D shows a concept for explaining the article housing method of housing the article G into the zipper tape-equipped bag 2. FIG. 5A shows an opening step. FIG. 5B shows a housing step. FIG. 5C shows an engaging step. FIG. 5D shows the tamper-proof bag 1 after housing the article. FIG. 6 is a front view of the zipper tape-equipped bag 2 for explaining how to open the zipper tape-equipped bag 2 before housing the article. FIG. 7 shows a cross section of a vicinity of the zipper tape 20 in FIG. 6. FIG. 8 shows a cross section of the tamper-proof bag 1 being prevented from being opened.

As shown in FIGS. 5A, 6 and 7, a film A is interposed between the female hook 212 and the male hook 222 in order to avoid an accidental engagement of the engagement portion X during a delivery of the zipper tape-equipped bag 2.

At a retail shop, the film A is removed and the opening step of opening the bag body 10 such that the open end 12 is largely opened is performed.

Then, as shown in FIG. 5B, the housing step of housing the article G into the housing space 13 from the open end 12 of the bag body 10 is performed.

Subsequent to the housing step in which the article G is housed, as shown in FIG. 5C, the engaging step in which the engagement portions X, Y are brought into engagement from one end to the other end of the zipper tape 20 to engage the female tape member 21 with the male tape member 22 is performed.

With the above steps, the tamper-proof bag 1 in which the article G is housed in the housing space 13 is completed as shown in FIG. 5D.

The completed tamper-proof bag 1 is displayed at a sales site for sale.

Even if a person who intends to tamper an article at the sales site attempts to hold and pull a vicinity of the open end 12 of the bag body 10 of the tamper-proof bag 1, he or she cannot open the zipper tape 20.

In other words, as shown in FIG. 8, when the vicinity of the open end 12 of the bag body 10 is pulled, the female tape member 21 is pulled in a direction Q1 toward the open end. In contrast, since the male tape member 22 is bonded to the inner surface of the bag body 10 only in the bonding region E which is part of the male belt-shaped base 221 near the housing space 13, the male tape member 22 is pulled in an opposite direction Q2 from the direction in which the female tape member 21 is pulled. Accordingly, a force is applied in directions in which the female belt-shaped base 211 and the male belt-shaped base 221 are sheared.

With this force, the female claw 212C and the male claw 222B are brought into engagement with each other.

On the other hand, even when the zipper tape 20 is attempted to be opened from a side of bag body 10 near the housing space 13, the bag cannot be opened. In other words, when the engagement is to be released by holding the side of the bag body 10 near the housing space 13, the female hook 212 and the male hook 222 are to be moved in directions separating from each other. Since the female claw 212C and the male claw 222B each are formed in a hook with a folded tip end, the female claw 212C and the male claw 222B are unlikely to be separated from each other with the above arrangement, and a strong force to pull the bag body 10 is required to tear the bag body 10 or cut the zipper tape 20, so that the bag is prevented from being tampered.

Since a customer who has bought the tamper-proof bag 1 in which the article G is housed cannot open the tamper-proof zipper tape 20, the customer has to cut the bag body 10 with use of the opening cut portion 30 in order to take out the article G.

Advantages of First Exemplary Embodiment

In the first exemplary embodiment, the following advantages can be obtained.

In the first exemplary embodiment, when the zipper tape 20 is attached to the inner surface of the bag body 10, only the male belt-shaped base 221 is attached only at the bonding region E while a first side of the male belt-shaped base 221 from the engagement portion X to the end of the male belt-shaped base 221 near the open end 12 of the bag body 10 is not attached.

With this arrangement, when the bag is attempted to be opened by holding the open end 12 of the bag body 10 after the article G is housed, a force is applied in directions in which the female belt-shaped base 211 and the male belt-shaped base 221 are sheared. With this force, the female claw 212C and the male claw 222B are brought into engagement with each other, so that the engagement cannot be released. Accordingly, after the article G is housed in the bag body 10 and the engagement portion X is brought into engagement, an opening operation per se is impossible, so that the zipper tape-equipped bag 2 capable of further preventing the article G from being tampered can be provided.

The male belt-shaped base 221 is configured to be engaged with and disengaged from the female claws 212C of the female tape member 21, the female claws 212C respectively protruding toward the housing space 13 and the open end 12. The male belt-shaped base 221 is provided on the male tape member 22, in which the first end near the open end 12 of the bag body 10 is not attached to the bag body 10.

With this arrangement, when the bag body 10 is attempted to be opened, the female claw 212C and the male claw 222B are brought into engagement with each other, so that a tamper resistance performance is improvable. Further, even when the bag body 10 is attempted to be opened by holding the side of the bag body 10 near the housing space 13, the female claw 212C and the male claw 222B are brought into engagement with each other, so that the bag is more preventable from being tampered.

Moreover, the opening cut portion 30 configured to cut out the engagement portion X in the engagement state is provided.

With this arrangement, the customer can take the article G out of the tamper-proof bag 1 by an easy opening, which is very useful.

Second Exemplary Embodiment

Next, a second exemplary embodiment of the invention will be described with reference to the drawings.

Figure 9:
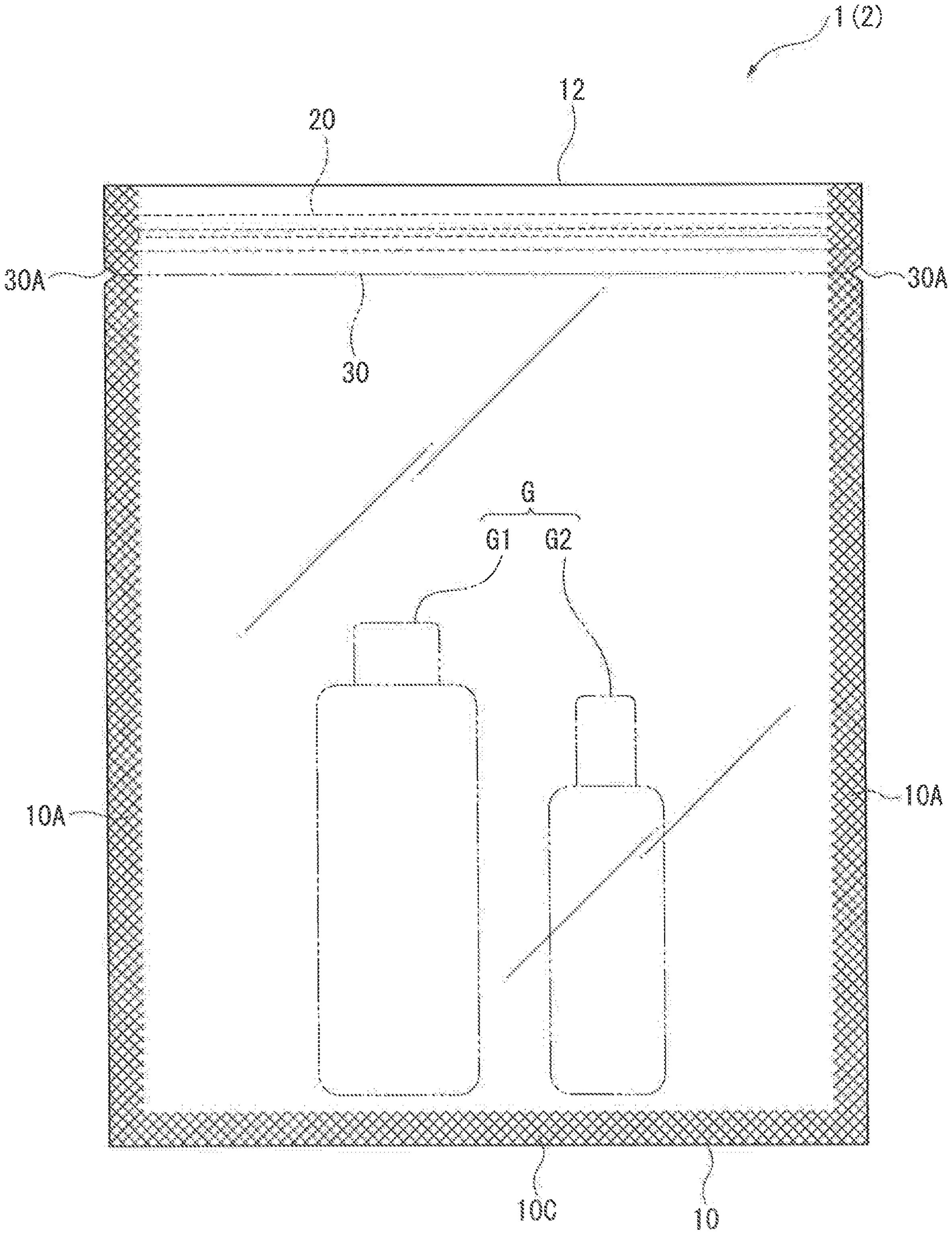
FIG. 9 is a plan view of a tamper-proof bag according to a second exemplary embodiment of the invention.
Figure 10:
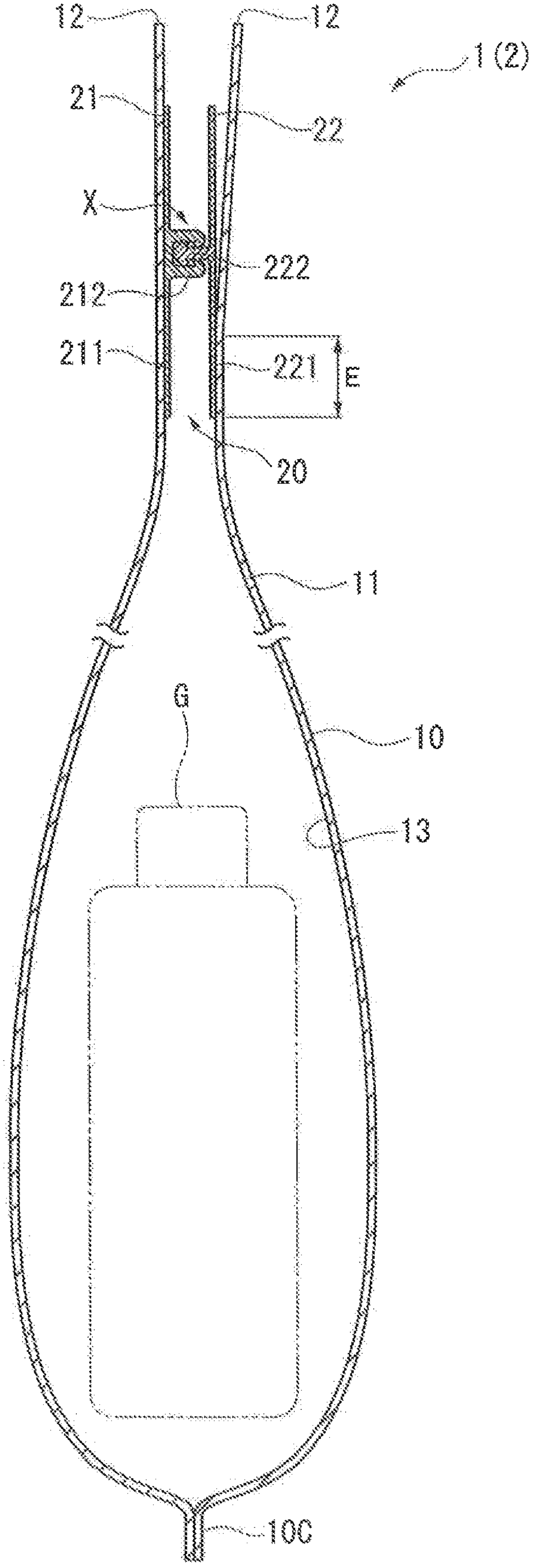
FIG. 10 shows a cross section of the tamper-proof bag.

FIG. 9 is a plan view showing a tamper-proof bag according to the second exemplary embodiment. FIG. 10 shows a cross section of the tamper-proof bag.

In the second exemplary embodiment, the bag is manufactured by a three-sided sealing method in place of the vertical-pillow-bag manufacturing method in the first exemplary embodiment.

Arrangement of Tamper-Proof Bag

As shown in FIGS. 9 and 10, the tamper-proof bag 1 includes a bottom seal portion 10C in place of the gusset 10B of the tamper-proof bag 1 in the first exemplary embodiment.

Manufacturing Device of Zipper Tape-Equipped Bag

Next, a manufacturing device of the zipper tape-equipped bag 2 (tamper-proof bag 1) according to the second exemplary embodiment will be described with reference to the drawings.

Figure 11:
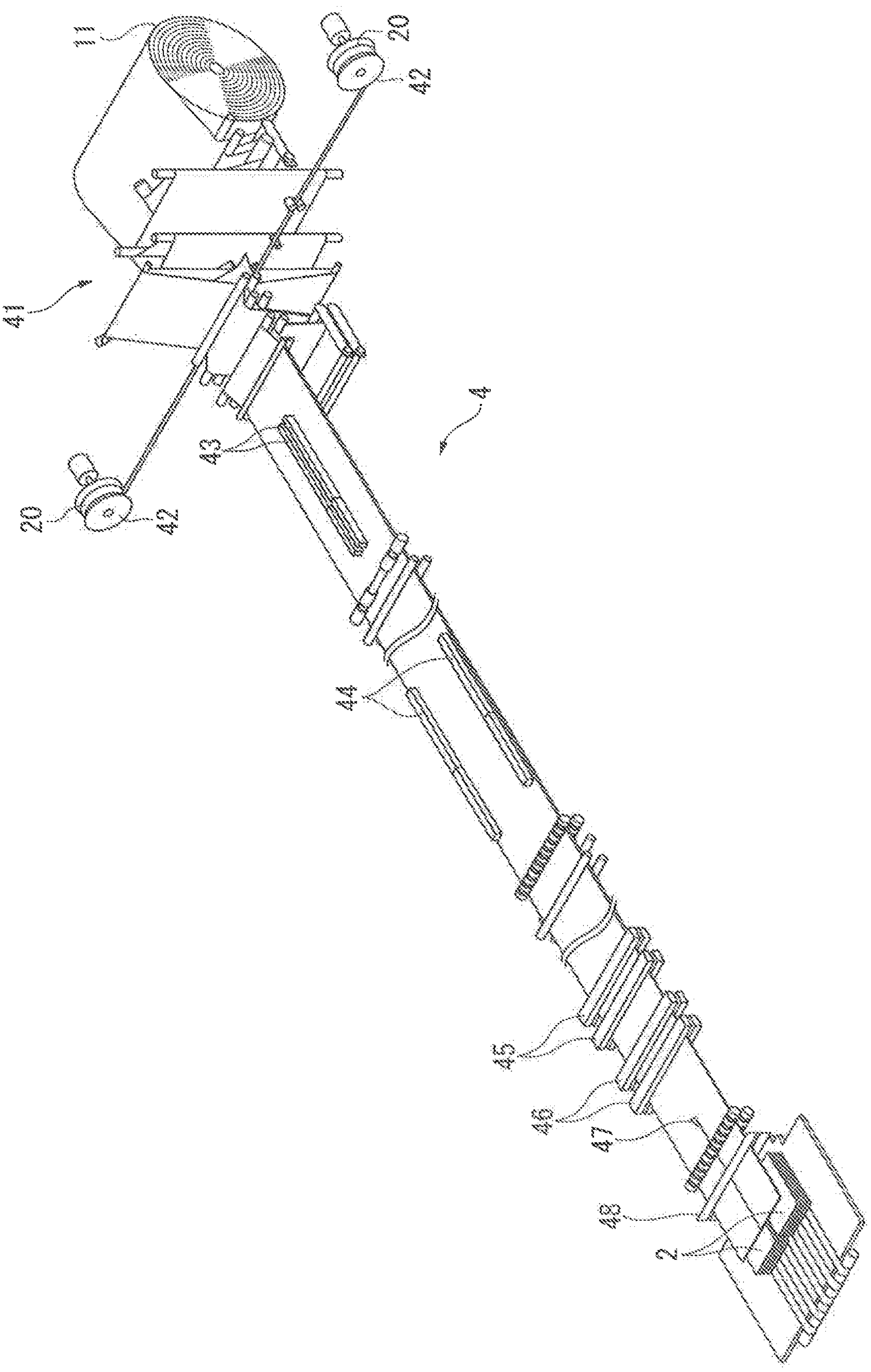
FIG. 11 is a schematic illustration showing a manufacturing device of a zipper tape-equipped bag.

FIG. 11 is a schematic illustration showing the manufacturing device of the zipper tape-equipped bag.

A manufacturing device 4 used for a three-sided sealing method as shown in FIG. 11 includes: a film feeder 41 configured to feed the base film 11; a tape feeder 42 (arranging portion) configured to feed the engaged zipper tape 20; a tape attaching device 43 (attaching portion) configured to heat-seal the zipper tape 20 to the base film 11; a seal bar 44 configured to form the bottom seal portion 10C; a point sealer 45 configured to form a collapsed portion (not shown) in which the zipper tape 20 is collapsed; a side seal bar 46 configured to form the side seal portions 10A; a cut portion 47 configured to cut the base film 11 between two zipper tapes 20 to provide two zipper tape-equipped bags 2 in parallel; and a cutter 48 configured to cut the base film 11 at an intermediate position between the side seal portions 10A to provide the zipper tape-equipped bag 2 with the bottom seal portion 10C and the side seal portions 10A being heat-sealed.

Manufacturing Method of Zipper Tape-Equipped Bag

Next, a method of manufacturing the zipper tape-equipped bag 2 by using the manufacturing device 4 will be described.

The method of manufacturing the zipper tape-equipped bag 2 includes: a film feeding to feed the base film 11; a tape feeding to feed the zipper tape 20; a zipper-tape attaching to bond the zipper tape 20 to the base film 11; and a bag making to make the zipper tape-equipped bag 2 of the base film 11.

In the film feeding, the base film 11 is cut in a longitudinal direction into two base films 11 to overlay each other. The overlaid base films 11 are fed to the zipper-tape attaching. Meanwhile, in the tape feeding, the engaged zipper tape 20 is fed between the overlaid base films 11.

Subsequently, in the zipper-tape attaching, the zipper tape 20 is heat-sealed to the base films 11 using the tape attaching device 43.

Subsequently, in the bag making, the seal bar 44 heat-seals the base films 11 to form the bottom seal portion 10C, the point sealer 45 forms the collapsed portion at a predetermined interval, and the side seal bar 46 heat-seals the base films 11 at a position of the collapsed portion to form the side seal portion 10A. The cut portion 47 cuts the base films 11 between two zipper tapes 20 to provide two zipper tape-equipped bags 2 in parallel. The cutter 48 cuts the base films 11 at the intermediate position between the side seal portions 10A to provide the zipper tape-equipped bag 2 in which three sides (i.e., the bottom seal portion 10C and the side seal portions 10A) are heat-sealed.

The first side of the male tape member 22, which is not attached to the bag body 10, and the open end 12 of the bag body 10 in which the female tape member 21 is attached are held by a person working at a retail shop, a filler and the like who knows the housing method, so that the bag is opened. With this operation, a force is not applied in the shearing directions to the zipper tape 20, but the zipper tape-equipped bag 2 is opened in the same manner as a typical zipper tape-equipped bag. The article G is housed from the open end 12 into the zipper tape-equipped bag 2 to complete the tamper-proof bag 1 in the same manner as in the first exemplary embodiment.

Advantages of Second Exemplary Embodiment

Also in the zipper tape-equipped bag 2 manufactured by the three-sided sealing method in the second exemplary embodiment, when the bag is attempted to be opened by holding the open end 12 of the bag body 10 after the article G is housed, a force is applied in directions in which the female belt-shaped base 211 and the male belt-shaped base 221 are sheared. With this force, the female claw 212C and the male claw 222B are brought into engagement with each other, so that the engagement cannot be released. Accordingly, after the article G is housed in the bag body 10 and the engagement portion X is brought into engagement, an opening operation per se is impossible, so that the zipper tape-equipped bag 2 capable of further preventing the article G from being tampered can be provided.

After the article G is housed or when the article G accidentally housed is taken out, the first side of the male tape member 22, which is not attached to the bag body 10, and the open end 12 of the bag body 10 in which the female tape member 21 is attached are held to open, thereby releasing the engagement. Accordingly, even when the bag in the engagement is made, the bag is openable when housing or taking out the article G, which facilitates the housing operation and the bag-making operation.

Modification(s)

The most preferable configuration for practicing the invention or the like have been disclosed above, however, the invention is not limited thereto. In other words, while the invention has been particularly explained and illustrated mainly in relation to a specific exemplary embodiment, a person skilled in the art could make various modifications in terms of materials, quantity or other particulars to the above described exemplary embodiments without deviating from the technical idea or any object of the invention.

Accordingly, the description that limits the materials and the layer structure is only an example to make the invention easily understood, but is not intended to limit the invention, so that the invention includes the description using a name of component without a part of or all of the limitation on the shape and the material etc.

For instance, in the above exemplary embodiments, the male tape member 22 is bonded to the bag body 10 only at the bonding region E. However, in an inverse arrangement, the female tape member 21 may be bonded to the bag body 10 only at the bonding region E.

Figure 12:
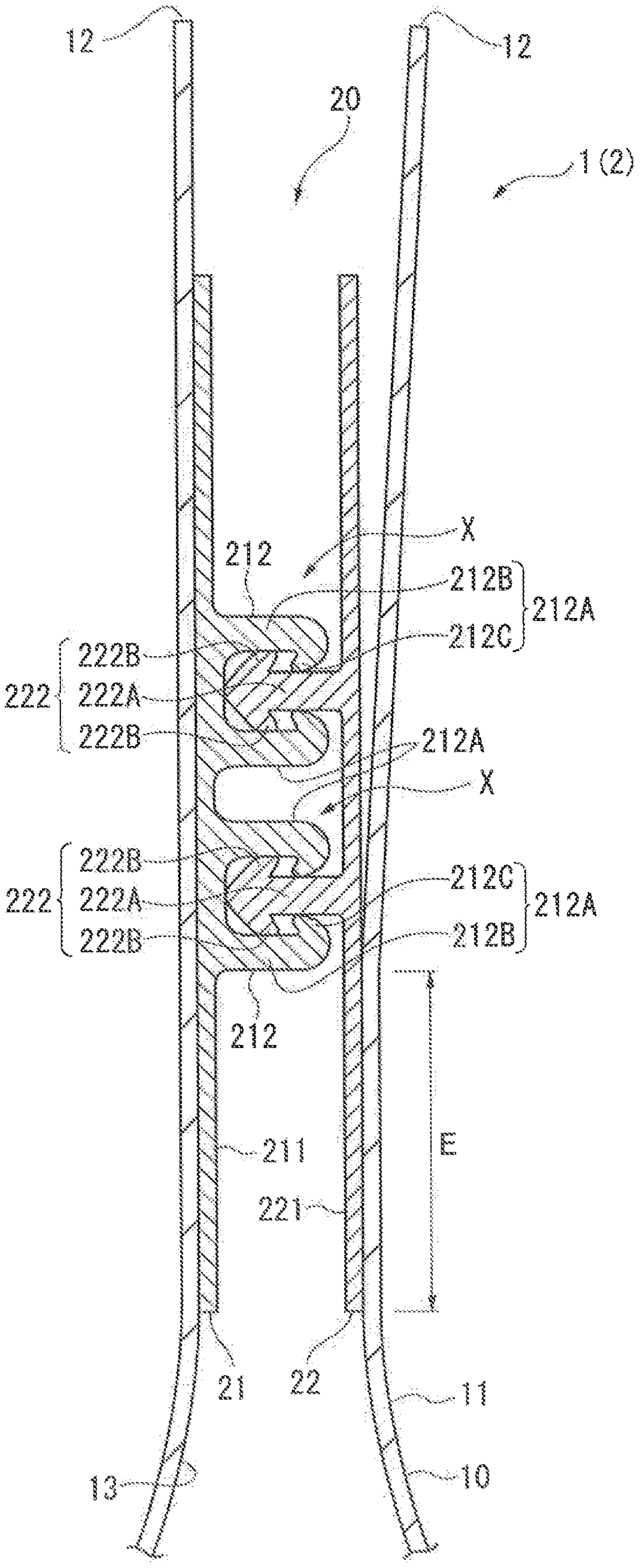
FIG. 12 shows a cross section of a vicinity of a zipper tape of a tamper-proof zipper tape-equipped bag according to another exemplary embodiment of the invention.
Figure 13:
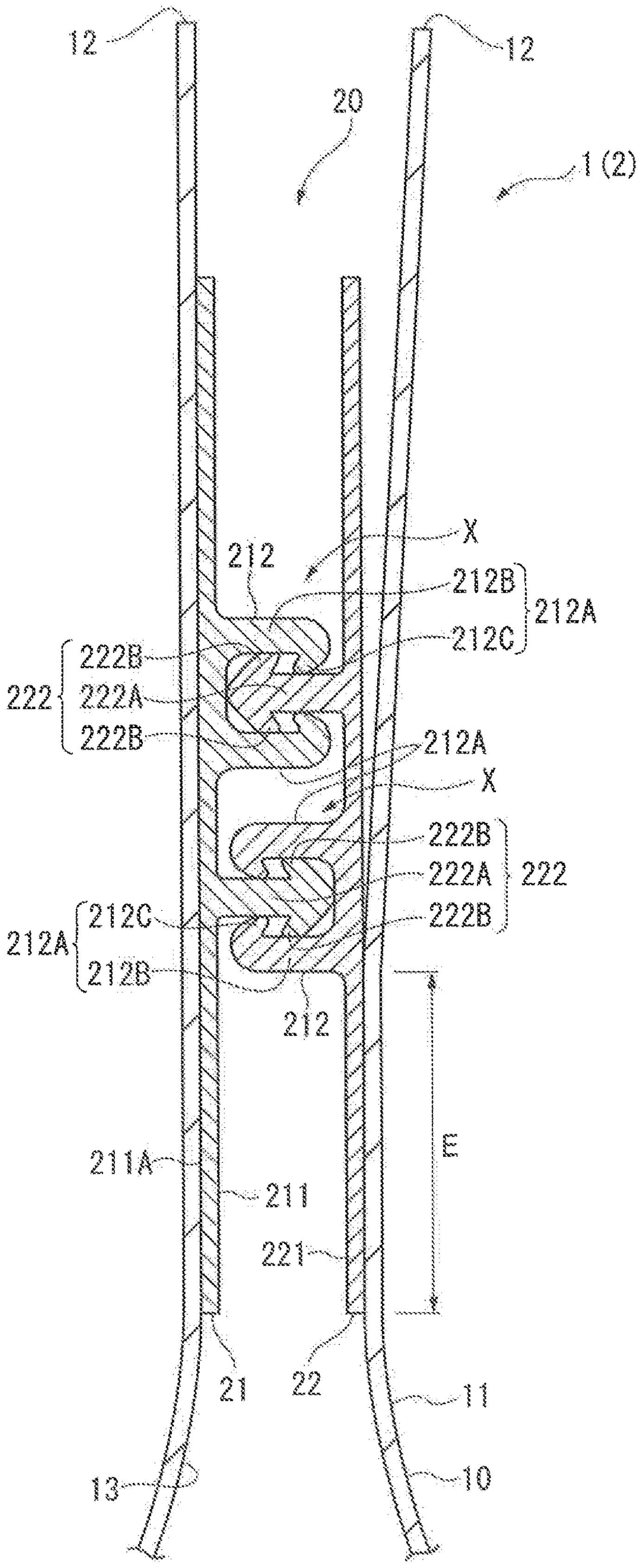
FIG. 13 shows a cross section of a vicinity of a zipper tape of a tamper-proof zipper tape-equipped bag according to still another exemplary embodiment of the invention.

For instance, as shown in FIG. 12, a plurality of engagement portions X may be provided. The plurality of engagement portions X may be arranged such that the female hook 212 and the male hook 222 of one of the engagement portions X face in a direction opposite from the female hook 212 and the male hook 222 of adjacent one of the engagement portions X, for instance, as shown in FIG. 13.

Figure 14:
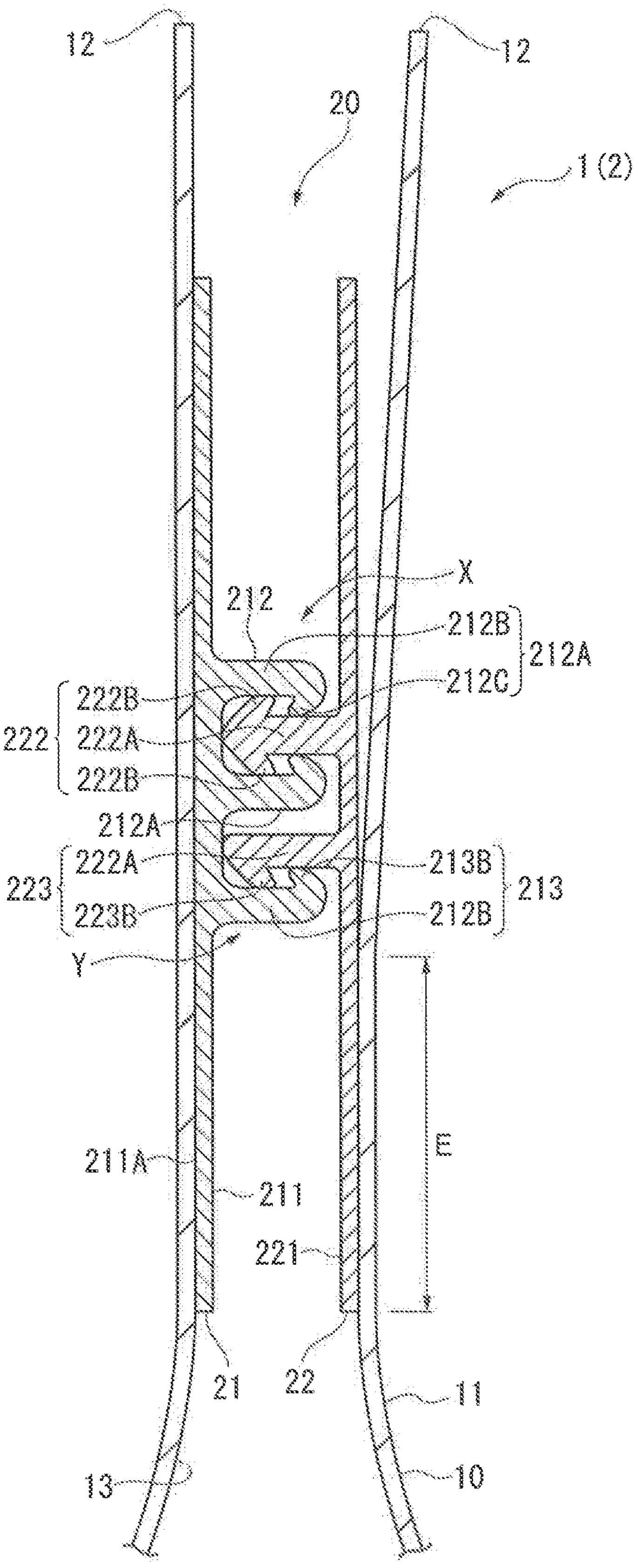
FIG. 14 shows a cross section of a vicinity of a zipper tape of a tamper-proof zipper tape-equipped bag according to a further exemplary embodiment of the invention.

Further, for instance, as shown in FIG. 14, the engagement portion X near the housing space 13 may be provided by an engagement portion Y having a cross section shaped in a hook with a claw only on one side. Specifically, the engagement portion Y is provided side by side near the housing space 13 with respect to the engagement portion X, and includes: a second female hook 213 continuously formed with the female belt-shaped base 211; and a second male hook 223 continuously formed with the male belt-shaped base 221 and configured to be engaged with and disengaged from the second female hook 213. As described above, the engagement portion may have the cross section shaped in a hook.

In the zipper tape 20 shown in FIG. 14, the female claw 213B of the second female hook 213 is the claw near the open end of the invention while the male claw 223B of the second male hook 223 is the inner claw of the invention.

Figure 15:
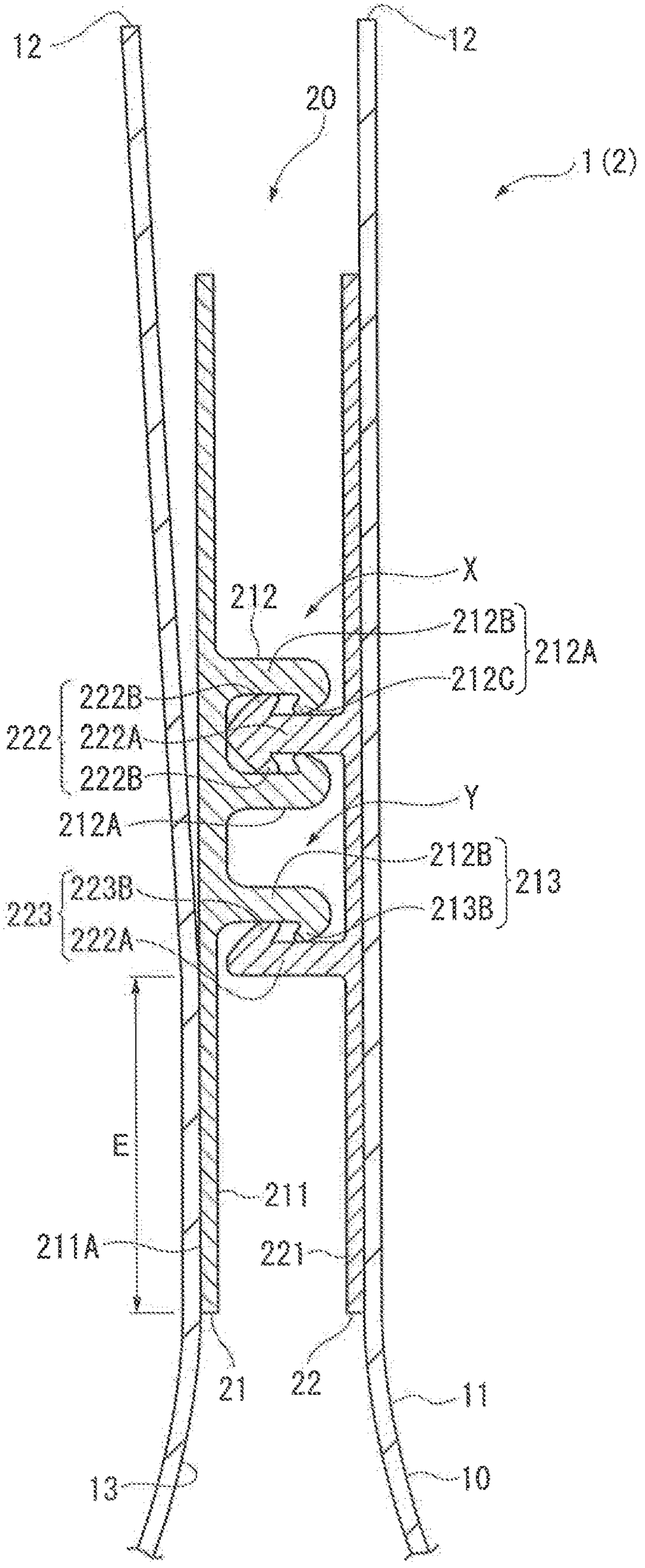
FIG. 15 shows a cross section of a vicinity of a zipper tape of a tamper-proof zipper tape-equipped bag according to a still further exemplary embodiment of the invention.

The engagement portion Y of the zipper tape 20 shown in FIG. 14 may be arranged such that the female hook 212 and the male hook 222 of one of the engagement portions Y face in a direction opposite from the female hook 212 and the male hook 222 of adjacent one of the engagement portions Y, for instance, as shown in FIG. 15. In the arrangement shown in FIG. 15, it is preferable that a side of the female tape member 21 near the open end 12 is not attached to the bag body 10 in order to obtain a favorable engagement between the second female hook 213 and the second male hook 223.

The opening cut portion 30 is not necessarily attached to the bag body 10 as in the first exemplary embodiment. For instance, the opening cut portion 30 may be integrally formed with each of the female tape member 21 and the male tape member 22 of the zipper tape 20, or alternatively, may be a linear cut film provided on the bag body 10 away from the female tape member 21 and the male tape member 22.

The opening cut portion 30 is not necessarily provided. In other words, the article G can be taken out by cutting the bag body 10 with a cutter such as scissors even when no opening cut portion 30 is provided.

Figure 16:
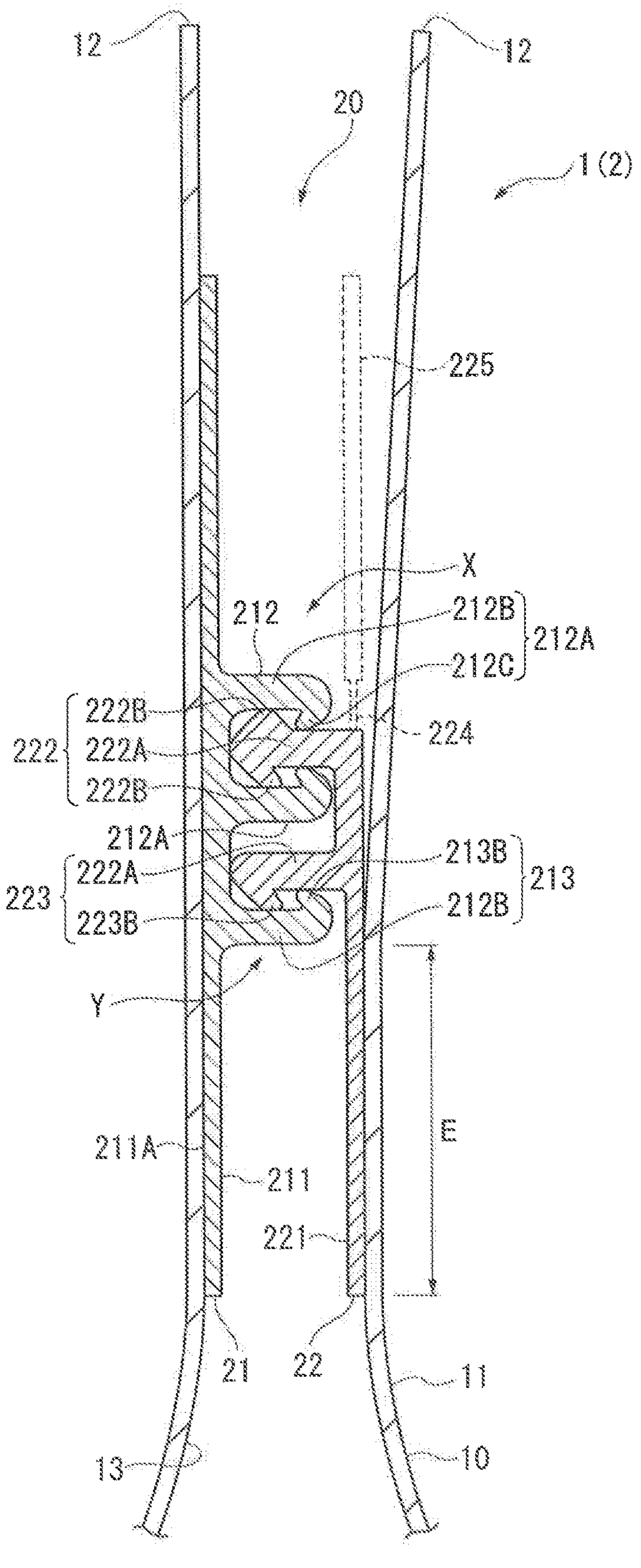
FIG. 16 shows a cross section of a vicinity of a zipper tape of a tamper-proof zipper tape-equipped bag according to a still further exemplary embodiment (third exemplary embodiment) of the invention.

For instance, as shown in FIG. 16, the zipper tape-equipped bag 2 may have the male tape member 22 to be attached at the bonding region E, the male tape member 22 being formed such that a first side from the engagement portion X toward the open end 12 is shorter in length than a first side of the female tape member 21 from the engagement portion X toward the open end 12.

The shorter length of the male tape member 22 is in a range from 0.0 mm to 2.0 mm, which avoids a person from holding the male tape member 22 with fingers.

In the zipper tape-equipped bag 2 shown in FIG. 16, when the tamper-proof zipper tape 20 having the shorter first side from the engagement portion X toward the open end 12 is attached to the base film 11, the film A is interposed between the female hook 212 and the male hook 222 in order to avoid an accidental engagement of the engagement portion X during a delivery of the zipper tape-equipped bag 2 to a retail shop and the like.

Moreover, in the zipper tape-equipped bag 2 shown in FIG. 16, in addition to the bag-making using the tamper-proof zipper tape 20 having the shorter first side from the engagement portion X toward the open end 12, for instance, as shown in FIG. 14, the end extending from the engagement portion X to the open end 12 may be cut after the article G is housed, thereby providing the tamper-proof bag 1 shown in FIG. 16.

Specifically, a thin portion 224 and a cut piece 225 may be provided to a belt-shaped base that is attached at the bonding region E, for instance, to the male belt-shaped base 221 of the male tape member 22. Specifically, the thin portion 224 is provided to a first side of a base end of the male hook 222. The cut piece 225, which is removable, is provided to the first side of the thin portion 224. In the male hook to which the thin portion 224 is provided, it is preferable that the male claw 222B protruding toward the open end 12 has a cross section shaped in a mountain and the tip end of the male claw 222B is not folded toward the male belt-shaped base 221.

Figure 17:
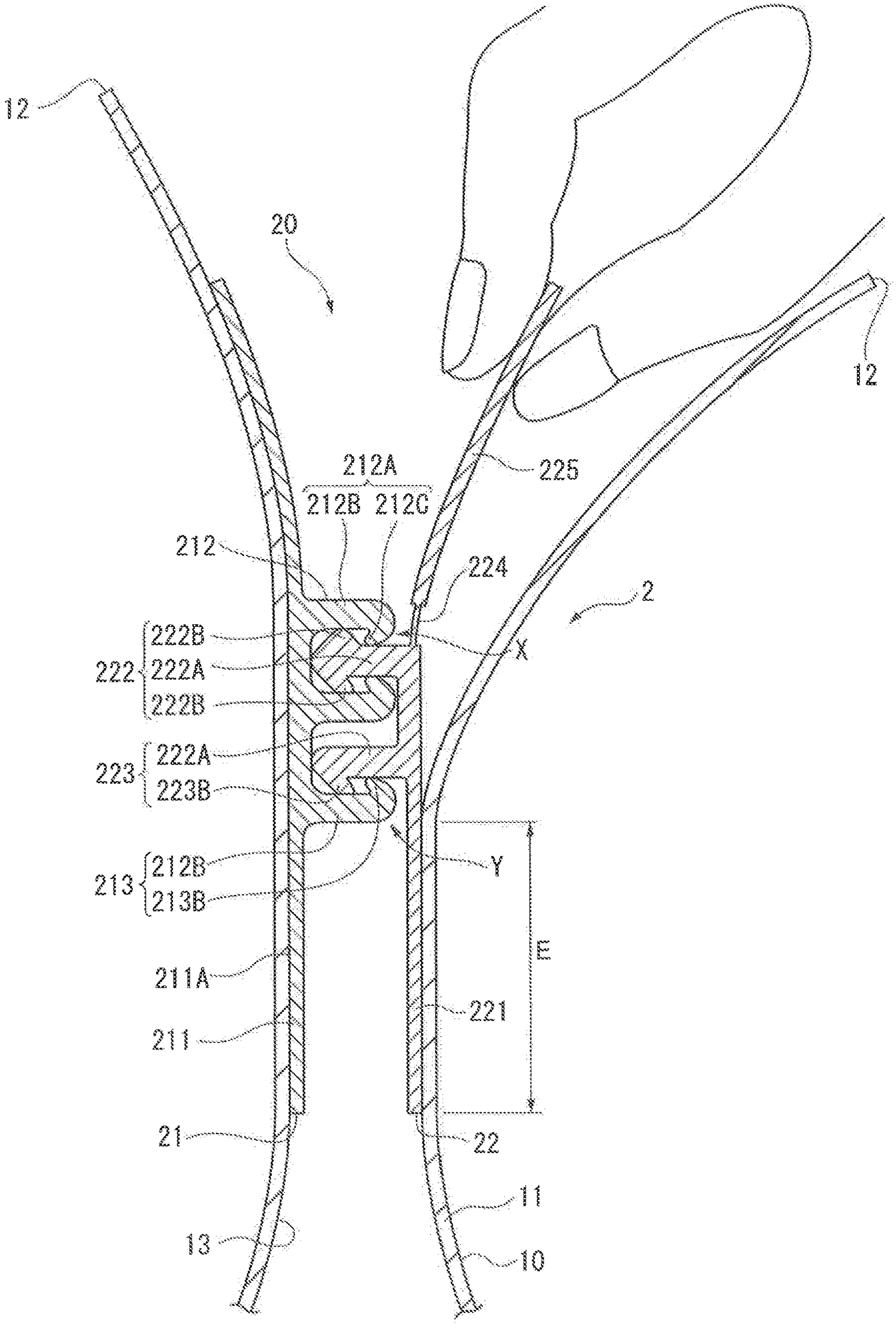
FIG. 17 shows a cross section of the zipper tape-equipped bag for explaining how the bag is opened.

In the zipper tape-equipped bag 2 shown in FIG. 17, when the engagement portion X is brought into engagement during the delivery to a retail shop and the like or when the article G is accidentally housed, the cut piece 225 and the female belt-shaped base 211 near the open end 12 are held and a force is applied in directions separating from each other. With this operation, the force is not applied in the shearing directions to the engagement portions X, Y, but the engagement is released to open the bag body 10. Accordingly, the housing operation of the article G after opening the bag body 10 can be facilitated.

After housing the article G, the cut piece 225 is removed by cutting the thin portion 224 to provide the tamper-proof bag 1 shown in FIG. 16, so that the opening operation is impossible since the cut piece 225 cannot be held, thereby further preventing the article G from being tampered. Likewise, also in the first and second exemplary embodiments, the unattached first side of the belt-shaped base may be removed to make the opening operation impossible.

The thin portion 224 may have a cross section such as a V-shaped cross section and a curved cross section without a step as long as the thin portion 224 is formed thin enough to be cut. The thin portion 224 may be punched in a straight line to provide so-called perforation and is configured to be cut to remove the cut piece 225.

Third Exemplary Embodiment

Next, a third exemplary embodiment of the invention will be described in detail below with reference to FIGS. 16 and 17.

In the third exemplary embodiment, the same or similar components as those in the above exemplary embodiments are denoted by the same reference signs and the descriptions thereof will be omitted or simplified.

Figure 18:
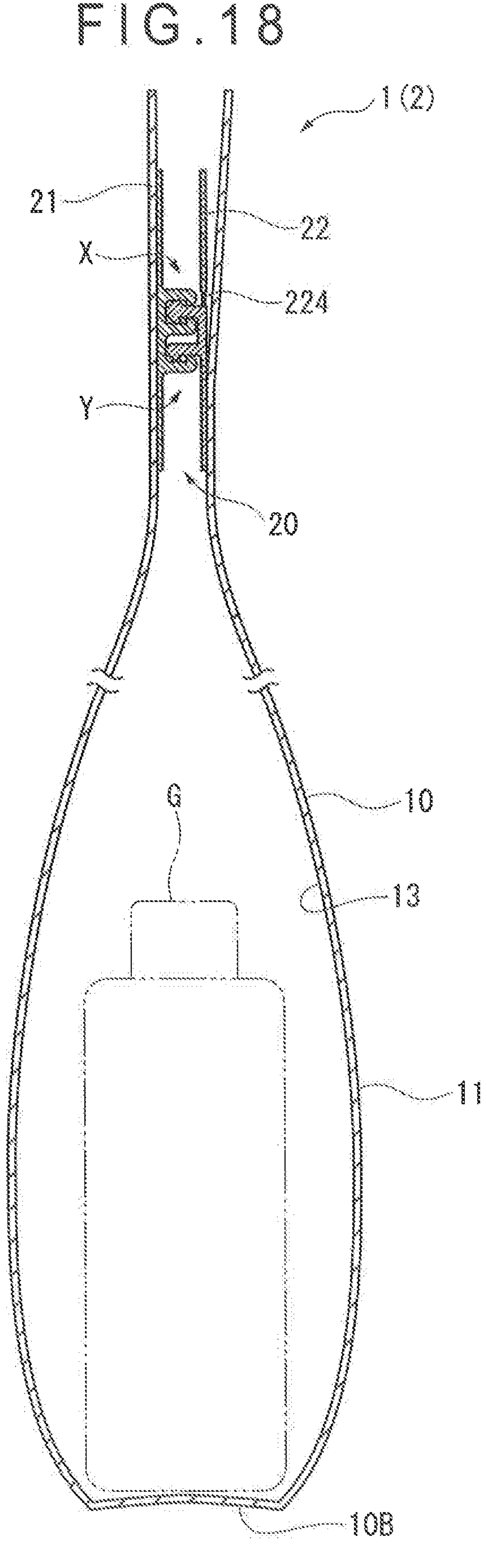
FIG. 18 shows a cross section of the tamper-proof zipper tape-equipped bag according to the third exemplary embodiment of the invention.
Figure 19:
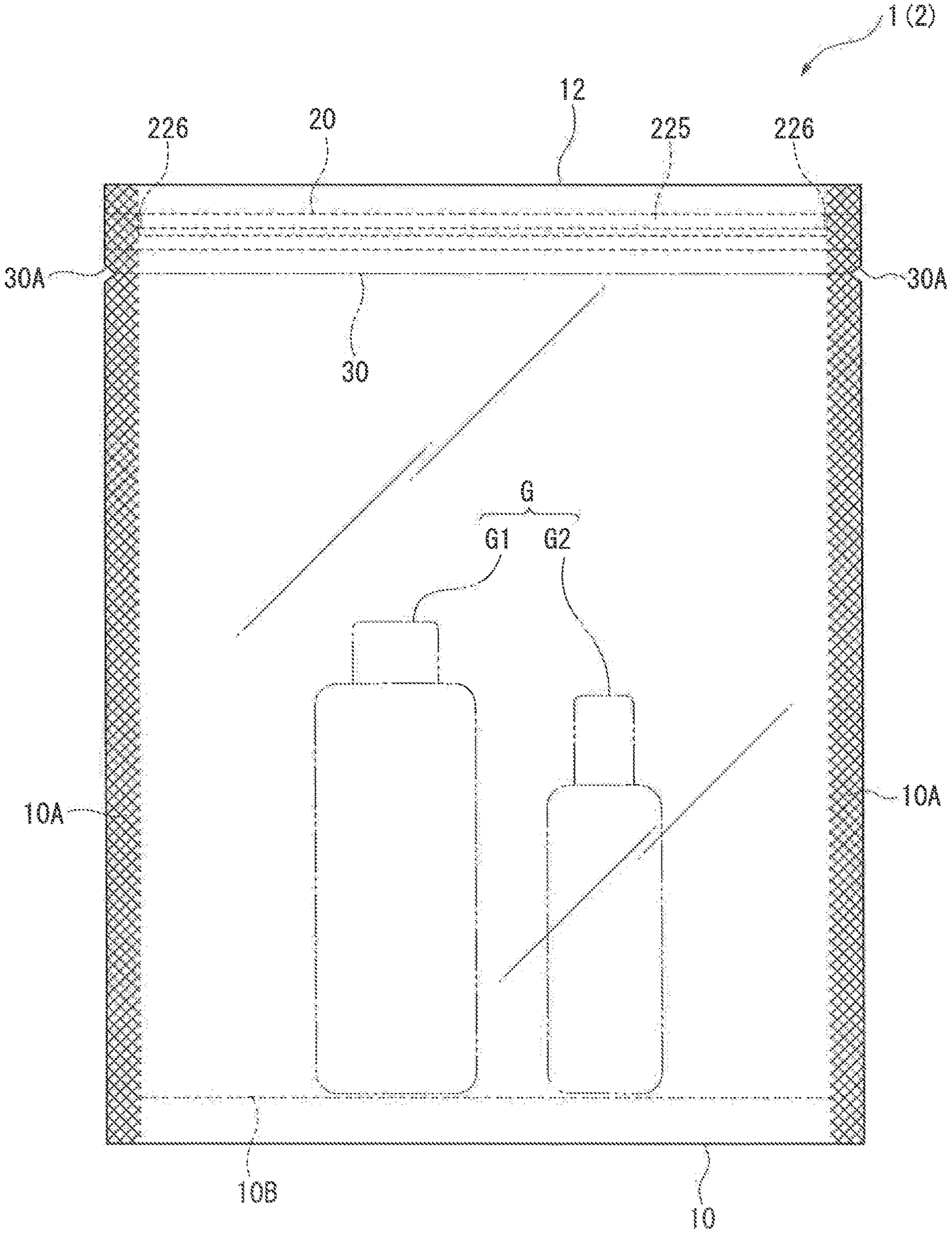
FIG. 19 is a front view of the zipper tape-equipped bag.
Figure 20:
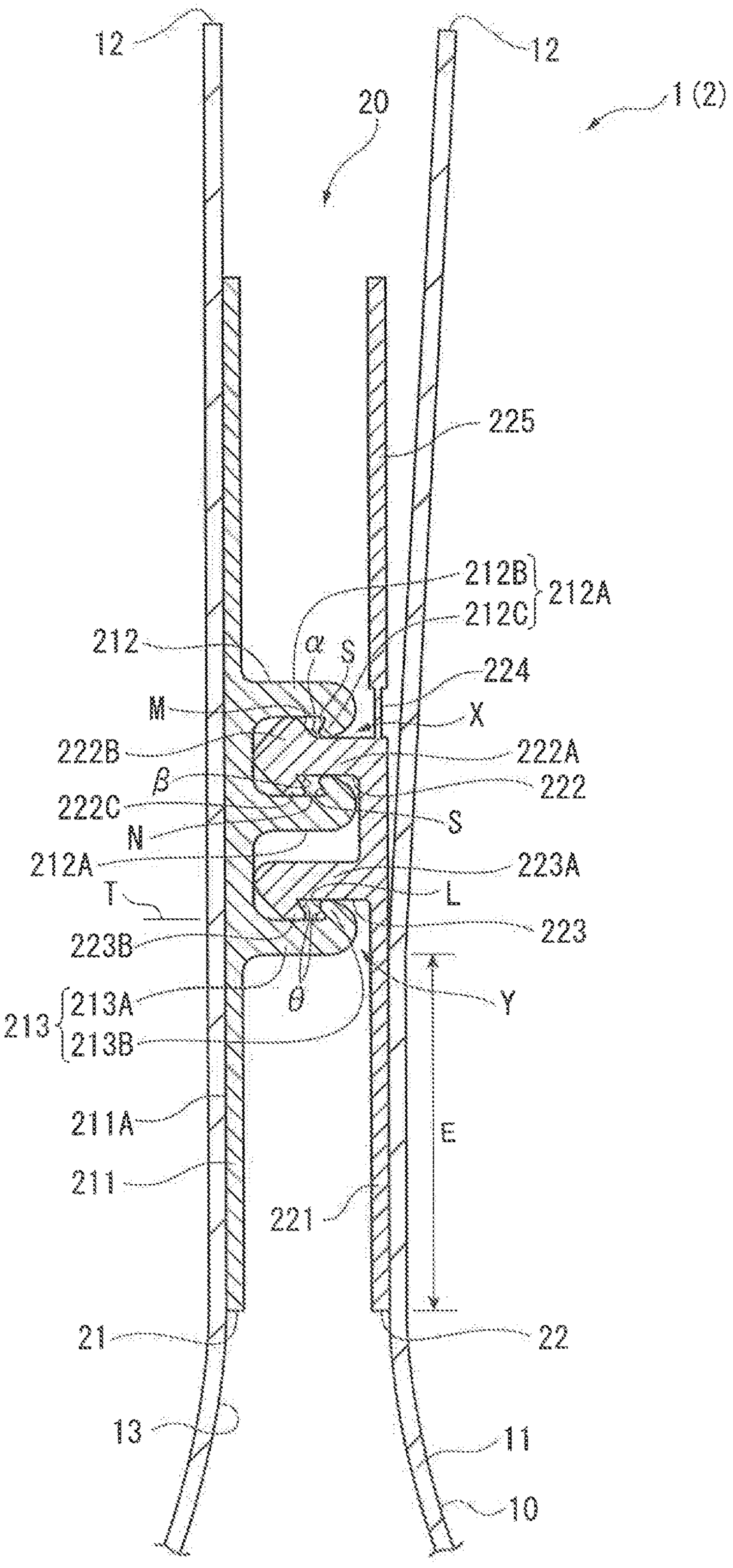
FIG. 20 shows a cross section of a vicinity of a zipper tape of the zipper tape-equipped bag.

FIG. 18 shows a cross section of the tamper-proof zipper tape-equipped bag. FIG. 19 is a front view of the zipper tape-equipped bag. FIG. 20 shows a cross section of a vicinity of the zipper tape-equipped bag.

Arrangement of Tamper-Proof Zipper Tape-Equipped Bag

The tamper-proof zipper tape-equipped bag 2 is particularly used as the tamper-proof bag 1 housing the article G as shown in FIGS. 18 to 20, and includes: the bag body 10 configured to house the article G; and the tamper-proof zipper tape 20 that is bonded to opposing inner surfaces of the bag body 10. The opening cut portion 30 is provided at a side of the bag body 10 near the article housed therein with respect to the tamper-proof zipper tape 20.

The article G can be exemplified by various products. In the first exemplary embodiment, two large and small bottles G1, G2 are used.

Arrangement of Zipper Tape

FIG. 20 shows a detailed arrangement of the zipper tape 20.

As shown in FIG. 20, the tamper-proof zipper tape 20 includes the female tape member 21 and the male tape member 22 in parallel to the open end 12.

A direction perpendicular to the longitudinal direction of each of the female tape member 21 and the male tape member 22 is defined as a width direction (top-bottom direction in FIG. 20). The first (top) direction of the width direction is toward the open end 12 and the second (bottom) direction of the width direction is toward the housing space 13. In the third exemplary embodiment, the female tape member 21 is placed on a left side of FIG. 20 and the male tape member 22 is placed on a right side of FIG. 20.

The female tape member 21 includes: the female belt-shaped base 211; the first female hook 212 continuously formed substantially at the center in the width direction on the surface of the female belt-shaped base 211 and near the open end 12; and the second female hook 213 continuously formed to the first female hook 212 near the housing space.

The female belt-shaped base 211 is in a form of a flat plate. An end of the female belt-shaped base 211 near the open end 12 is spaced from the open end 12 of the bag body 10.

The female belt-shaped base 211 has the bonding surface 211A bonded to the inner surface of the bag body 10, the bonding surface 211A being an opposite surface from the surface where the first female hook 212 and the second female hook 213 are provided. The bonding of the female belt-shaped base 211 to the inner surface of the bag body 10 may be conducted over the entire surface of the female belt-shaped base 211, may be conducted on both sides of the female belt-shaped base 211 in the width direction, or may be conducted in a dotted line.

The first female hook 212 has a pair of opposing female components 212A. Each of the female components 212A includes: a protrusion 212B protruding from a flat surface of the female belt-shaped base 211; and a female claw 212C (engageable female claw) integrally formed with a tip end of the protruding protrusion 212B and protruding only in a direction approaching each other.

A pair of female claws 212C forming the first female hook 212 respectively have inclined surfaces S configured to be respectively engaged with the first male claw 222B and the second male claw 222C. An angle formed between each of the inclined surfaces S and a perpendicular line T of the female belt-shaped base 211 is less than 90 degrees, preferably, in a range from 45 degrees to 80 degrees. A tip end of each of the first male claw 222B and the second male claw 222C is folded toward the female belt-shaped base 211.

An interval between the opposing female components 212A may be substantially the same as or different from an interval between the female component 212A near the housing space 13 of the female components 212A and the second female hook 213. The second female hook 213 includes: a protrusion 213A protruding from a flat surface of the female belt-shaped base 211; and a female hook claw 213B protruding from a tip end of the protrusion 213A only toward the first female hook 212 (near the open end 12 of the bag body 10). The first female hook 212 and the first male hook 222 configured to be engaged with each other define the engagement portion X. The second female hook 213 and the second male hook 223 define the engagement portion Y.

The female hook claw 213B has an inclined surface L at a portion opposing the female belt-shaped base 211. An angle θ that is an acute angle of angles formed between the inclined surface L and the perpendicular line T of the female belt-shaped base 211 is 90 degrees or less, preferably, in a range from 45 degrees to 80 degrees. A tip end of each of the female hook claw 213B is folded toward the female belt-shaped base 211.

The first female hook 212 and the second female hook 213 are substantially the same in height from the flat surface of the female belt-shaped base 211.

The male tape member 22 includes: the male belt-shaped base 221 opposing the female belt-shaped base 211; the first male hook 222 continuously formed substantially at the center in the width direction on the surface of the male belt-shaped base 221 and near the open end 12, and configured to be engaged with and disengaged from the first female hook 212; and the second male hook 223 continuously formed to the first male hook 222 near the housing space.

The male belt-shaped base 221 is in a form of a flat plate. The first side of the male belt-shaped base 221 near the open end 12 is spaced from the open end 12 of the bag body 10.

Specifically, only a surface of the male belt-shaped base 221, which is an opposite surface from the surface where the first male hook 222 and the second male hook 223 are provided, is bonded to the inner surface of the bag body 10. The bonding region E of the male belt-shaped base 221 to the bag body 10 is a region excluding a region where the first male hook 222 and the second male hook 223 are provided and including the end (the lower end in FIG. 20) of the male belt-shaped base 221 near the housing space 13. In the same manner as in the female belt-shaped base 211, the bonding of the male belt-shaped base 221 to the inner surface of the bag body 10 may be conducted over the entire surface of the male belt-shaped base 221, may be conducted on a periphery of the bonding region E, or may be conducted in a dotted line.

The first male hook 222 is provided to the male belt-shaped base 221 near the open end 12. The first male hook 222 having an arrowhead-shaped cross section includes: the protrusion 222A protruding from the flat surface of the male belt-shaped base 221; and the first male claw 222B and the second male claw 222C respectively protruding from the tip end of the protrusion 222A toward the housing space 13 and the open end 12.

The first male claw 222B and the second male claw 222C are engaged with the female claw 212C.

The first male claw 222B protrudes in the opposite direction (toward the open end 12) from the second male hook 223 and has an inclined surface M to be engaged with the female claw 212C positioned near the open end 12. An angle α that is an obtuse angle of angles formed between the inclined surface M and the perpendicular line T of the male belt-shaped base 221 is 90 degrees or more, preferably, in a range from 100 degrees to 135 degrees. The first male claw 222B is formed to have a cross section shaped in a mountain.

The second male claw 222C protrudes toward the second male hook 223 (toward the housing space 13) and has an inclined surface N to be engaged with the female claw 212C positioned near the housing space 13. An angle β that is an acute angle of angles formed between the inclined surface N and the perpendicular line T of the male belt-shaped base 221 is 90 degrees or less, preferably, in a range from 45 degrees to 80 degrees. A tip end of the second male claw 222C is folded toward the male belt-shaped base 221.

The second male hook 223 includes: a protrusion 223A protruding from the flat surface of the male belt-shaped base 221; and a male hook claw 223B (engaging male claw) protruding from a tip end of the protrusion 223A only in an opposite direction (toward the housing space 13) from the first male hook 222 and configured to be engaged with the female hook claw 213B.

The male hook claw 223B has the inclined surface L to be engaged with the inclined surface L of the female hook claw 213B. An angle θ that is an acute angle formed between the inclined surface L and the perpendicular line T of the male belt-shaped base 221 is 90 degrees or less, preferably, in a range from 45 degrees to 80 degrees. A tip end of the male hook claw 223B is folded toward the male belt-shaped base 221.

The first male hook 222 and the second male hook 223 are substantially the same in height from the bottom of the male belt-shaped base 221. However, the respective heights may be different as long as the first female hook 212 and the second female hook 213 are engageable with each other.

The male belt-shaped base 221 includes the thin portion 224 that is positioned at the base end of the first male hook 222 near the open end 12 and serves as a cuttable portion. The thin portion 224 is formed to be stepped from both the surfaces of the male belt-shaped base 221. The position where the thin portion 224 is provided is a position where a length from the base end of the first male hook 222 to the thin portion 224 is in a range from 0.0 mm to 2.0 mm, which avoids a person from holding the thin portion 224 with fingers.

Although a holding strength with fingers differs depending on an adult or child, a male or female, ages or health conditions, the length unable to be held with human fingers is universally in a range from 0.0 mm to 2.0 mm. When the length exceeds 2.0 mm, even after the thin portion 224 is cut to cut out the first side (i.e., from the thin portion 224 to the first edge near the open end 12), many people can hold the male belt-shaped base 221 near the open end 12 (i.e., from the base end of the first male hook 222 to the cut thin portion 224), so that the engagement may be released. The first side of the male belt-shaped base 221 from the thin portion 224 to the open end 12 is defined as the cut piece 225 (holing piece) to be removed by cutting the thin portion 224. A thickness of the cut piece 225 may be the same as a thickness of the thin portion 224. However, in order to improve the cuttability at the position of the thin portion 224, the cut piece 225 is preferably formed thicker than the thin portion 224.

The male belt-shaped base 221 includes a cut portion 226 (see FIG. 19) that is positioned at the inner side of the bag body 10 than the side seal portions 10A, which are welded parts at both longitudinal ends welded to the bag body 10, the cut portion 226 being a cutout extending from the thin portion 224 to an end of the male belt-shaped base 221 near the open end 12 of the bag body 10. The cut portion 226 is not limited to a cut portion, but may be formed thin by being collapsed.

When the bag is arranged to have no side seal portion 10A, thermocompression parts formed for sealing gaps between the longitudinal ends of the zipper tape 20 and the bag body 10 correspond to the welded parts to the bag body 10.

Housing Method of Article

Next, an article housing method of housing the article G into the zipper tape-equipped bag 2 will be described below with reference to the attached drawings.

Figure 21A:
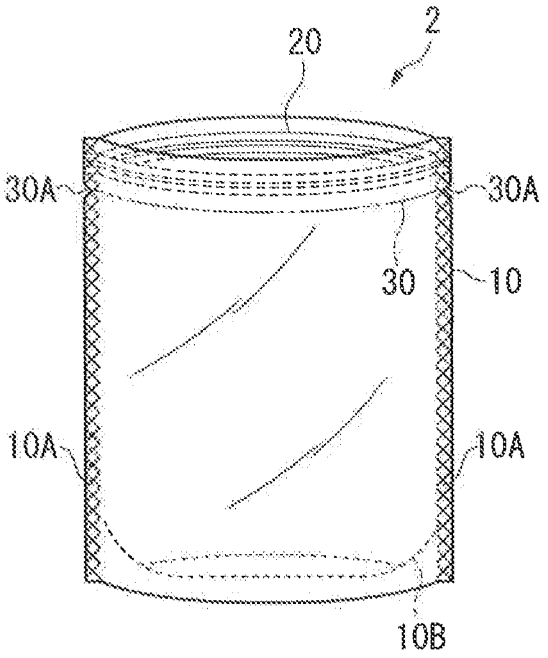
FIG. 21A shows a concept for explaining an article-housing method of housing an article into the zipper tape-equipped bag and especially shows an opening step.
Figure 21B:
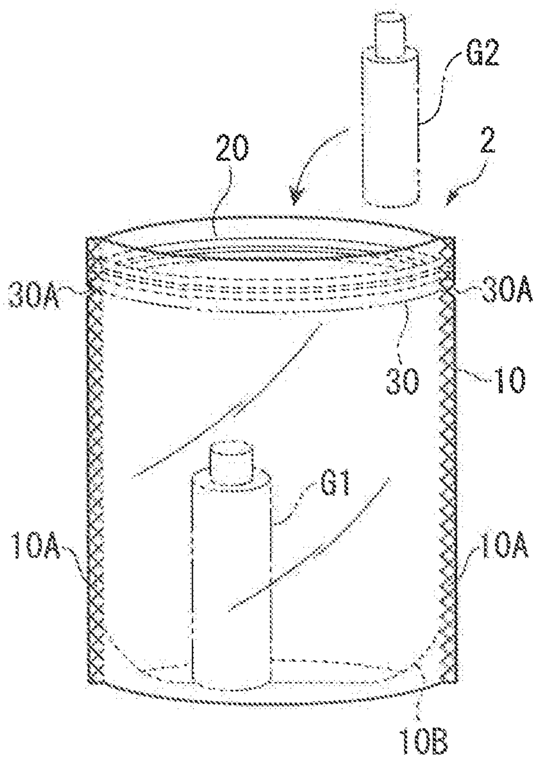
FIG. 21B shows the concept for explaining the article-housing method of housing an article into the zipper tape-equipped bag and especially shows a housing step.
Figure 21C:
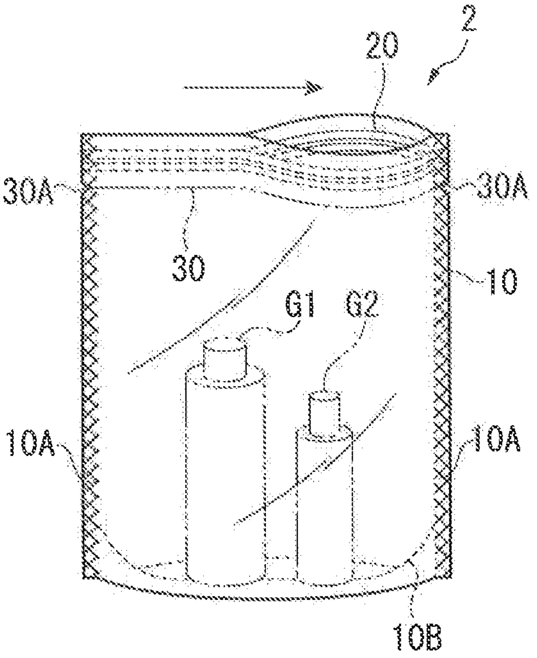
FIG. 21C shows the concept for explaining the article-housing method of housing an article into the zipper tape-equipped bag and especially shows an engaging step.
Figure 21D:
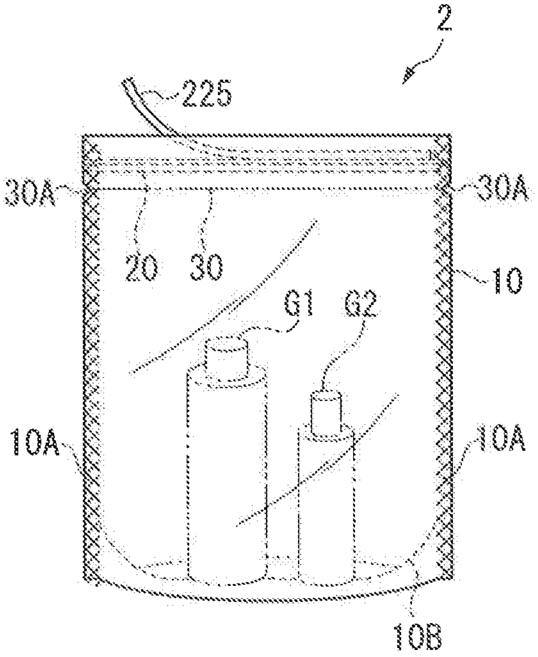
FIG. 21D shows the concept for explaining the article-housing method of housing an article into the zipper tape-equipped bag and especially shows a cutting step.
Figure 22A:
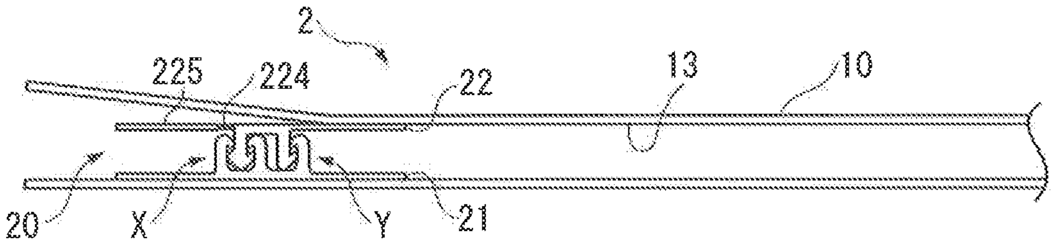
FIG. 22A shows the concept for explaining the article-housing method of housing an article into the zipper tape-equipped bag and especially shows a relevant part of the zipper tape-equipped bag before housing the article.
Figure 22B:
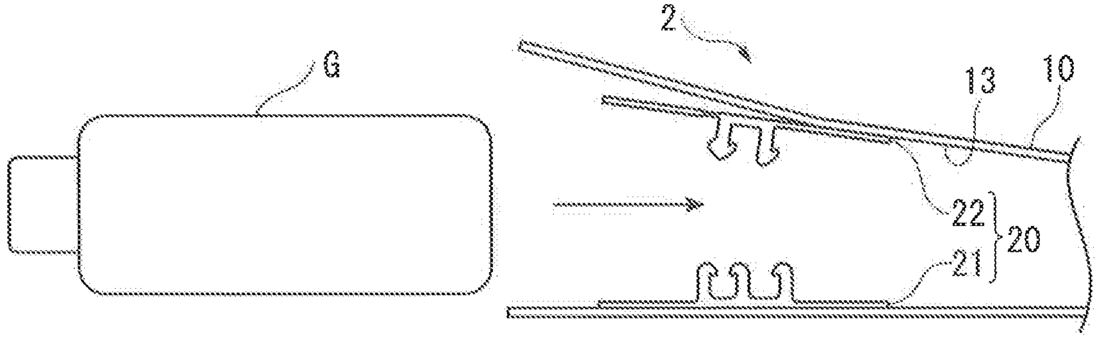
FIG. 22B shows the concept for explaining the article-housing method of housing an article into the zipper tape-equipped bag and especially shows that the zipper tape-equipped bag is opened to house the article.
Figure 22C:
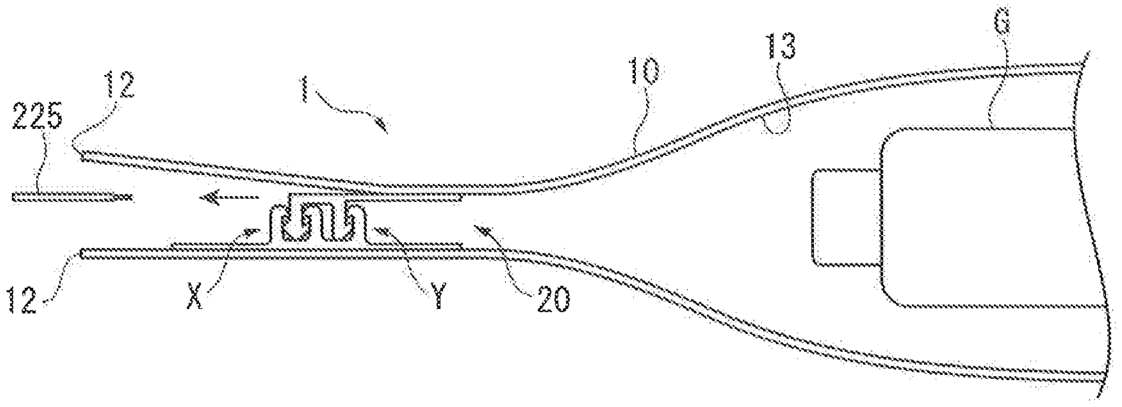
FIG. 22C shows the concept for explaining the article-housing method of housing an article into the zipper tape-equipped bag and especially shows that a first side of a belt-shaped base in an engaged state is cut.
Figure 22D:
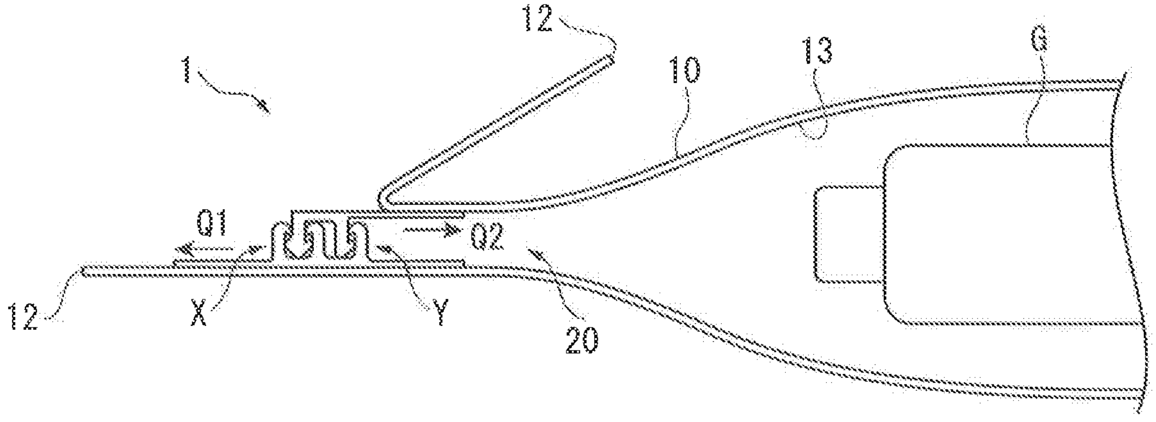
FIG. 22D shows the concept for explaining the article-housing method of housing an article into the zipper tape-equipped bag and especially shows an opening prevention state.
Figure 23:
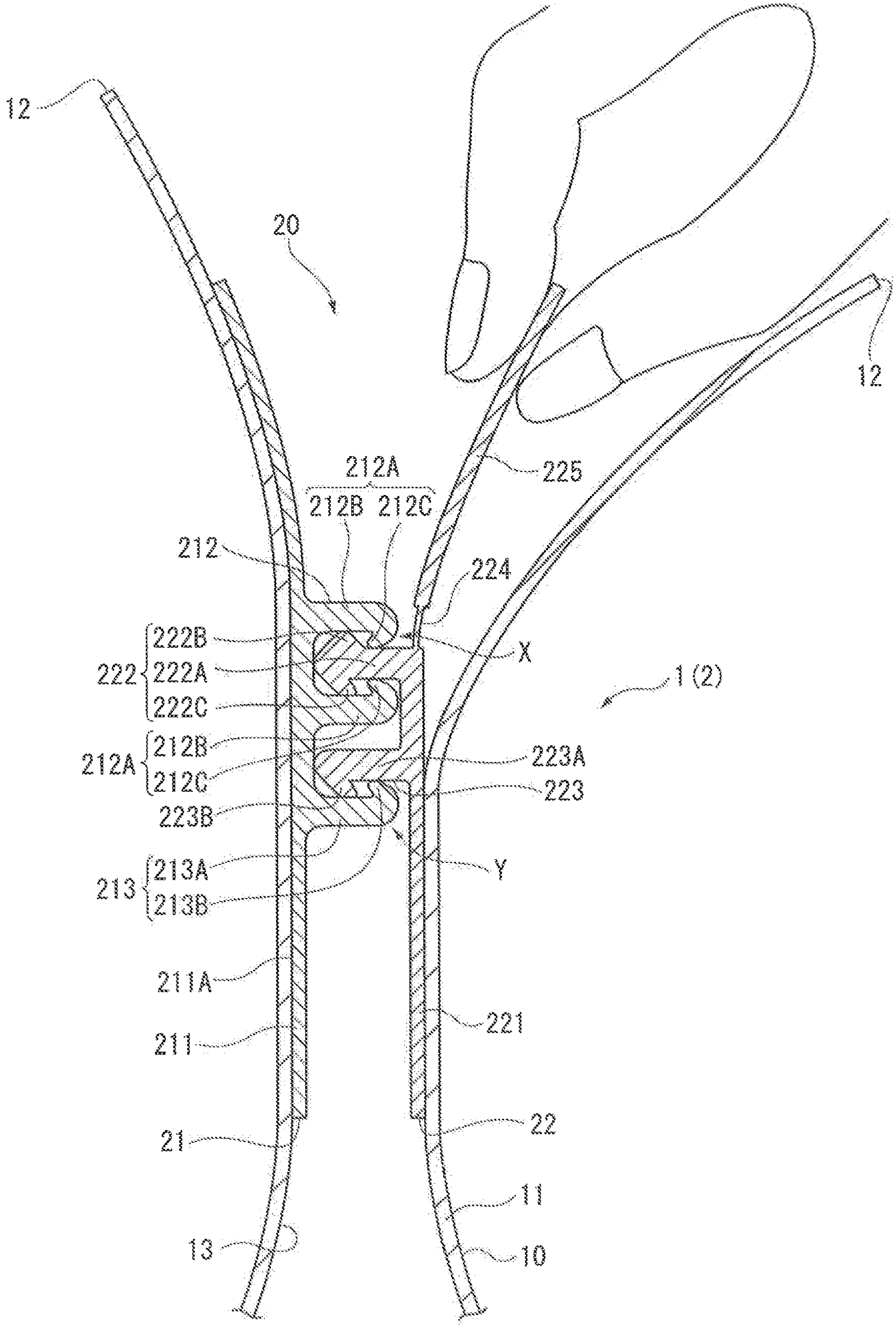
FIG. 23 shows a cross section of the zipper tape-equipped bag for explaining how the bag is opened.
Figure 24:
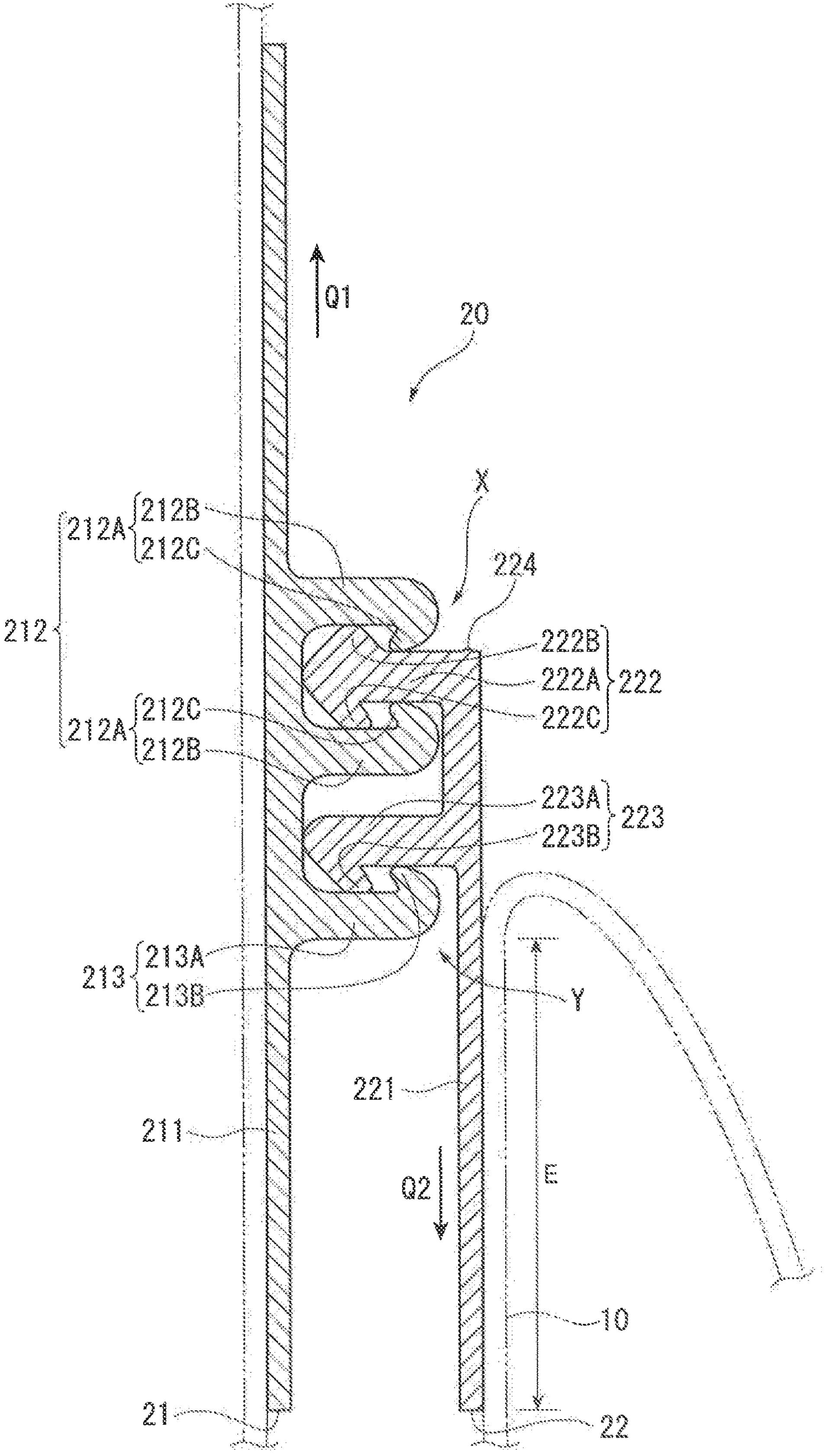
FIG. 24 shows a cross section of the zipper tape-equipped bag after housing an article (i.e., a tamper-proof bag) which is prevented from being opened.

Each of FIGS. 21A to 21D shows a concept for explaining the article housing method of housing the article G into the zipper tape-equipped bag 2. FIG. 21A shows an opening step. FIG. 21B shows a housing step. FIG. 21C shows an engaging step. FIG. 21D shows a cutting step. Each of FIGS. 22A to 22D shows a concept for explaining the article housing method of housing the article G into the zipper tape-equipped bag 2. FIG. 22A shows a relevant part of the zipper tape-equipped bag 2 before housing the article G. FIG. 22B shows opening the bag and housing the article G thereinto. FIG. 22C shows that the cut piece 225 at the first side of the male belt-shaped base 221 is removed after the engagement. FIG. 22D shows that the tamper-proof bag 1 is prevented from being opened. FIG. 23 shows a cross section for explaining opening the zipper tape-equipped bag 2. FIG. 24 shows a cross section for explaining that the tamper-proof bag 1 after housing the article is prevented from being opened.

After the zipper tape-equipped bag 2 is manufactured using the vertical-pillow-bag manufacturing device 3 shown in FIG. 4, for instance, in the same manner as in the first exemplary embodiment, the zipper tape-equipped bag 2 is delivered to a retail shop, fillers and the like.

As shown in FIG. 21A, the retail shop, fillers and the like perform the opening step of opening the open end 12 of the bag body 10. In this opening step, when the engagement portions X, Y are in engagement as shown in FIG. 22A, by holding the cut piece 225 while holding the side of the female belt-shaped base 211 near the open end 12 as shown in FIG. 23 and applying a force in directions separating from each other, the engagement of the engagement portions X, Y are released and opened.

Subsequent to the opening step, as shown in FIGS. 21B and 22B, the housing step of housing the article G into the housing space 13 of the bag body 10 is performed. When housing the article G, the open end 12 of the bag body 10 is kept opened.

Subsequent to the housing step in which the article G is housed, as shown in FIG. 21C, the engaging step in which the engagement portions X, Y are brought into engagement from one end to the other end of the zipper tape 20 to engage the female tape member 21 with the male tape member 22 is performed.

Specifically, by pressing the female tape member 21 and the male tape member 22 to each other, the first male hook 222 and the second male hook 223 of the male tape member 22 are respectively fitted into the first female hook 212 and the second female hook 213 of the female tape member 21, resulting in engagement between the female tape member 21 and the male tape member 22.

Subsequent to the engaging step, as shown in FIGS. 21D and 22C, the cutting step of cutting the thin portion 224 by holding and pulling the cut piece 225 toward the open end 12 is performed, so that the tamper-proof bag 1 in which the article G is housed in the housing space 13 is completed.

The completed tamper-proof bag 1 is displayed at a sales site for sale or delivered from the filler to the retail shop.

Even if a person who intends to tamper an article at the sales site attempts to hold and pull a vicinity of the open end 12 of the bag body 10 of the tamper-proof bag 1, he cannot open the zipper tape 20.

In other words, as shown in FIGS. 22D and 24, when the vicinity of the open end 12 of the bag body 10 is pulled, the female tape member 21 is pulled in the direction Q1 toward the open end. In contrast, since the male tape member 22 is bonded to the inner surface of the bag body 10 only in the bonding region E of the male belt-shaped base 221 near the housing space 13, the male tape member 22 is pulled in the opposite direction Q2 from the direction in which the female tape member 21 is pulled. Accordingly, a force is applied in directions in which the female belt-shaped base 211 and the male belt-shaped base 221 are sheared.

With this force, the female claw 212C and the second male claw 222C are brought into engagement with each other while the female hook claw 213B and the male hook claw 223B are brought into engagement with each other.

Since the cut piece 225 is removed, the length of the side of the male belt-shaped base 221 near the open end 12 is not enough to hold the male tape member 22.

On the other hand, even when the zipper tape 20 is attempted to be opened from the side of bag body 10 near the housing space 13, the bag cannot be opened. In other words, when the engagement is to be released by holding the side of the bag body 10 near the housing space 13, the first female hook 212 and the first male hook 222 are to be moved in directions separating from each other while the second female hook 213 and the second male hook 223 are to be moved in directions separating from each other. Since the female claw 212C and the second male claw 222C each are formed in a hook with a folded tip end while the female hook claw 213B and the male hook claw 223B each are formed in a hook with a folded tip end, the female claw 212C and the male claw 222B are unlikely to be separated from each other while the female hook claw 213B and the male hook claw 223B in the engagement at two positions, and a strong force to pull the bag body 10 is required to tear the bag body 10 or cut the zipper tape 20, so that the bag is prevented from being tampered.

Since a customer who has bought the tamper-proof bag 1 in which the article G is housed cannot open the tamper-proof zipper tape 20, the customer cut the bag body 10 with use of the opening cut portion 30 in order to take out the article G.

Advantages of Third Exemplary Embodiment

In the third exemplary embodiment, the following advantages can be obtained.

In the third exemplary embodiment, when the zipper tape 20 with the thin portion 224 is attached to the inner surface of the bag body 10, only the male belt-shaped base 221 with the thin portion 224 is attached only at the bonding region E while the first end of the male belt-shaped base 221 from the engagement portions X, Y to an end of the male belt-shaped base 221 near the open end 12 of the bag body 10 is not attached.

With this arrangement, when the cut piece 225 of the male belt-shaped base 221 is not yet removed by cutting the thin portion 224, the engagement may be released by holding the cut piece 225 at the first end of the male belt-shaped base 221 from the thin portion 224 to the end of the male belt-shaped base 221 near the open end 12 of the bag body 10. Accordingly, even when the engagement portions X, Y are brought into engagement during the delivery of the zipper tape-equipped bag 2 to the retail shop and the like, the zipper tape-equipped bag 2 can be easily opened. Thus, a member for restricting the engagement of the engagement portions X, Y before housing the article G is not required. Even when the article G is accidentally housed, the article G can be taken out and re-housed if the cut piece 225 is not yet removed, and the article G can be easily housed by opening the bag body 10.

After the article G is housed, a person who houses the article G cuts the thin portion 224 to remove the cut piece 225 of the male belt-shaped base 221, thereby providing the tamper-proof bag 1. With this arrangement, when the bag is attempted to be opened by holding the open end 12 of the bag body 10, a force is applied in directions in which the female belt-shaped base 211 and the male belt-shaped base 221 are sheared. With this force, the female claw 212C and the second male claw 222C are brought into engagement with each other while the female hook claw 213B and the male hook claw 223B are brought into engagement with each other, so that the engagement cannot be released. Accordingly, after the article G is housed in the bag body 10 and the engagement portions X, Y are brought into engagement, the opening operation per se is impossible, so that the zipper tape-equipped bag 2 capable of further preventing the article G from being tampered can be provided.

Moreover, even when the engagement portions X, Y of the zipper tape-equipped bag 2 are in the engagement, if the cut piece 225 is not yet removed, the engagement can be released. Accordingly, the engagement portions X, Y may be brought into engagement when manufacturing the bag, which facilitates the bag-making.

In the third exemplary embodiment, the position of the thin portion 224 is defined as such a position that a person cannot hold the male belt-shaped base 221 from the engagement portions X, Y to the thin portion 224 after the cut piece 225 of the male belt-shaped base 221 is removed by cutting the thin portion 224.

Accordingly, it is difficult to release the engagement portions X, Y in engagement, so that the zipper tape-equipped bag 2 capable of further preventing the article G from being tampered can be provided.

In the first exemplary embodiment, the plurality of engagement portions X, Y are provided.

Accordingly, an engaging force is increased, so that the zipper tape-equipped bag 2 capable of further preventing the article G from being tampered can be provided.

In the third exemplary embodiment, the engagement portion X near the thin portion 224 includes the female claw 212C and the second male claw 222C, each of which is shaped in a protrusion having the angle β of 90 degrees or less, specifically, the female claw 212C and the second male claw 222C protruding in a shape of a hook in a manner to be folded respectively toward the female belt-shaped base 211 and the male belt-shaped base 221.

With this arrangement, when the engagement of the engagement portions X, Y are released after the thin portion 224 is cut to remove the cut piece 225 of the male belt-shaped base 221, a force is applied to the female belt-shaped base 211 and the male belt-shaped base 221 in the directions for shearing the female belt-shaped base 211 and the male belt-shaped base 221, thereby firmly engaging the female claw 212C with the second male claw 222C. Accordingly, release of the engagement can be prevented to provide the zipper tape-equipped bag 2 capable of further preventing the article G from being tampered.

Further, in the third exemplary embodiment, the engagement portion Y in addition to the engagement portion X near the thin portion 224 includes the female hook claw 213B and the male hook claw 223B, each of which is shaped in a protrusion having the angle θ of 90 degrees or less, specifically, the female hook claw 213B and the male hook claw 223B protruding in a shape of a hook in a manner to be folded respectively toward the female belt-shaped base 211 and the male belt-shaped base 221.

With this arrangement, when the engagement of the engagement portions X, Y are released after the cut piece 225 is removed for tamper resistance, a force is applied to the female belt-shaped base 211 and the male belt-shaped base 221 in the directions for shearing the female belt-shaped base 211 and the male belt-shaped base 221, thereby firmly engaging the female hook claw 213B with the male hook claw 223B. Accordingly, in addition to the engagement of the female claw 212C and the second male claw 222C in the engagement portion X, the engaging force can be increased to further prevent the release of the engagement, so that the zipper tape-equipped bag 2 capable of further preventing the article G from being tampered can be provided.

Moreover, in the third exemplary embodiment, the engagement portion X near the thin portion 224 includes the first male claw 222B shaped in a protrusion having the angle α of 90 degrees or less, in other words, protruding in a mountain shape.

Accordingly, when releasing the engagement of the engagement portions X, Y by holding the cut piece 225 that is provided to the first side of the thin portion 224 before being cut apart from the male belt-shaped base 221, the first male claw 222B and the female claw 212C engaged with each other are respectively moved in directions separating from each other, so that the first male claw 222B moves over the female claw 212C to easily release the engagement. Thus, the member for restricting the engagement of the engagement portions X, Y before housing the article G is not required and the zipper tape-equipped bag 2 for housing the article G can be easily opened, thereby facilitating the housing operation of the article G.

In the third exemplary embodiment, the thin portion 224 is formed in a step dented from a surface of the male belt-shaped base 221 opposite from the surface on which the engagement portions X, Y are continuously formed.

Accordingly, when being welded on the base film 11, the thin portion 224 can be prevented from being welded on the base film 11, so that the thin portion 224 can be easily cut to remove the cut piece 225 and facilitate the housing operation of the article G.

Fourth Exemplary Embodiment

Next, a fourth exemplary embodiment of the invention will be described with reference to the drawings.

Figure 25:
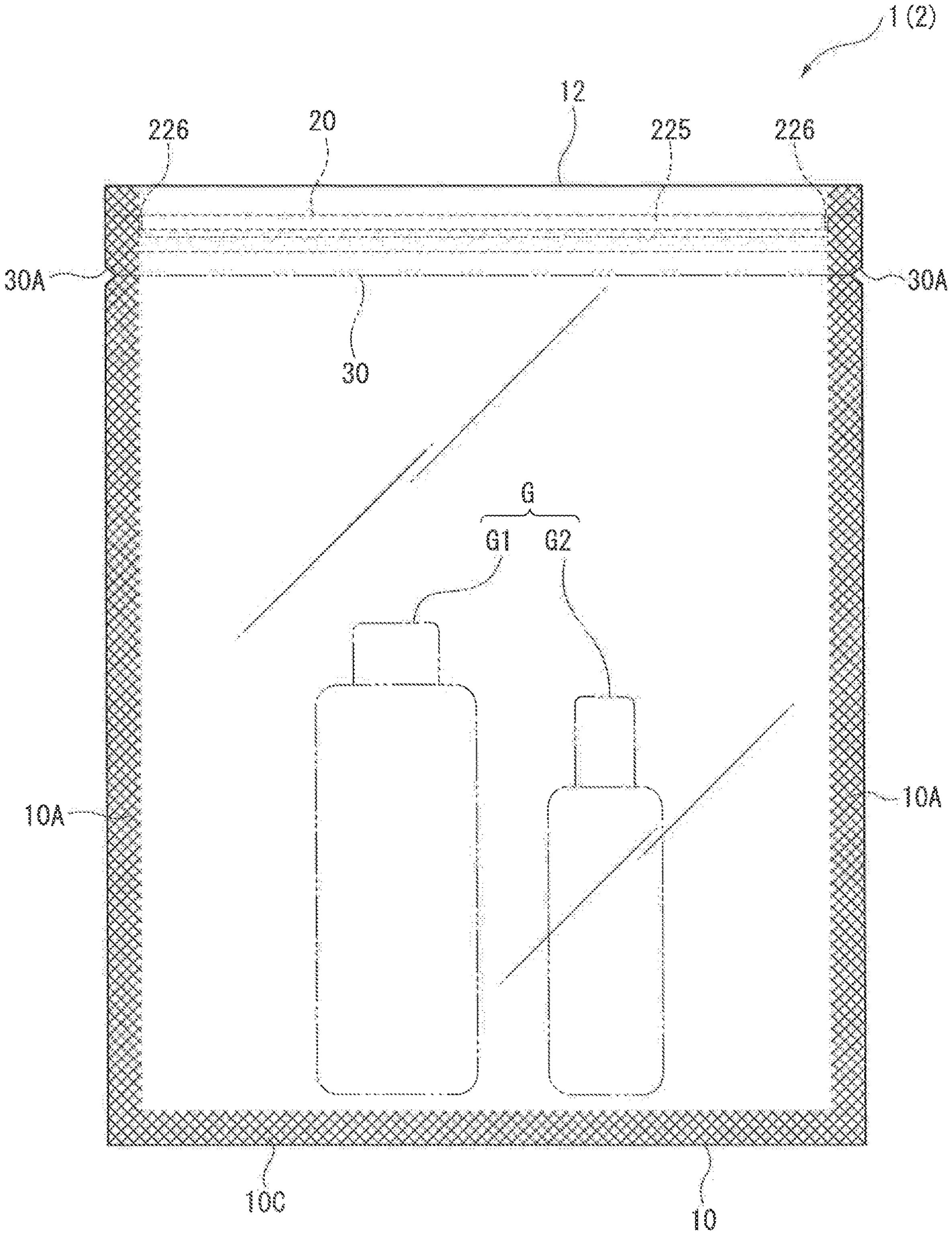
FIG. 25 is a plan view of a tamper-proof bag according to a fourth exemplary embodiment of the invention.
Figure 26:
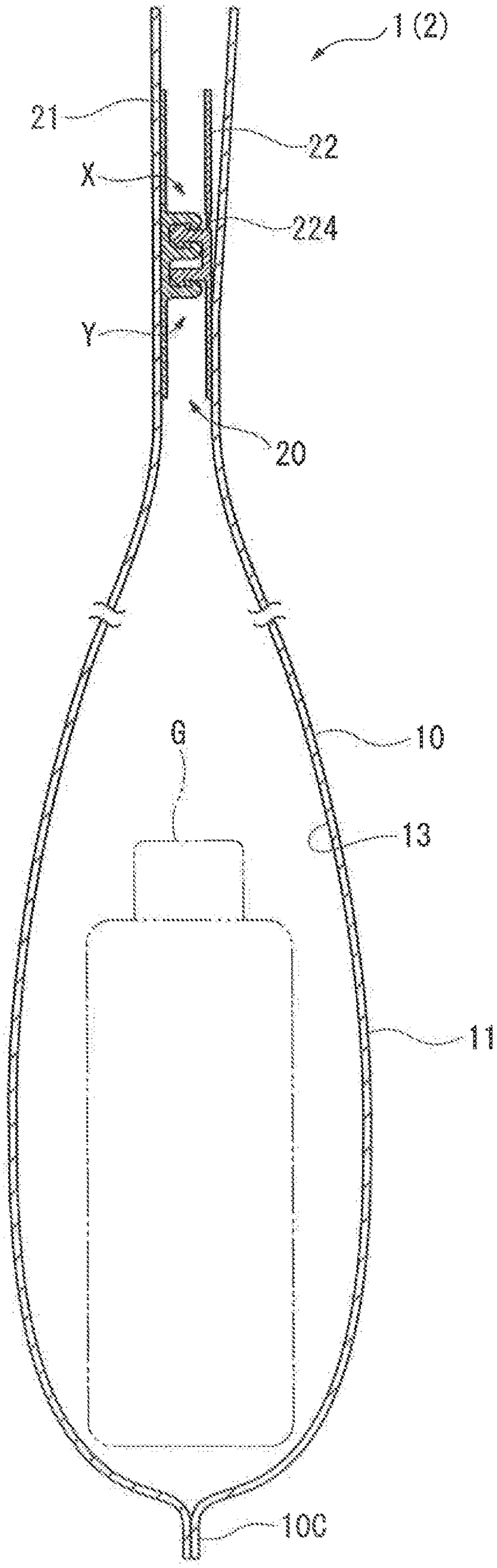
FIG. 26 shows a cross section of the tamper-proof bag.

FIG. 25 is a plan view showing a tamper-proof bag 1 according to the fourth exemplary embodiment. FIG. 26 shows a cross section of the tamper-proof bag 1.

In the fourth exemplary embodiment, the bag is manufactured, for instance, by the three-sided sealing shown in FIG. 11 in the second exemplary embodiment in place of the vertical-pillow-bag manufacturing method in the third exemplary embodiment.

Arrangement of Tamper-Proof Bag

As shown in FIGS. 25 and 26, the tamper-proof bag 1 of the fourth exemplary embodiment includes the bottom seal portion 10C in place of the gusset 10B of the tamper-proof bag 1 in the third exemplary embodiment.

Advantages of Fourth Exemplary Embodiment

Also in the zipper tape-equipped bag 2 manufactured by the three-sided sealing of the fourth exemplary embodiment, when the cut piece 225 of the male belt-shaped base 221 is not yet removed by cutting the thin portion 224, the engagement may be released by holding the cut piece 225 at the first side of the male belt-shaped base 221 from the thin portion 224 to the end of the male belt-shaped base 221 near the open end 12 of the bag body 10. Accordingly, even when the engaged zipper tape 20 is attached when manufacturing the zipper tape-equipped bag 2, the article G can be housed. Moreover, even when the engagement portions X, Y are brought into engagement during the delivery of the zipper tape-equipped bag 2 to the retail shop and the like, the zipper tape-equipped bag 2 can be easily opened. Thus, the member for restricting the engagement of the engagement portions X, Y before housing the article G is not required. Even when the article G is accidentally housed, the article G can be taken out and re-housed if the cut piece 225 is not yet cut, and the article G can be easily housed by opening the bag body 10.

After the article G is housed, a person who houses the article G cuts the thin portion 224 to remove the cut piece 225 of the male belt-shaped base 221, thereby providing the tamper-proof bag 1. With this arrangement, when the bag is attempted to be opened by holding the open end 12 of the bag body 10, a force is applied in directions in which the female belt-shaped base 211 and the male belt-shaped base 221 are sheared. With this force, the female claw 212C and the second male claw 222C are brought into engagement with each other while the female hook claw 213B and the male hook claw 223B are brought into engagement with each other, so that the engagement cannot be released. Accordingly, after the article G is housed in the bag body 10 and the engagement portions X, Y are brought into engagement, the opening operation per se is impossible, so that the zipper tape-equipped bag 2 capable of further preventing the article G from being tampered can be provided.

Moreover, even when the engagement portions X, Y of the zipper tape-equipped bag 2 are in the engagement, if the cut piece 225 is not yet removed, the engagement can be released. Accordingly, the engagement portions X, Y may be brought into engagement when manufacturing the bag, which facilitates the bag-making.

Fifth Exemplary Embodiment

Arrangement of Tamper-Proof Bag

Next, a fifth exemplary embodiment of the invention will be described with reference to the drawings.

Figure 27:
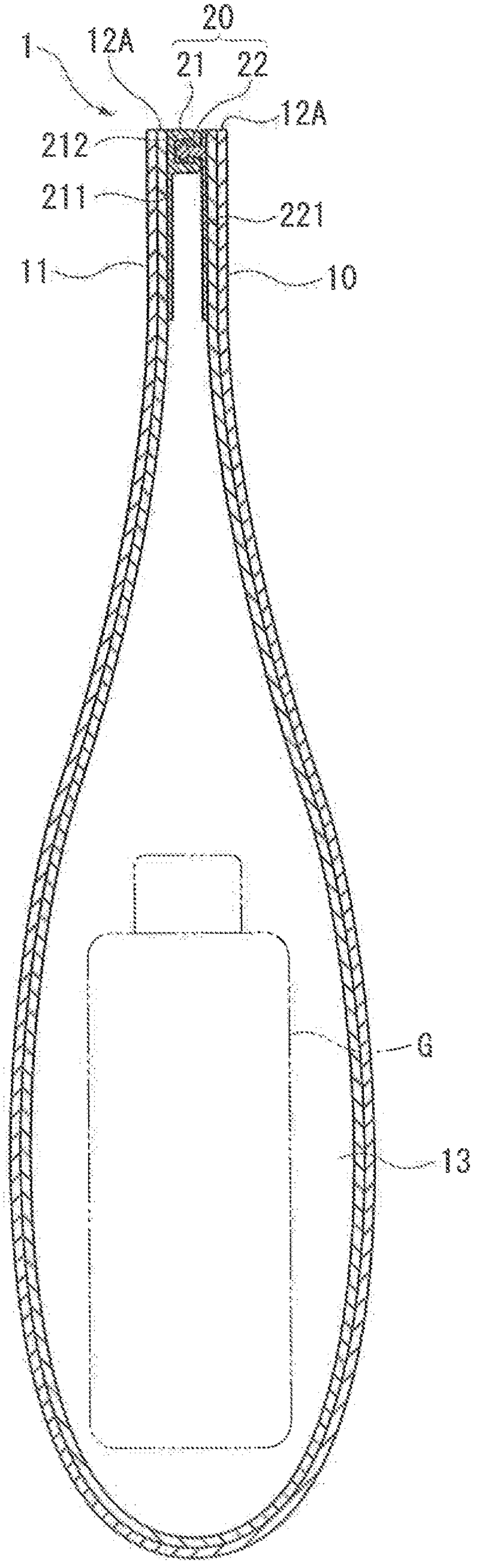
FIG. 27 shows a cross section of a tamper-proof bag (zipper tape-equipped bag) according to a fifth exemplary embodiment of the invention.
Figure 28:
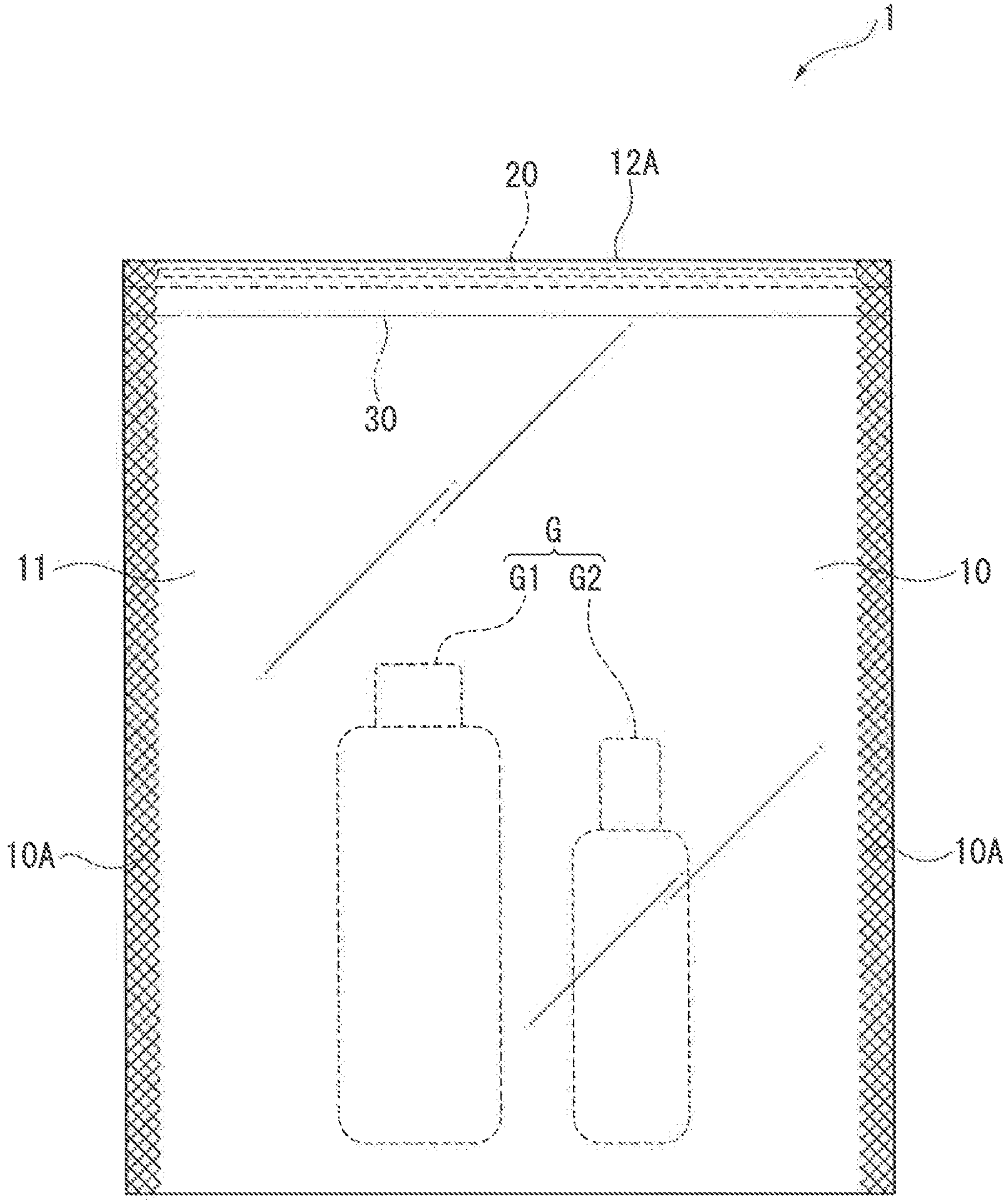
FIG. 28 is a front view of the tamper-proof bag.

FIG. 27 is a cross-sectional view showing a tamper-proof bag 1 according to the fifth exemplary embodiment. FIG. 28 is a plan view showing the tamper-proof bag 1.

As shown in FIGS. 27 to 28, the tamper-proof bag 1 includes the zipper tape-equipped bag 2 housing the article G.

Arrangement of Tamper-Proof Zipper Tape-Equipped Bag

Figure 29:
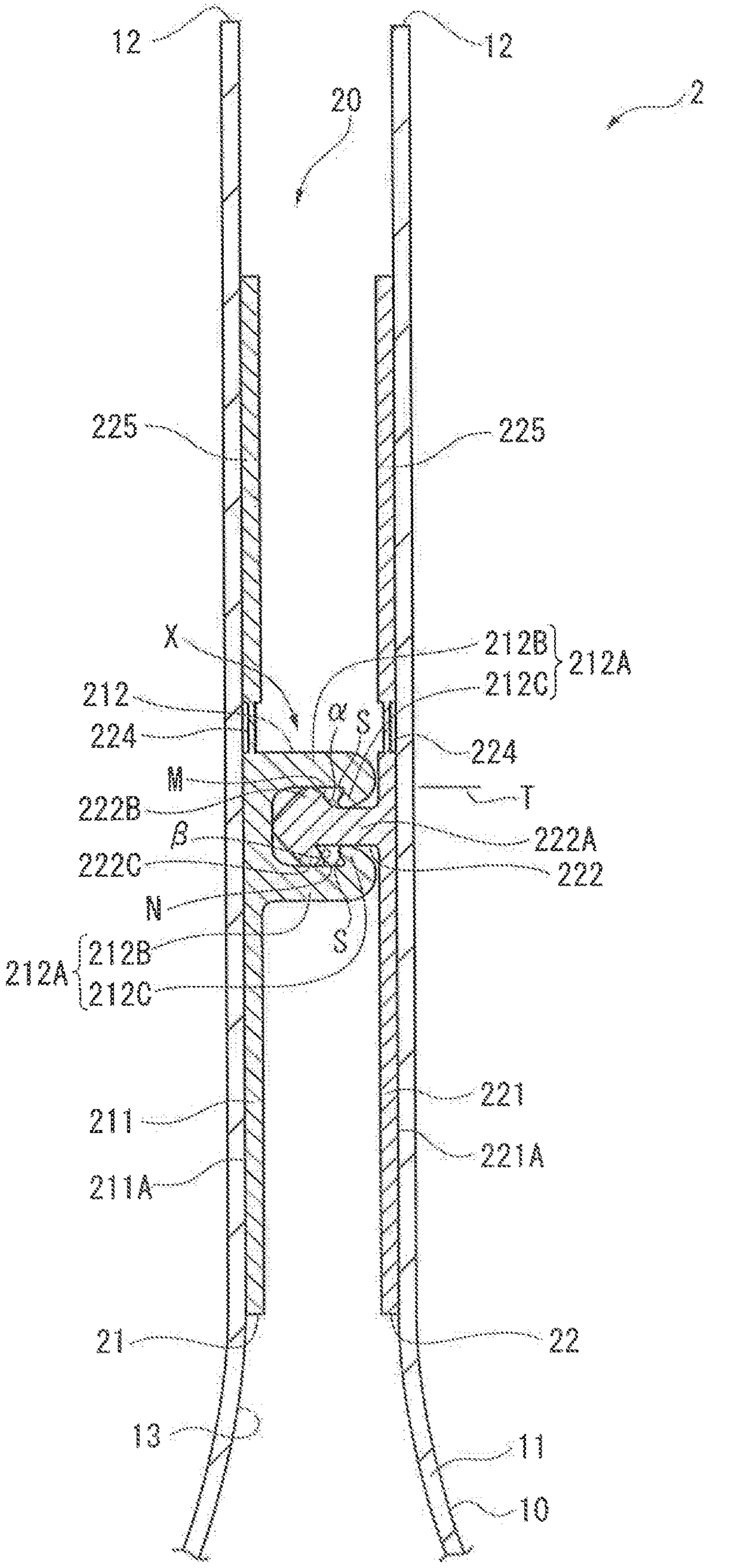
FIG. 29 shows a cross section of a vicinity of a zipper tape of the zipper tape-equipped bag before housing an article.

FIG. 29 shows a cross section of a vicinity of the zipper tape 20 of the zipper tape-equipped bag 2 in the fifth exemplary embodiment.

As shown in FIG. 29, the tamper-proof zipper tape-equipped bag 2 is particularly used as the tamper-proof bag 1 housing the article G and includes: the bag body 10 configured to house the article G; and a tamper-proof zipper tape 20 which is bonded to opposing inner surfaces of the bag body 10. The opening cut portion 30 is provided at a side of the bag body 10 near the article housed therein with respect to the tamper-proof zipper tape 20. Moreover, a V-shaped notch 53 (see FIGS. 31A to 31C), which defines an opening start point, is formed at a position corresponding to a later-described linear cut portion 50 (see FIGS. 30A to 30C) on the bag body 10.

Although the multi-layered base film 11 is provided as the bag body 10 in the fifth exemplary embodiment, the base film 11 may be single-layered or multi-layered in the same manner as in the third and fourth exemplary embodiments. Since the arrangement of the bag body 10 is the same as those in the third and fourth exemplary embodiments, description thereof will be omitted herein.

Arrangement of Zipper Tape

The tamper-proof zipper tape 20 includes the female tape member 21 and the male tape member 22 in parallel to the open end 12.

The female tape member 21 includes: the female belt-shaped base 211; and the female hook 212 continuously formed substantially at the center in the width direction on the surface of the female belt-shaped base 211.

The female belt-shaped base 211 in a form of a flat plate has a bonding surface 211A bonded to an inner surface of the bag body 10, the bonding surface 211A being an opposite surface from the surface where the female hook 212 is formed.

The female hook 212 has a pair of opposing female components 212A. Each of the female components 212A includes: the protrusion 212B protruding from a flat surface of the female belt-shaped base 211; and the female claw 212C (engageable female claw) integrally formed with a tip end of the protruding protrusion 212B and protruding only in a direction approaching each other.

A pair of female claws 212C forming the female hook 212 respectively have inclined surfaces S configured to be respectively engaged with the first male claw 222B and the second male claw 222C. An angle of each of the inclined surfaces S relative to a perpendicular line T of the female belt-shaped base 211 is less than 90 degrees, preferably, in a range from 45 degrees to 80 degrees. A tip end of each of the first male claw 222B and the second male claw 222C is folded toward the female belt-shaped base 211.

The male belt-shaped base 211 includes the thin portion 224 that is positioned at the base end of the female hook 212 near the open end 12. The thin portion 224 is formed to be stepped from both the surfaces of the female belt-shaped base 211. The position where the thin portion 224 is provided is defined at a position where a distance from the base end of the female hook 212 to the thin portion 224 is in a range from 0.0 mm to 2.0 mm.

The male tape member 22 includes: the male belt-shaped base 221 placed facing the female belt-shaped base 211; and the male hook 222 continuously formed substantially at the center in the width direction on a surface of the male belt-shaped base 221 and configured to be engaged with the female hook 212.

The male belt-shaped base 221 in a form of a flat plate has a bonding surface 221A bonded to the inner surface of the bag body 10, the bonding surface 211A being an opposite surface from the surface where the male hook 222 is formed.

The male hook 222 having an arrowhead-shaped cross section includes: the protrusion 222A protruding from a flat surface of the male belt-shaped base 221; and the first male claw 222B and the second male claw 222C protruding from a tip end of the protrusion 222A toward each of the housing space 13 and the open end 12.

The first male claw 222B and the second male claw 222C are engaged with the female claw 212C.

The first male claw 222B protrudes toward the open end 12 and has the inclined surface M to be engaged with the female claw 212C positioned near the open end 12. The angle a that is an obtuse angle of angles formed between the inclined surface M and the perpendicular line T of the male belt-shaped base 221 is 90 degrees or more, preferably, in a range from 100 degrees to 135 degrees. The first male claw 222B is formed to have a cross section shaped in a mountain.

The second male claw 222C protrudes toward the housing space 13 and has the inclined surface N to be engaged with the female claw 212C positioned near the housing space 13. The angle β that is an acute angle of angles formed between the inclined surface N and the perpendicular line T of the male belt-shaped base 221 is 90 degrees or less, preferably, in a range from 45 degrees to 80 degrees. A tip end of the second male claw 222C is folded toward the male belt-shaped base 221.

The male belt-shaped base 221 includes the thin portion 224 that is positioned at the base end of the male hook 222 near the open end 12. The thin portion 224 is formed to be stepped from both the surfaces of the male belt-shaped base 221. The position where the thin portion 224 is provided is a position where a distance from the base end of the first male hook 222 to the thin portion 224 is in a range from 0.0 mm to 2.0 mm.

The thin portion 224 of each of the female belt-shaped base 211 and the male belt-shaped base 221 functions as the linear cut portion 50.

Housing Method of Article

Next, an article housing method of housing the article G into the zipper tape-equipped bag 2 will be described below with reference to the attached drawings.

Figure 30A:
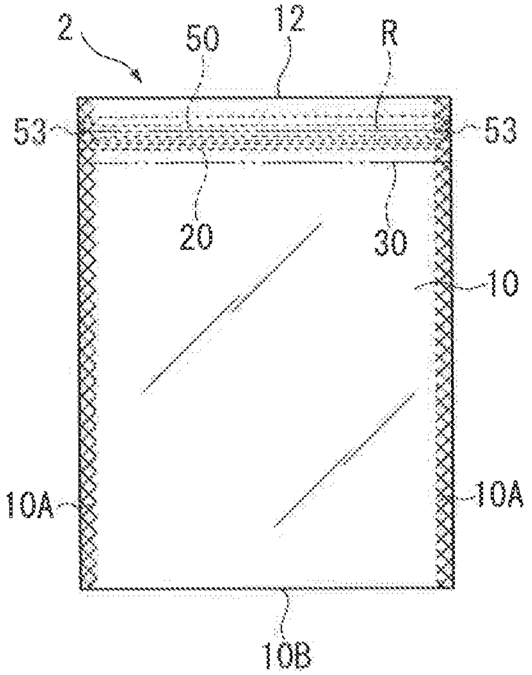
FIG. 30A shows a concept for explaining an article-housing method of housing an article into the zipper tape-equipped bag and especially shows an opening step.
Figure 30B:
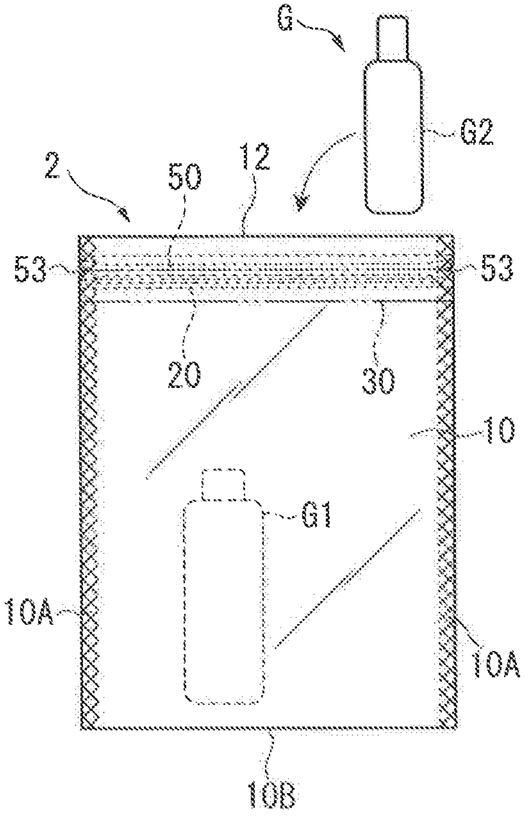
FIG. 30B shows a concept for explaining an article-housing method of housing an article into the zipper tape-equipped bag and especially shows a housing step.
Figure 30C:
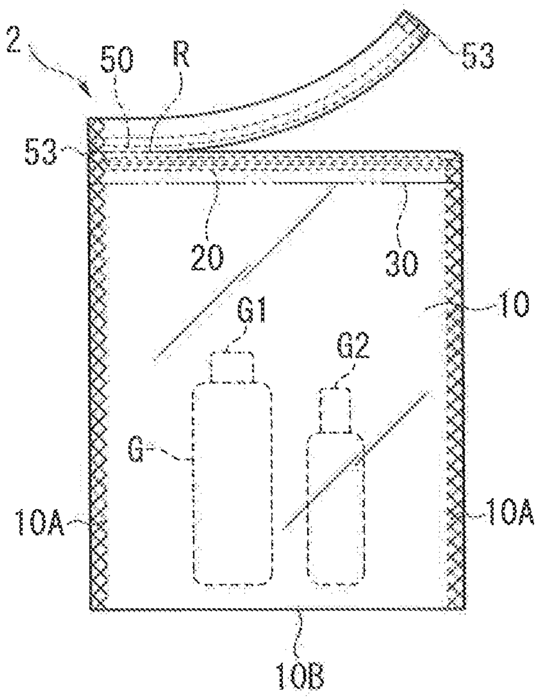
FIG. 30C shows the concept for explaining the article-housing method of housing an article into the zipper tape-equipped bag and especially shows that a first side of a belt-shaped base in an engaged state is cut.
Figure 30D:
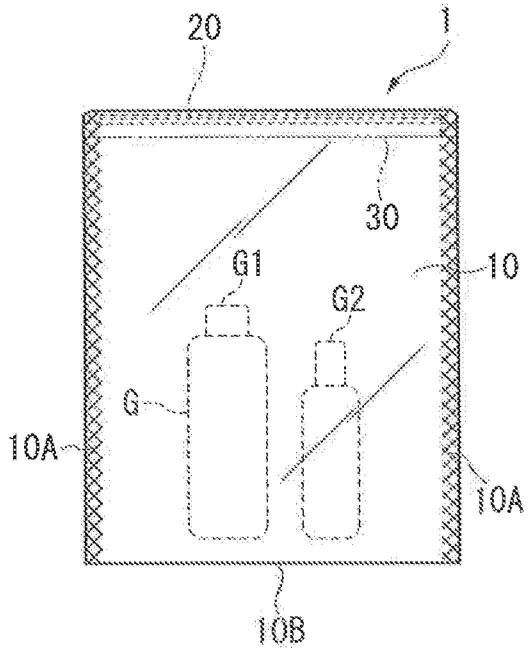
FIG. 30D shows the concept for explaining the article-housing method of housing an article into the zipper tape-equipped bag and especially shows a tamper-proof bag after housing the article.
Figure 31:
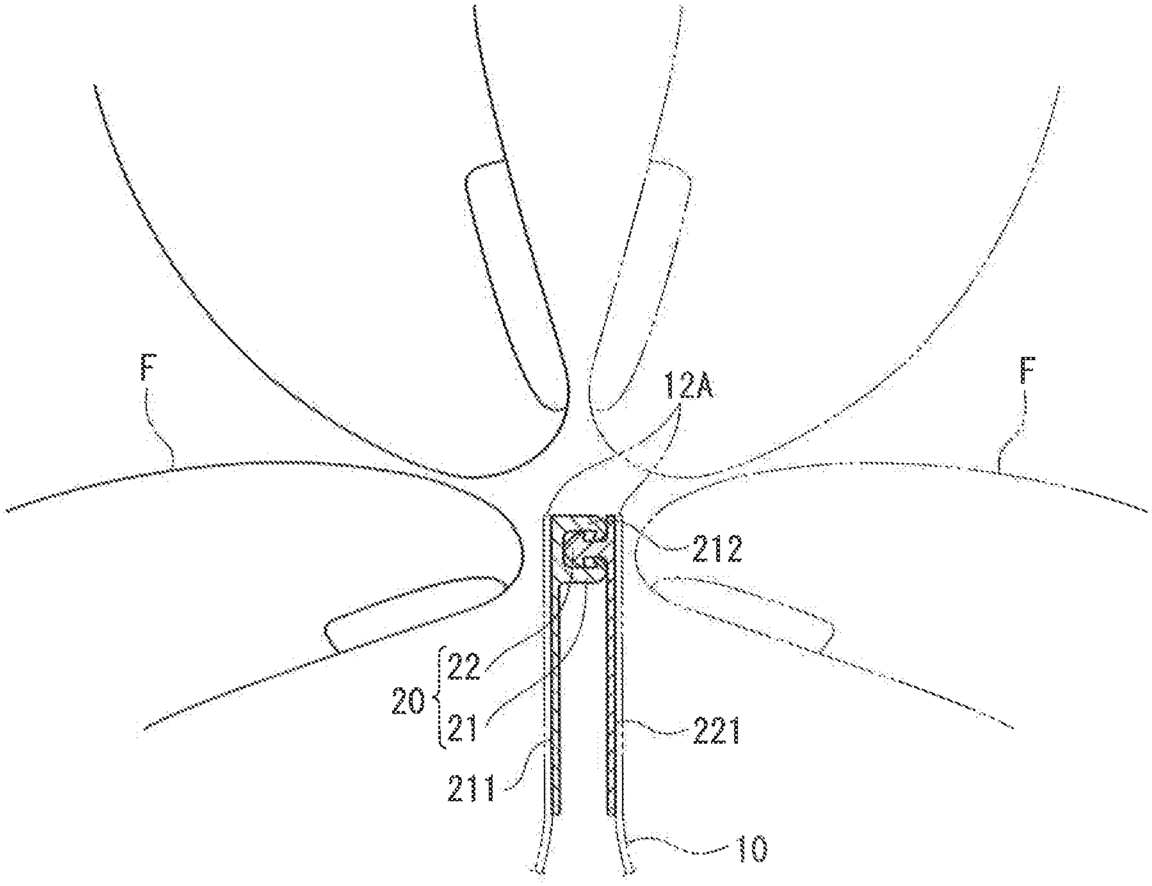
FIG. 31 shows a cross section of an open end of the tamper-proof bag.

FIG. 30A shows a concept for explaining the article housing method of housing the article G into the zipper tape-equipped bag 2, showing the opening step. FIG. 30B shows the housing step. FIG. 30C shows engaging and cutting the first side of the belt-shaped base. FIG. 30D shows the tamper-proof bag 1 after housing the article. FIG. 31 is a cross-sectional view showing the open end 12 of the tamper-proof bag 1.

After the zipper tape-equipped bag 2 is manufactured using a so-called vertical-pillow-bag manufacturing device 4 shown in FIG. 11, for instance, in the same manner as in the second exemplary embodiment, the zipper tape-equipped bag 2 is delivered to a retail shop and the like.

As shown in FIG. 30A, the retail shop and the like perform the opening step of opening the open end 12 of the bag body 10. In this opening step, when the engagement portions X, Y are in engagement, by holding the respective sides of the female belt-shaped base 211 and the male belt-shaped base 221 near the open end 12 and applying a force in directions separating from each other, the engagement of the engagement portions X, Y are released and the bag is opened.

Subsequent to the opening step, as shown in FIG. 30B, the housing step of housing the article G into the housing space 13 of the bag body 10 is performed. Subsequent to the housing step, the engaging step in which the engagement portions X, Y are brought into engagement from one end to the other end of the zipper tape 20 to engage the female tape member 21 with the male tape member 22 is performed.

Subsequent to the engaging step, as shown in FIG. 30C, a cutting step in which the thin portion 224 of the linear cut portion 50 is torn from a first notch 53 to a second notch 53 and a side of the bag body 10 near the open end 12 is cut together with the cut piece 225 along a planned cut line R.

With the above steps, the tamper-proof bag 1 in which the article G is housed in the housing space 13 is completed as shown in FIG. 30D.

When the side of the bag body 10 near the open end 12 is cut together with the cut piece 225 along the planned cut line R as shown in FIG. 30D, an end of the cut bag body 10 is defined as an open end 12A of the tamper-proof bag 1. Accordingly, as shown in FIG. 31, the female belt-shaped base 211, the male belt-shaped base 221 and the open end 12A of the bag body 10 cannot be held with a human finger F, so that the engagement cannot be released to avoid opening of the tamper-proof bag 1.

A customer who has bought the tamper-proof bag 1 in which the article G is housed only needs to cut the bag body 10 with use of the opening cut portion 30 in order to take out the article G.

Advantages of Fifth Exemplary Embodiment

As described above, in the fifth exemplary embodiment, the zipper tape 20, in which both of the female belt-shaped base 211 and the male belt-shaped base 221 have the respective thin portions 224 near the position of the engagement portion X, is provided.

With this arrangement, by cutting the thin portions 224 to remove the side of the bag body 10 near the open end 12 together with the respective cut pieces 225, an end (open end 12A) of the engagement portion X on an opposite side from a side where the article G is housed is substantially flush with the open end 12A of the bag body 10. Accordingly, even when the engagement of the engagement portion X after the article G is housed is attempted to be released, the opening operation per se is impossible since the engagement portion X of the zipper tape 20 and the open end 12A of the bag body 10 cannot be held. Consequently, the zipper tape-equipped bag 2 capable of further preventing the article G from being tampered can be provided.

In the fifth exemplary embodiment, after the article G is housed, the cut piece 225 and the side of the bag body 10 near the open end 12 are cut apart with use of the linear cut portion 50.

With this arrangement, even when the engagement portion X is accidentally brought into engagement during the delivery of the zipper tape-equipped bag 2 to the retail shop and the like, or even when the zipper tape 20 in the engagement is attached for manufacturing the bag, the zipper tape-equipped bag 2 can be easily opened in the same manner as in the third and fourth exemplary embodiments. Thus, the member for restricting the engagement of the engagement portion X before housing the article G is not required. Even when the article G is accidentally housed, the article G can be taken out and re-housed if the linear cut portion 50 is not yet cut, and the article G can be easily housed by opening the bag body 10.

Moreover, since the zipper tape 20 and the linear cut portion 50 are formed of the same material in the fifth exemplary embodiment, the zipper tape 20 and the linear cut portion 50 can be integrally formed. Accordingly, the zipper tape-equipped bag 2 can be efficiently manufactured.

In the third to fifth exemplary embodiments, the thin portion 224 is formed not only in a step but also in a concave curve such as a V-shape and a U-shape in the cross section. The thin portion 224 may be punched in a straight line such as so-called perforation and is configured to be cut to remove the cut piece 225.

Figure 32:
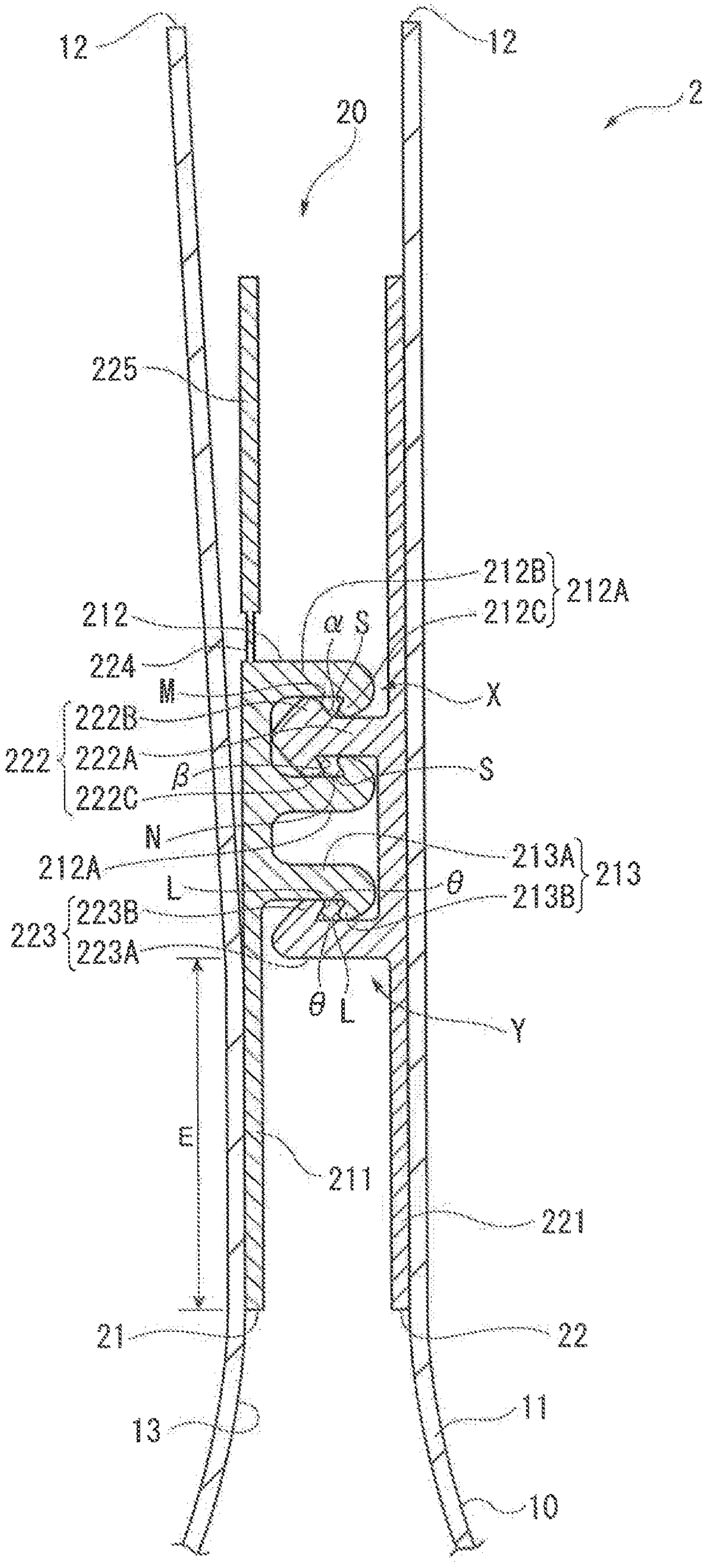
FIG. 32 shows a cross section of a vicinity of a zipper tape of a tamper-proof zipper tape-equipped bag according to a still further exemplary embodiment of the invention.

Although the thin portion 224 is provided to the male belt-shaped base 221 in the third and fourth exemplary embodiments, the thin portion 224 may be provided to the female belt-shaped base 211 as shown in FIG. 32. Further, the thin portion 224 may be provided to each of the female belt-shaped base 211 and the male belt-shaped base 221 and only one of the female belt-shaped base 211 and the male belt-shaped base 221 may be attached to the bag body 10 only in the bonding region E.

Figure 33:
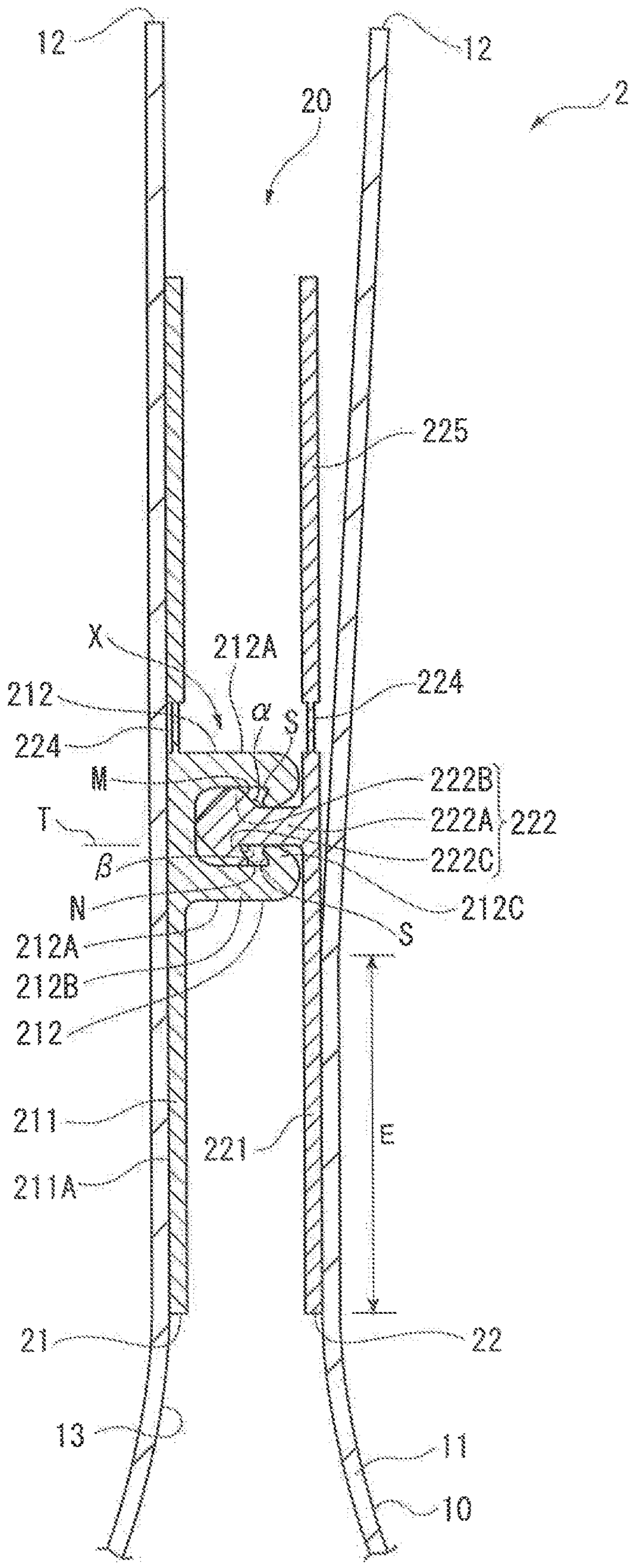
FIG. 33 shows a cross section of a vicinity of a zipper tape of a tamper-proof zipper tape-equipped bag according to a still further exemplary embodiment of the invention.

Moreover, in the third and fourth exemplary embodiments, only the engagement portion X may be provided as shown in FIG. 33. Further, as shown in FIG. 33, the thin portion 224 may be provided to each of the female belt-shaped base 211 and the male belt-shaped base 221. In this arrangement, since only one of the female belt-shaped base 211 and the male belt-shaped base 221 is attached to the bag body 10 only in the bonding region E, it is only required to cut the cut piece 225 that is not attached to the bag body 10 for a tamper-proof purpose. Moreover, since the thin portions 224 are provided to both of the female belt-shaped base 211 and the male belt-shaped base 221, the bag can be prevented from being tampered by cutting both the thin portions 224 together with the side of the bag body 10 near the open end 12 as described in the fifth exemplary embodiment.

The shapes of the respective engagement portions X, Y can be changed as needed.

Figure 34:
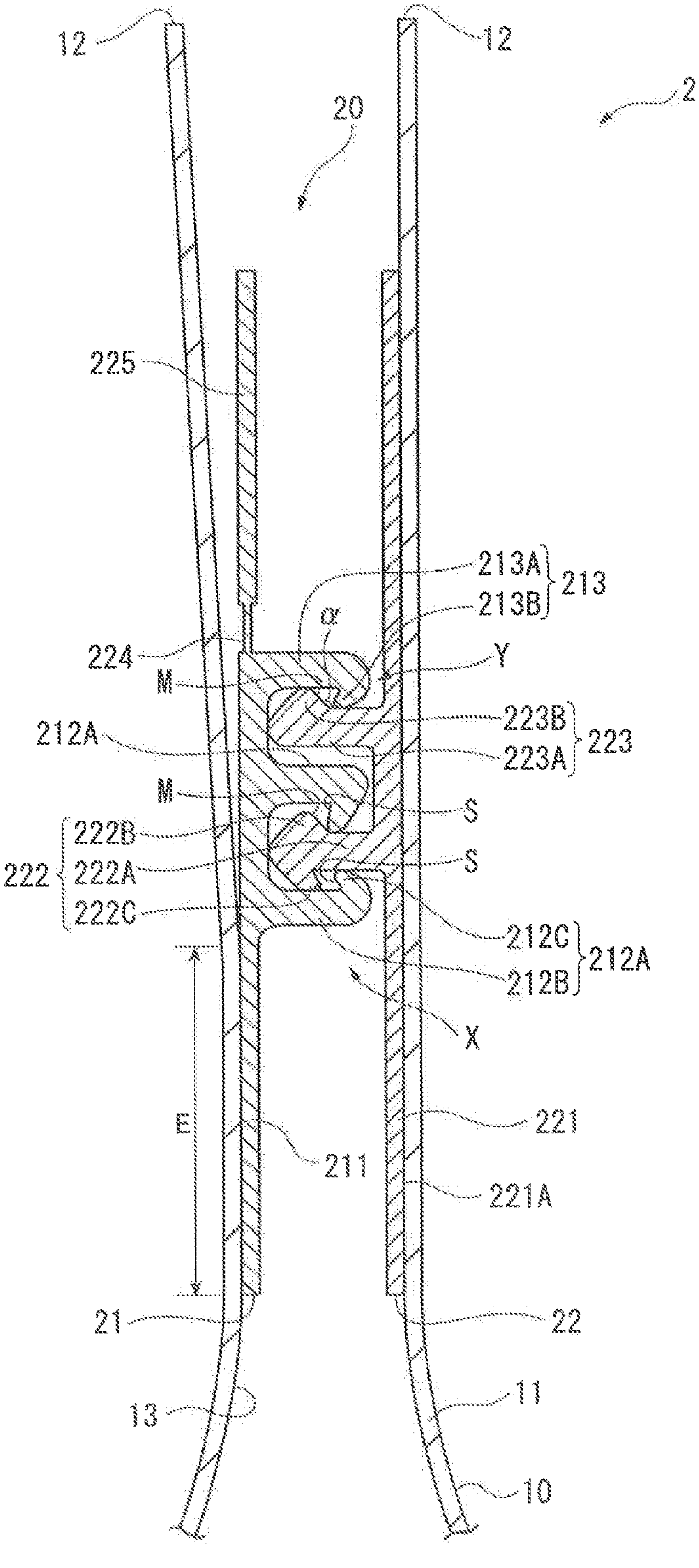
FIG. 34 shows a cross section of a vicinity of a zipper tape of a tamper-proof zipper tape-equipped bag according to a still further exemplary embodiment of the invention.

For instance, as shown in FIG. 34, the engagement portion Y may be formed to be positioned near the open end 12. In the arrangement shown in FIG. 34, it is preferable that the male hook claw 223B protruding toward the open end 12 has a cross section shaped in a mountain in the same manner as the first male claw 222B of the first male hook 222, thereby easily opening the bag in order to house the article G.

The shape of the engagement portion X is not limited to the shape having an arrowhead-shaped cross section including a single protrusion 222A, the first male claw 222B and the second male claw 222C. For instance, as shown in FIG. 36, the first male hook 222 may be divided along the width direction and three pairs of the male hook and the female hook may be provided.

Figure 35:
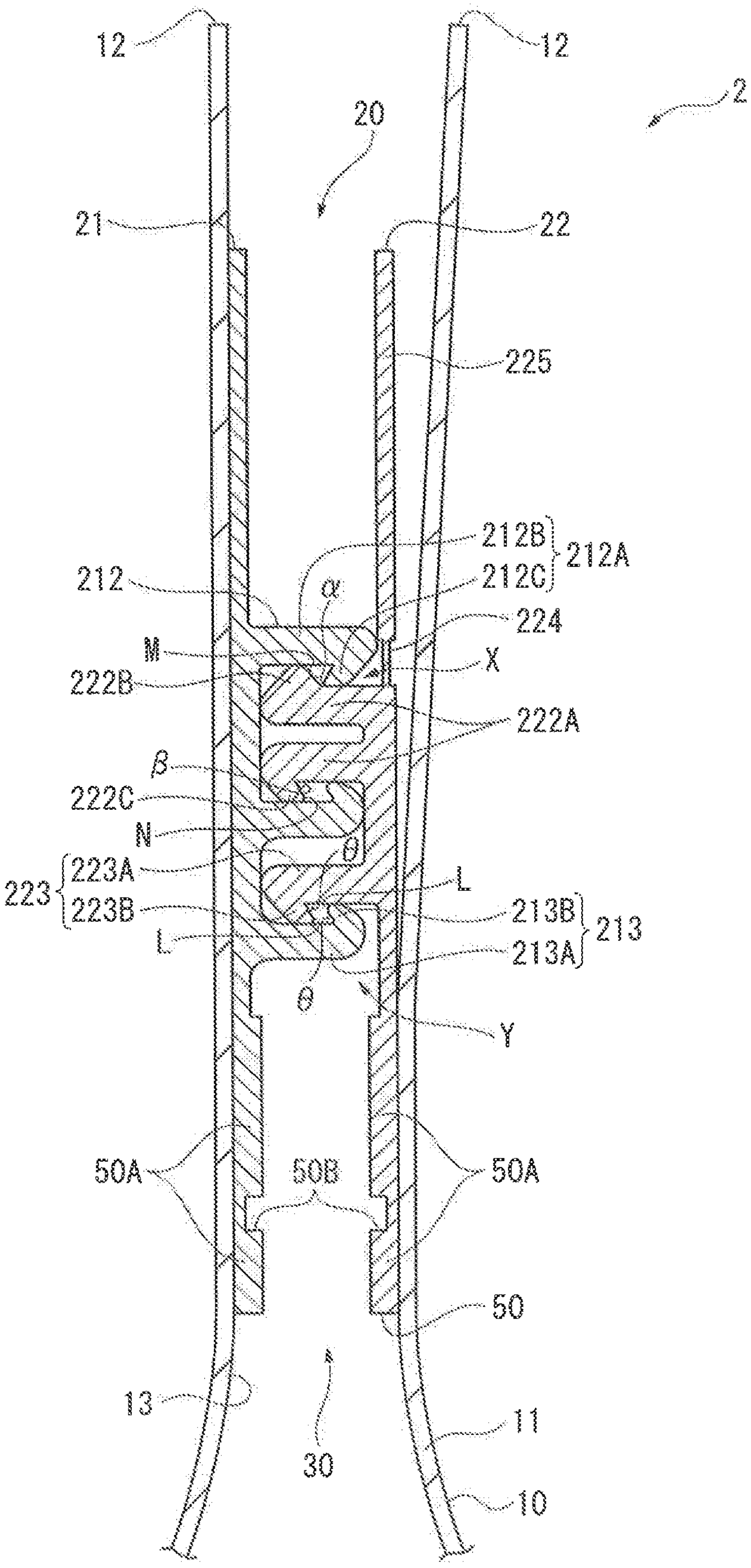
FIG. 35 shows a cross section of a vicinity of a zipper tape of a tamper-proof zipper tape-equipped bag according to a still further exemplary embodiment of the invention.

The opening cut portion 30 is not necessarily attached to the bag body 10 as in the third exemplary embodiment. For instance, the opening cut portion 30 may be integrally formed with each of the female tape member 21 and the male tape member 22 of the zipper tape 20 to provide the linear cut portion 50 including thick portions 50A and a thin portion 50B provided therebetween as shown in FIG. 35, or alternatively, may be a linear cut film provided on the bag body 10 away from the female tape member 21 and the male tape member 22.

The opening cut portion 30 is not necessarily provided. In other words, the article G can be taken out by cutting the bag body 10 with a cutter such as scissors even when no opening cut portion 30 is provided.

Figure 36:
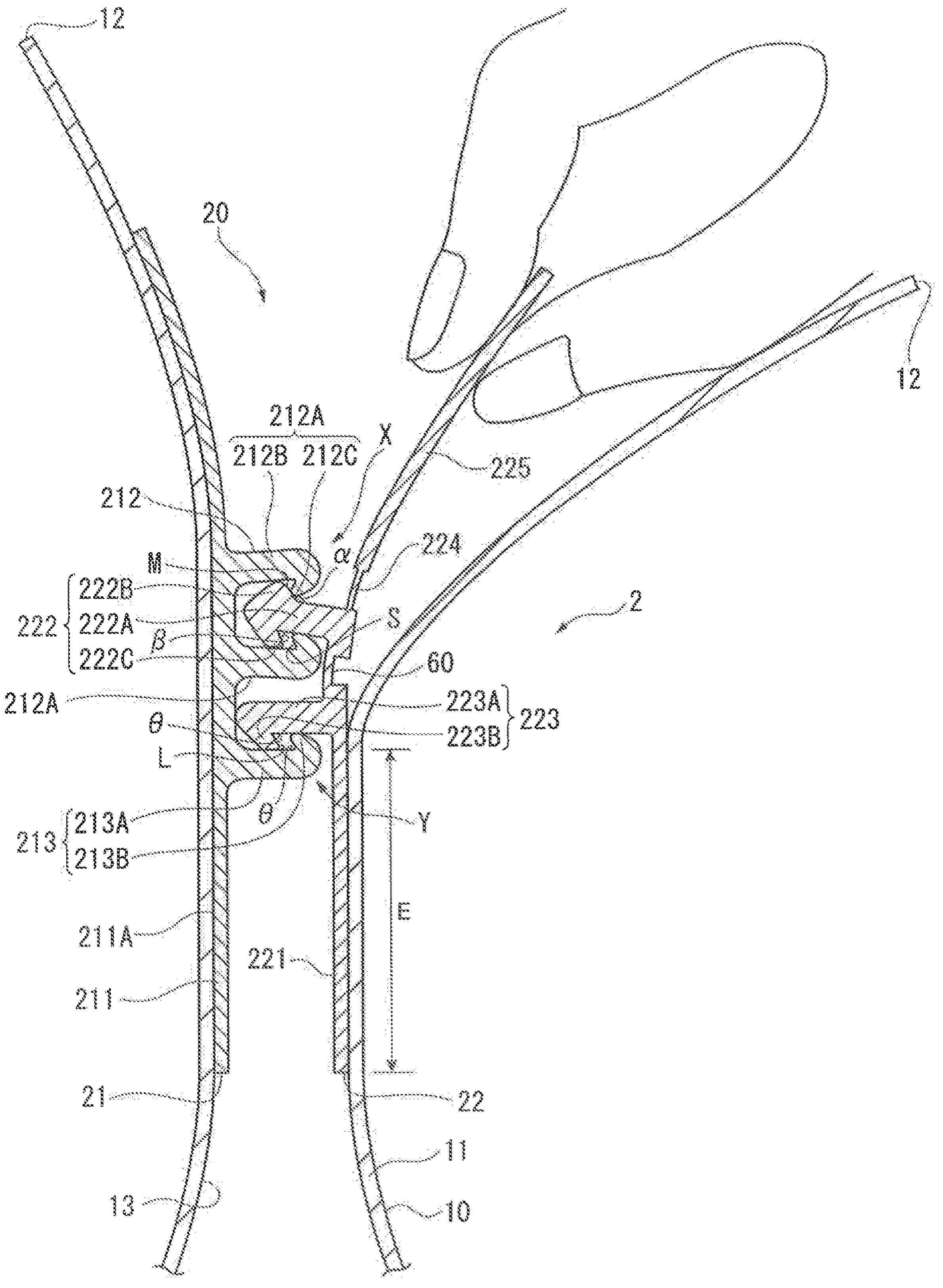
FIG. 36 shows a cross section of a vicinity of a zipper tape of a tamper-proof zipper tape-equipped bag according to a still further exemplary embodiment of the invention.
Figure 37:
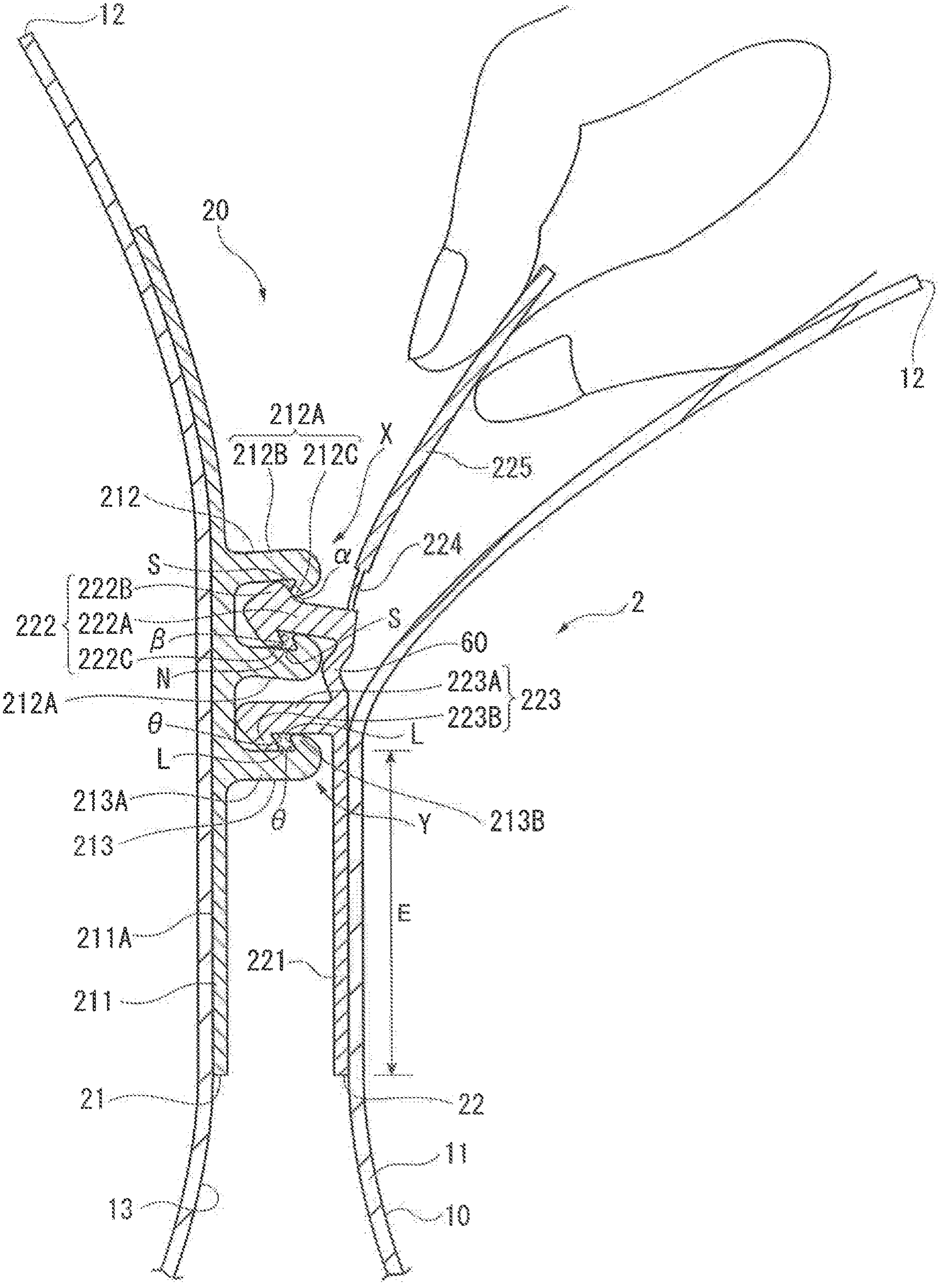
FIG. 37 shows a cross section of a vicinity of a zipper tape of a tamper-proof zipper tape-equipped bag according to a still further exemplary embodiment of the invention.
Figure 38:
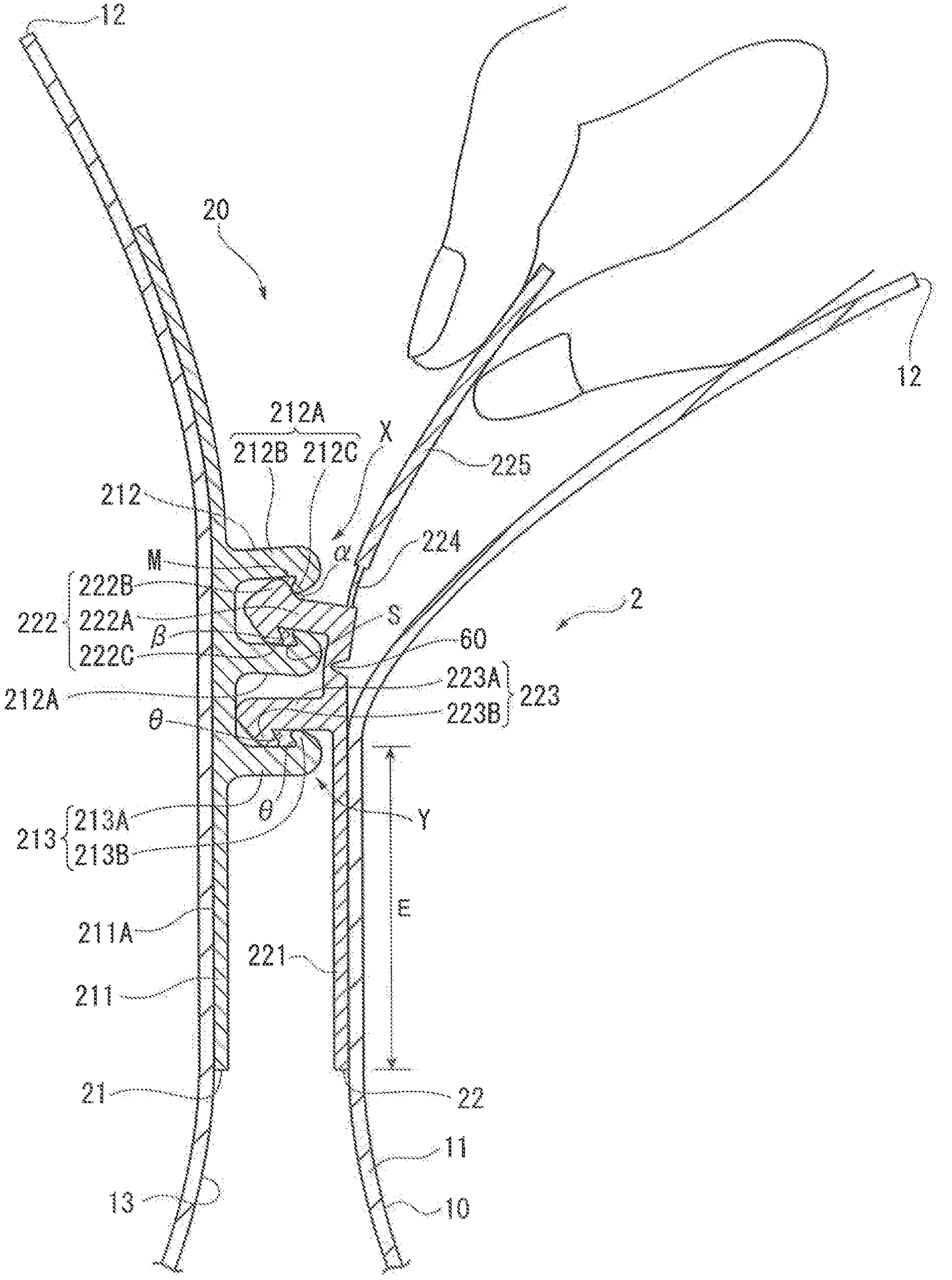
FIG. 38 shows a cross section of a vicinity of a zipper tape of a tamper-proof zipper tape-equipped bag according to a still further exemplary embodiment of the invention.

Moreover, in the third exemplary embodiment, for instance, as shown in FIGS. 36 to 38, a deformable portion 60 may be provided between the engagement portions X, Y such that a portion of the belt-shaped base between the engagement portions X, Y can be easily bent in the opening step.

Specifically, as shown in FIG. 36, the deformable portion 60 is formed thinner than the other portions of the belt-shaped base (the male belt-shaped base 221) and is configured to be bendable in the thickness direction by a stress smaller than a bending stress in the thickness direction in the belt-shaped base (the male belt-shaped base 221). Moreover, as shown in FIG. 37, without changing the thickness, the deformable portion 60 may be formed bent and is configured to be bendable in the thickness direction by a stress smaller than the bending stress in the thickness direction in the belt-shaped base (the male belt-shaped base 221). Further, as shown in FIG. 38, the deformable portion 60 having a cross section of a V-shaped groove may be formed thinner than the other portions of the belt-shaped base and may be configured to be bendable in the thickness direction by the stress smaller than the bending stress in the thickness direction in the belt-shaped base. Furthermore, the deformable portion 60 may be formed of a soft member than the belt-shaped base (the male belt-shaped base 221) so as to be more bendable than the belt-shaped base (the male belt-shaped base 221).

Figure 39:
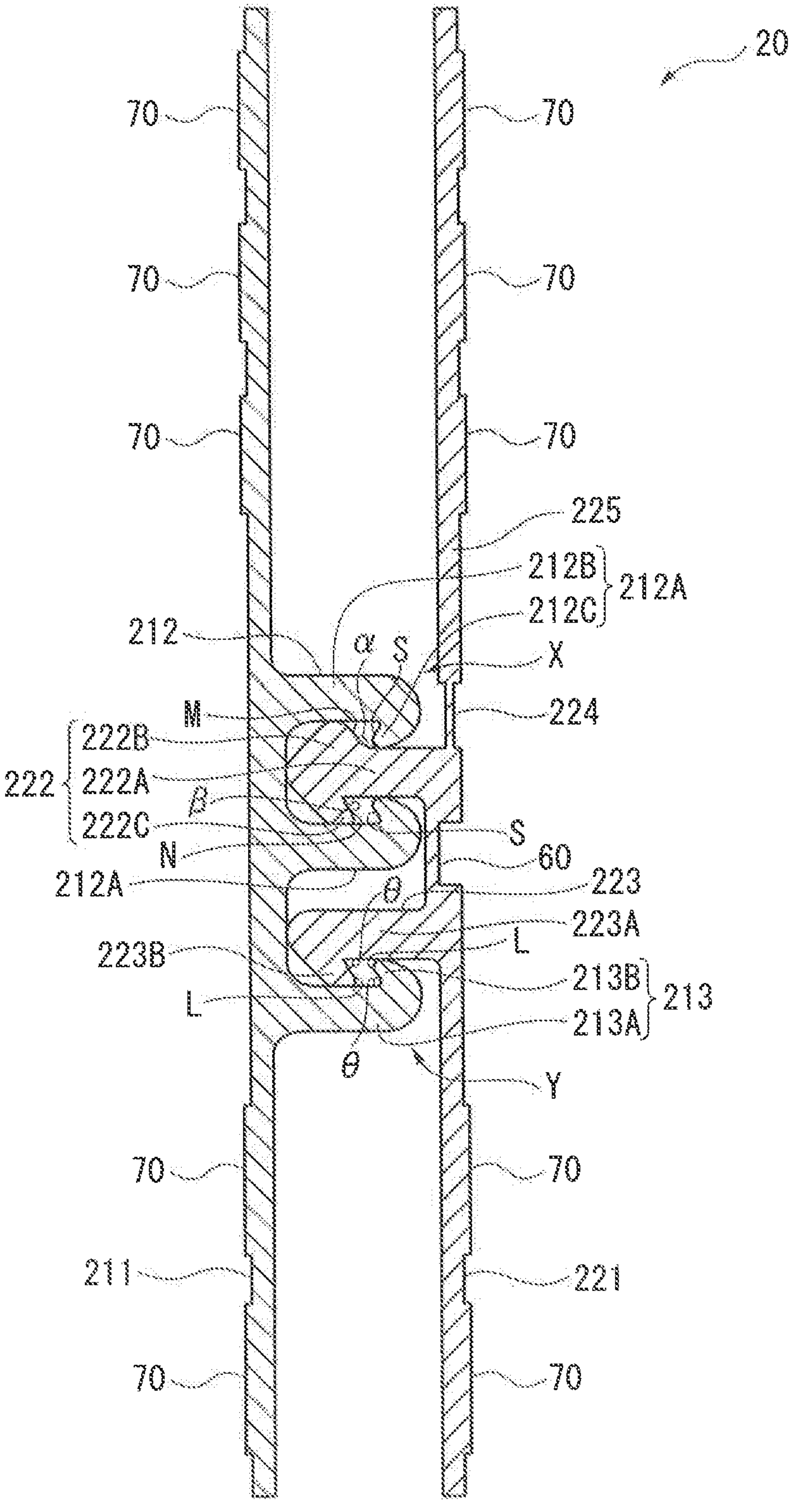
FIG. 39 shows a cross section of a vicinity of a zipper tape of a tamper-proof zipper tape-equipped bag according to a still further exemplary embodiment of the invention.

For instance, as shown in FIG. 39, the zipper tape 20 may include a rib 70 protruding from a surface of each of the female belt-shaped base 211 and the male belt-shaped base 221 opposite from the surface thereof where the engagement portions X, Y are continuously formed. It is preferable that the rib 70 is provided on the cut piece 225 not to be attached to the bag body 10. This is because a jig is also in contact with the rib 70 of the cut piece 225 to favorably apply a thermocompression-bonding force to the rib 70, when the opposite belt-shaped base (the female belt-shaped base 211) is heat-sealed to the base film 11.

Figure 40:
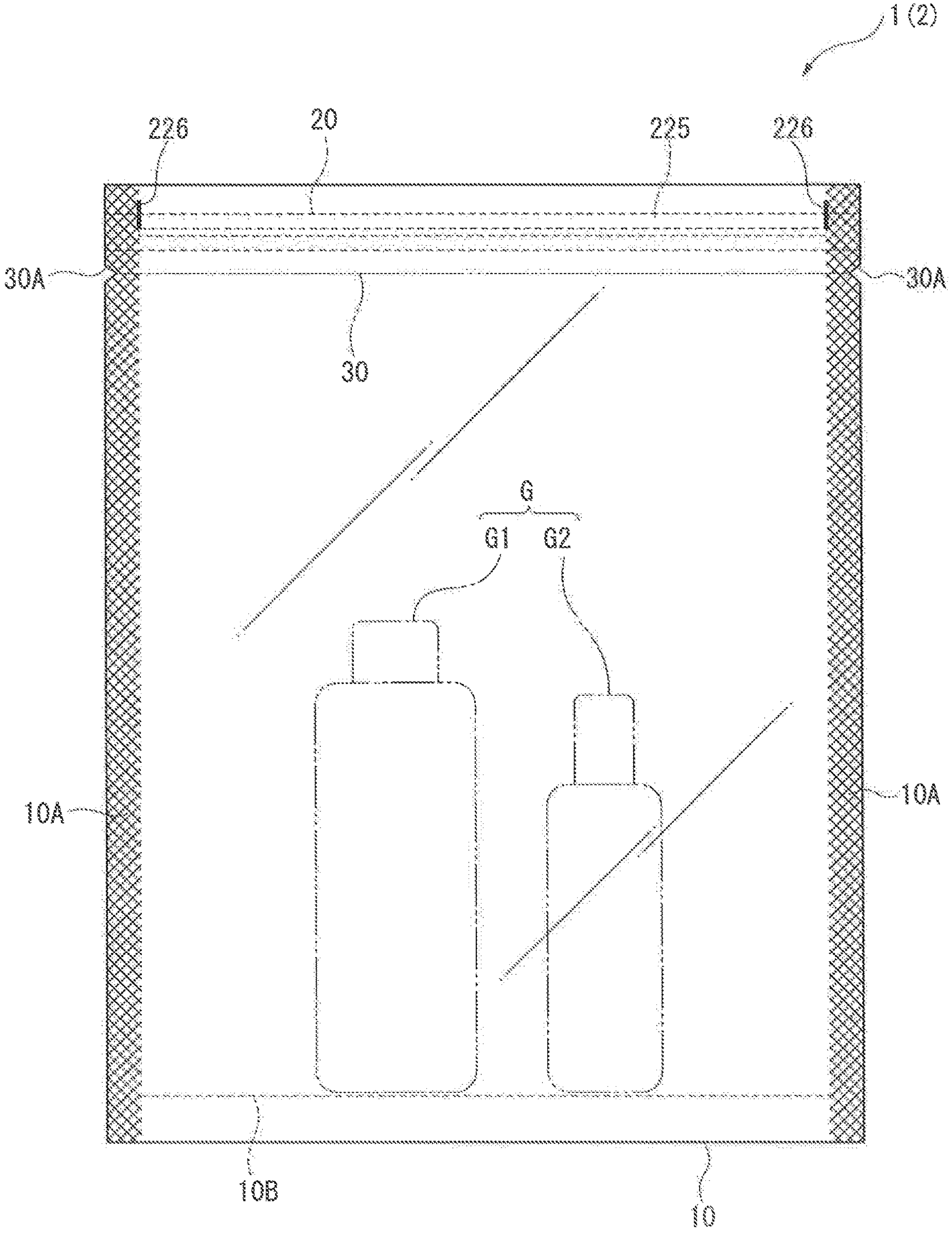
FIG. 40 is a front view of a vicinity of a zipper tape of a tamper-proof zipper tape-equipped bag according to a still further exemplary embodiment of the invention.

In the third exemplary embodiment, the zipper tape 20 has the cut portion 226 such that the cut piece 225 can be easily cut. However, the cut portion 226 may be formed by cutting both ends of the cut piece 225 from an outer surface of the bag body 10 as shown in FIG. 40, or alternatively, may be formed thin by being collapsed.

In the fifth exemplary embodiment, a plurality of engagement portions X, Y may be provided in the same manner as in the third and fourth exemplary embodiments such that the engagement cannot be released when the bag is attempted to be opened by holding the bag body 10 near the housing space 13.

In the plurality of the engagement portions X, Y, an engaging force can be further improved by forming the first male claw 222B of the engagement portion X to have a folded tip end in the same manner as the second male claw 222C, thereby enhancing the tamper resistance.

In the fifth exemplary embodiment, after the article G is housed, the cut piece 225 and the side of the bag body 10 near the open end 12 are cut apart with use of the linear cut portion 50. However, the cut piece 225 and the side of the bag body 10 near the open end 12 may be cut in advance as shown in FIG. 41.

Figure 41:
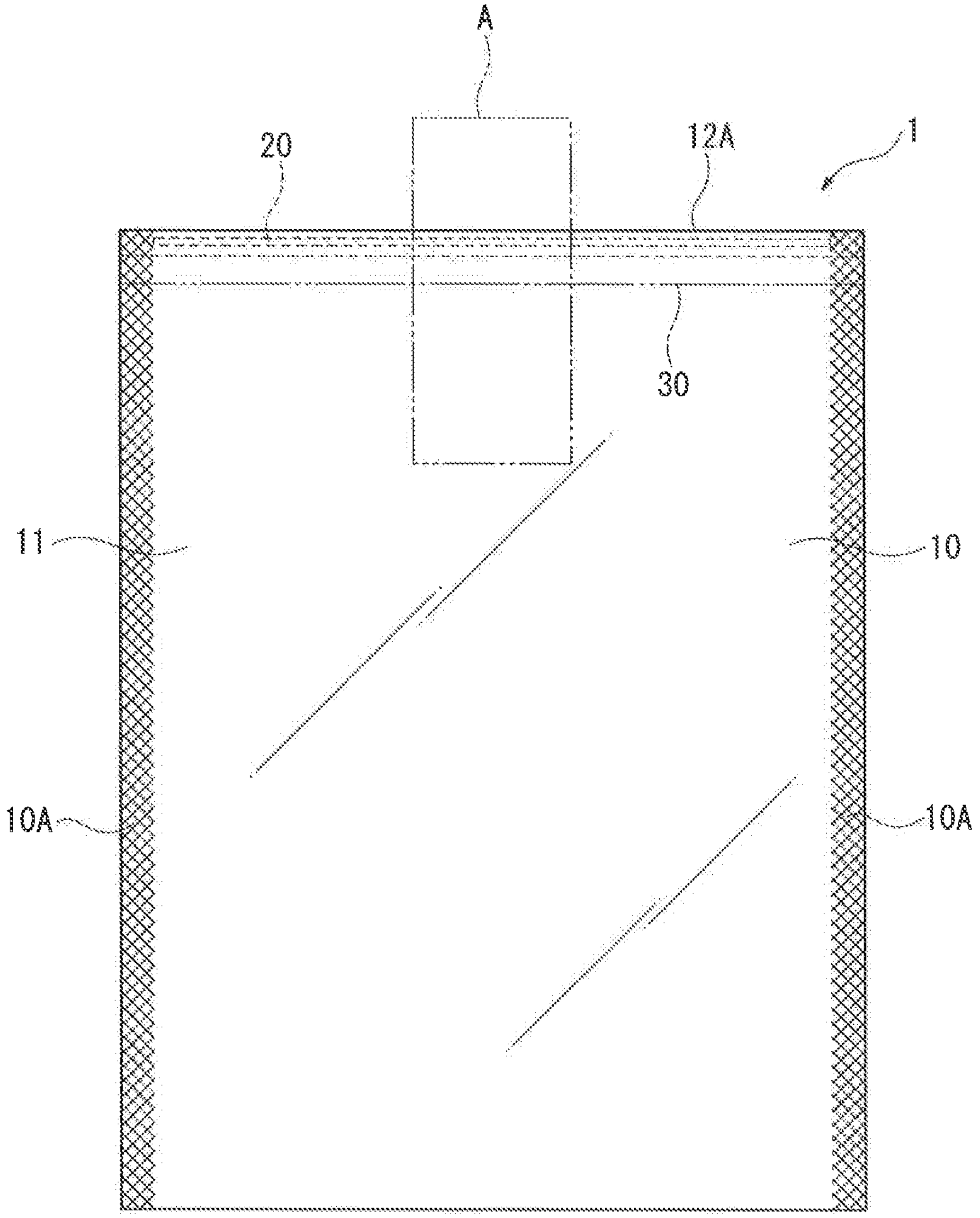
FIG. 41 is a front view of a modification of the tamper-proof bag before housing an article.

In the arrangement of FIG. 41, the film A is interposed between the female hook 212 and the male hook 222 as in the first exemplary embodiment in order to prevent an accidental engagement of the engagement portion X. At a retail shop, a filler and the like, after the film A is removed and the article G is housed into the housing space 13 from the open end 12A of the bag body 10, the female hook 212 and the male hook 222 are brought into engagement.

INDUSTRIAL APPLICABILITY

The invention is applicable to a tamper-proof zipper tape-equipped bag configured to be sealed for housing various articles such as groceries, foods, pharmaceutical products and medical products, and a tamper-proof bag in a form of the zipper tape-equipped bag housing an article.

The invention claimed is:

1. A zipper tape comprising:

a first engagement portion;

a first belt-shaped base continuously provided to the first engagement portion;

a second engagement portion engageable with the first engagement portion; and a second belt-shaped base continuously provided to the second engagement portion, wherein the second belt-shaped base is shortened in a width direction of the zipper tape in relation to the first belt-shaped base to have a shorter length from a position where the second belt-shaped base is continuously provided to the second engagement portion to a first end of the second belt-shaped base in a first side of the width direction, the first engagement portion includes a pair of female claws, the second engagement portion includes a first male claw and a second male claw, the pair of female claws each forming a female hook respectively having inclined surfaces configured to be respectively engaged with the first male claw and the second male claw, an angle of each of the inclined surfaces relative to a line perpendicular to the first belt-shaped base is less than 90 degrees, a tip end of each of the first male claw and the second male claw is folded toward the second belt-shaped base, the first belt-shaped base has a first bonding surface being an opposite surface from the surface where the first engagement portion is formed, the second belt-shaped base has a second bonding surface being an opposite surface from the surface where the second engagement portion is formed, the first bonding surface and the second bonding surface are configured to be bonded to a base film, the second belt-shaped base has an unholdable length from the position where the second belt-shaped base is continuously provided to the second engagement portion to the first end, the first engagement portion further includes a first hook having a claw protruding only toward a first end of the first belt-shaped base in the first side of the width direction, the second engagement portion further includes a second hook having a claw protruding only toward a second end of the second belt-shaped base in a second side of the width direction, and the first hook and the second hook are configured to be engaged with each other without supporting element.

2. The zipper tape according to claim 1, wherein the second belt-shaped base has a length that is 2.0 mm or less from the position where the second belt-shaped base is continuously provided to the second engagement portion to the first end.

3. The zipper tape according to claim 1, wherein the second belt-shaped base is not formed from the position where the second belt-shaped base is continuously provided to the second engagement portion to the first end.

4. A zipper tape-equipped bag comprising the zipper tape according to claim 1 and a bag body formed by the base film comprising a housing space, wherein the first belt-shaped base and the second belt-shaped base is bonded to an inner surface of the bag body such that the first end is positioned opposite to the housing space, the first belt-shaped base is bonded to the bag body at least at a position between the first engagement portion and each of the first end and a second end opposite to the first end, the second belt-shaped base is bonded to the bag body at a position between the second engagement portion and the second end without being bonded to the bag body from the second engagement portion to the first end.

5. A zipper tape-equipped bag comprising the zipper tape according to claim 1 and a bag body formed by the base film comprising a housing space, wherein the first belt-shaped base and the second belt-shaped base is bonded to an inner surface of the bag body such that the first end is positioned opposite to the housing space.

6. A zipper tape comprising:

a first engagement portion;

a first belt-shaped base continuously provided to the first engagement portion;

a second engagement portion engageable with the first engagement portion; and a second belt-shaped base continuously provided to the second engagement portion, wherein the second belt-shaped base is shortened in a width direction of the zipper tape in relation to the first belt-shaped base to have a shorter length from a position where the second belt-shaped base is continuously provided to the second engagement portion to one end of the second belt-shaped base in the width direction, the first engagement portion includes a first claw and a second claw, the second claw includes a pair of female claws, the second engagement portion includes a third claw and a fourth claw, the third claw protrudes toward the other end of the second belt-shaped base in the width direction and has a first inclined surface to be engaged with the first claw, a first acute angle is formed between the first inclined surface and a line perpendicular to the second belt-shaped base, and a tip end of the third claw is folded toward the second belt-shaped base, the fourth claw includes a first male claw and a second male claw protruding toward the one end and the other end of the second belt-shaped base in the width direction, respectively, and having a second inclined surface and a third inclined surface, respectively, to be engaged with each of the pair of female claws, respectively, a tip end of each of the first male claw and the second male claw is folded toward the second belt-shaped base, and the second belt-shaped base is shortened on the one end in the width direction and is not shortened on the other end in the width direction.

7. A zipper tape-equipped bag comprising the zipper tape according to claim 6 and a bag body comprising a housing space, wherein the first belt-shaped base and the second belt-shaped base is bonded to an inner surface of the bag body such that the one end is positioned opposite to the housing space.

8. A zipper tape comprising:

a first engagement portion;

a first belt-shaped base continuously provided to the first engagement portion;

a second engagement portion engageable with the first engagement portion; and a second belt-shaped base continuously provided to the second engagement portion, wherein the second belt-shaped base is shortened in a width direction of the zipper tape in relation to the first belt-shaped base to have a shorter length from a position where the second belt-shaped base is continuously provided to the second engagement portion to a first end of the second belt-shaped base in a first side of the width direction, the first engagement portion includes a pair of female claws, the second engagement portion includes a first male claw and a second male claw, the pair of female claws each forming a female hook respectively having first inclined surfaces configured to be respectively engaged with the first male claw and the second male claw, an angle of each of the first inclined surfaces relative to a line perpendicular to the first belt-shaped base is less than 90 degrees, the first male claw forms a first male hook having a second inclined surface configured to be engaged with one of the pair of female claws, the second male claw forms a second male hook having a third inclined surface configured to be engaged with the other of the pair of female claws, an obtuse angle is formed between the second inclined surface and a line perpendicular to the second belt-shaped base, an acute angle is formed between the third inclined surface and the line perpendicular to the second belt-shaped base, the first belt-shaped base has a first bonding surface being an opposite surface from the surface where the first engagement portion is formed, the second belt-shaped base has a second bonding surface being an opposite surface from the surface where the second engagement portion is formed, the first bonding surface and the second bonding surface are configured to be bonded to a base film, the second belt-shaped base has an unholdable length from the position where the second belt-shaped base is continuously provided to the second engagement portion to the first end, the first engagement portion further includes a first hook having a claw protruding only toward a first end of the first belt-shaped base in the first side of the width direction, and the second engagement portion further includes a second hook having a claw protruding toward a second end of the second belt-shaped base in a second side of the width direction, and the first hook and the second hook are configured to be engaged with each other without supporting element.

9. A zipper tape comprising:

a first engagement portion;

a first belt-shaped base continuously provided to the first engagement portion;

a second engagement portion engageable with the first engagement portion; and a second belt-shaped base continuously provided to the second engagement portion, wherein the second belt-shaped base is shortened in a width direction of the zipper tape in relation to the first belt-shaped base to have a shorter length from a position where the second belt-shaped base is continuously provided to the second engagement portion to one end of the second belt-shaped base in the width direction, the first engagement portion includes a first claw and a second claw, the second claw includes a pair of female claws, the second engagement portion includes a third claw and a fourth claw, the third claw protrudes toward the other end of the second belt-shaped base in the width direction and has a first inclined surface to be engaged with the first claw, a first acute angle is formed between the first inclined surface and a line perpendicular to the second belt-shaped base, and a tip end of the third claw is folded toward the second belt-shaped base, the fourth claw includes a first male claw and a second male claw protruding toward the one end and the other end of the second belt-shaped base in the width direction, respectively, and having a second inclined surface and a third inclined surface, respectively, to be engaged with each of the pair of female claws, respectively a second obtuse angle is formed between the second inclined surface and the line perpendicular to the second belt-shaped base, a third acute angle is formed between the third inclined surface and the line perpendicular to the second belt-shaped base, and the second belt-shaped base is shortened on one end in the width direction and is not shortened on the other end of the width direction.

* * * * *